(12) United States Patent
Kohtoku

(10) Patent No.: US 8,976,319 B2
(45) Date of Patent: Mar. 10, 2015

(54) DISPLAY DEVICE COMPRISING AN ION-GENERATING DEVICE AND A GUIDING MECHANISM THAT CAN SELECTIVELY GUIDE AIR FROM A FAN

(75) Inventor: Yukihide Kohtoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 68 days.

(21) Appl. No.: 13/883,530

(22) PCT Filed: Nov. 9, 2011

(86) PCT No.: PCT/JP2011/075806
§ 371 (c)(1),
(2), (4) Date: May 3, 2013

(87) PCT Pub. No.: WO2012/066996
PCT Pub. Date: May 24, 2012

(65) Prior Publication Data
US 2013/0222754 A1    Aug. 29, 2013

(30) Foreign Application Priority Data
Nov. 16, 2010   (JP) ................................. 2010-255627

(51) Int. Cl.
*G02F 1/1335* (2006.01)
*G02F 1/1333* (2006.01)
*H01T 23/00* (2006.01)

(52) U.S. Cl.
CPC .... *G02F 1/133385* (2013.01); *G02F 1/133603* (2013.01); *G02F 2001/133628* (2013.01); *H01T 23/00* (2013.01)
USPC ............................................... 349/63; 349/61

(58) Field of Classification Search
USPC ....................................................... 349/62, 63
See application file for complete search history.

(56) References Cited

U.S. PATENT DOCUMENTS

| | | | |
|---|---|---|---|
| 2003/0137794 A1* | 7/2003 | Izumi et al. .................... | 361/231 |
| 2009/0102989 A1* | 4/2009 | Sakai et al. ........................ | 349/1 |
| 2010/0071397 A1* | 3/2010 | Takeda et al. .................... | 62/264 |
| 2011/0228195 A1* | 9/2011 | Shikii et al. ..................... | 349/62 |

FOREIGN PATENT DOCUMENTS

| | | |
|---|---|---|
| JP | 2003-284766 A | 10/2003 |
| WO | WO 2009147808 A1 * | 12/2009 |

* cited by examiner

*Primary Examiner* — Paul Lee
(74) *Attorney, Agent, or Firm* — Chen Yoshimura LLP

(57) ABSTRACT

Provided is a display device that includes: a display panel (7) that has a display surface that displays an image; a fan (500); an ion-generating device (520) that can generate ions; and a guiding mechanism (620) that can selectively guiding air from the fan (500) to the display surface and to the rear side of the display surface. The air that is guided to the display surface is guided together with ions that are generated by the ion-generating device (520).

6 Claims, 43 Drawing Sheets

DISPLAY DEVICE COMPRISING AN ION-GENERATING DEVICE AND A GUIDING MECHANISM THAT CAN SELECTIVELY GUIDE AIR FROM A FAN

TECHNICAL FIELD

The present invention relates to a display device, and in particular, relates to a display device that has an operating surface where a user operates the device.

BACKGROUND ART

Various display devices and the like with touch functionality having an operating panel where a user operates the device have been proposed up to now.

In particular, display devices with touch functionality have been focused on in recent years due to being able to input and output data through intuitive commands. In a display device having touch functionality, data is inputted or transmitted externally when a user touches an image, a pictogram, or the like displayed on the display surface using a finger, a stylus, or the like.

As display devices with touch functionality become more popular, various types of display devices with touch functionality have been proposed. For example, a display device disclosed in Japanese Patent Application Laid-Open Publication No. 2003-284766 includes a touch panel formed integrally with a display panel, and an ion-generating device that generates positive ions and negative ions. In this display device, air surrounding the touch panel, and the touch panel surface are cleaned.

RELATED ART DOCUMENT

Patent Document

Patent Document 1: Japanese Patent Application Laid-Open Publication No. 2003-284766

SUMMARY OF THE INVENTION

Problems to be Solved by the Invention

A display device such as that mentioned above includes a display panel and a backlight unit that radiates light to the display panel. The backlight unit is susceptible to reaching high temperatures due to light being radiated to the display panel over a long period of time. As the backlight unit reaches high temperatures, the display panel also reaches high temperatures, which has a major impact when driving the display panel.

The present invention was made in view of the above-mentioned problem, and an object thereof is to provide a display device that can mitigate the adherence of foreign matter to the display surface while cooling the backlight unit.

MEANS FOR SOLVING THE PROBLEMS

A display device according to the present invention includes: a display panel that has a display surface that displays an image; a fan; an ion-generating device that can generate ions; and a guiding mechanism that can selectively guide air from the fan to the display surface and a rear side of the display surface. The air guided to the display surface is guided together with ions generated by the ion-generating device.

It is preferable that a backlight module that has a plurality of light sources that radiate light to the display panel be disposed on the rear side of the display surface.

It is preferable that the backlight module include a dividing wall that divides a space inside the backlight module into a plurality of divided areas, and a detector that can detect a temperature inside each of the divided areas. The guiding mechanism guides air from the fan to a divided area that has an internal temperature at or higher than a prescribed temperature.

It is preferable that the display surface include a plurality of partitioned areas that face the divided areas, and that the guiding mechanism send air towards one of the plurality of partitioned areas facing one of the divided areas that has a temperature at or higher than a prescribed temperature. It is preferable that a gap be formed between the display panel and the backlight module, and that the guiding mechanism can guide air from the fan to the gap.

It is preferable that the display device further include a human presence sensor that can detect a person in a vicinity of the display surface. When the human presence sensor detects a person in the vicinity of the display surface, the guiding mechanism guides air from the fan to the display surface. It is preferable that the display device further include a touch sensor that can detect that the display surface has been touched. When the touch sensor detects that the display surface has been touched, the guiding mechanism guides air from the fan to the display surface.

It is preferable that the ion-generating device generate ions having a sterilization effect, the ions including positive ions and negative ions, that the positive ions include $H^+(H_2O)_m$, m being any natural number, that the negative ions include $O_2^-(H_2O)_n$, n being any natural number, and that the positive ions and the negative ions react with each other forming $H_2O_2$ or an OH radical.

Effects of the Invention

With the display device according to the present invention, the operating surface can be efficiently cleaned.

BRIEF DESCRIPTION OF THE DRAWINGS

FIG. 28 is a front view of discharge units that shows a state in which ions are being blown onto the entire display surface 6a.

DETAILED DESCRIPTION OF EMBODIMENTS

A display device according to the present invention will be described with reference to FIGS. 1 to 51. When describing the embodiments below, when referring to numbers, amounts, positions, and the like, the scope of the present invention is not necessarily limited to those numbers, amounts, positions, and the like unless otherwise noted. Furthermore, in the embodiments below, the respective components are not necessarily needed for the present invention unless otherwise noted. If there are multiple embodiments below, it is anticipated that characteristic parts of each of the embodiments will be appropriately combined unless otherwise noted.

(Embodiment 1)

Figure 1:
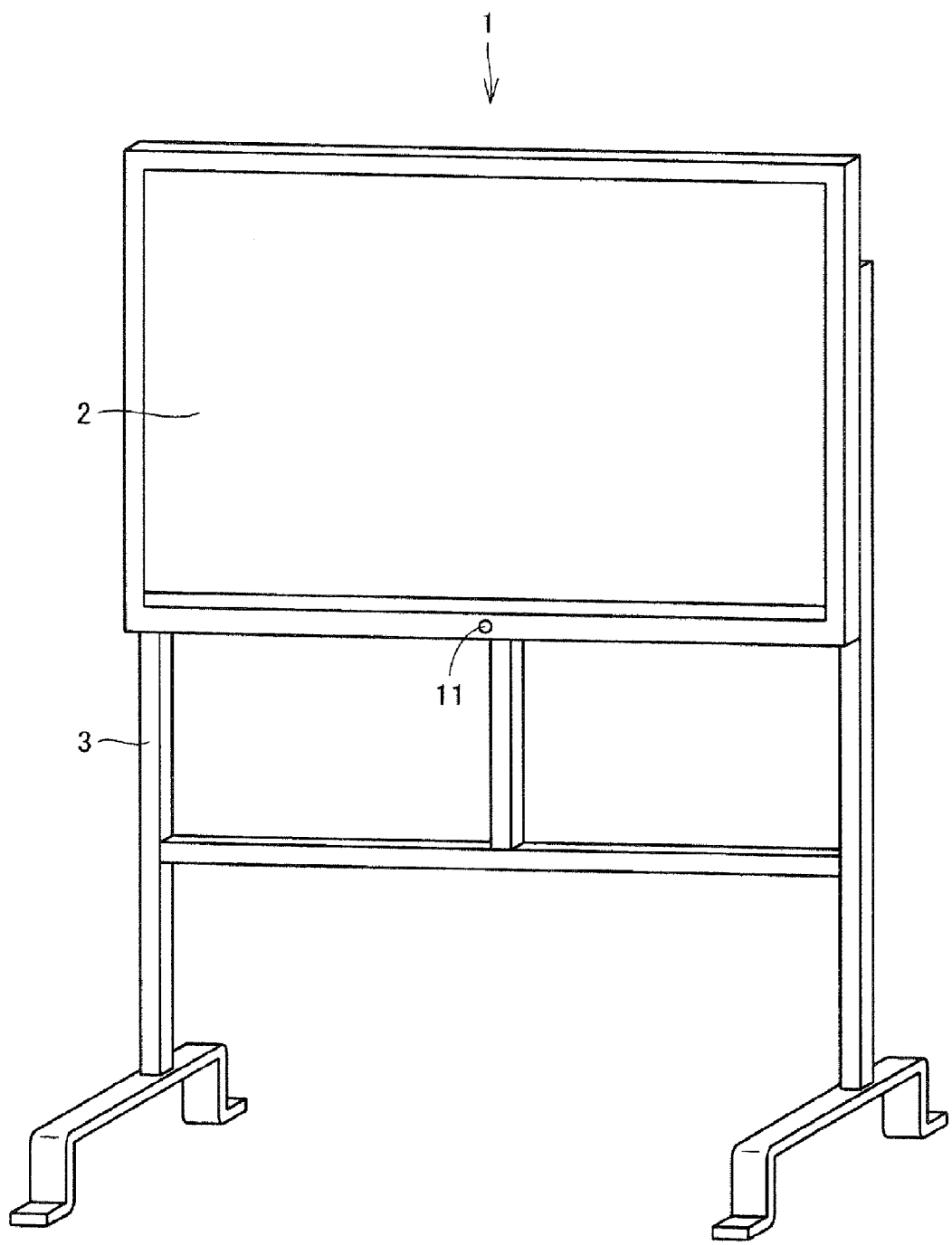
FIG. 1 is a perspective view of an information display 1 that includes a liquid crystal display device.
Figure 2:
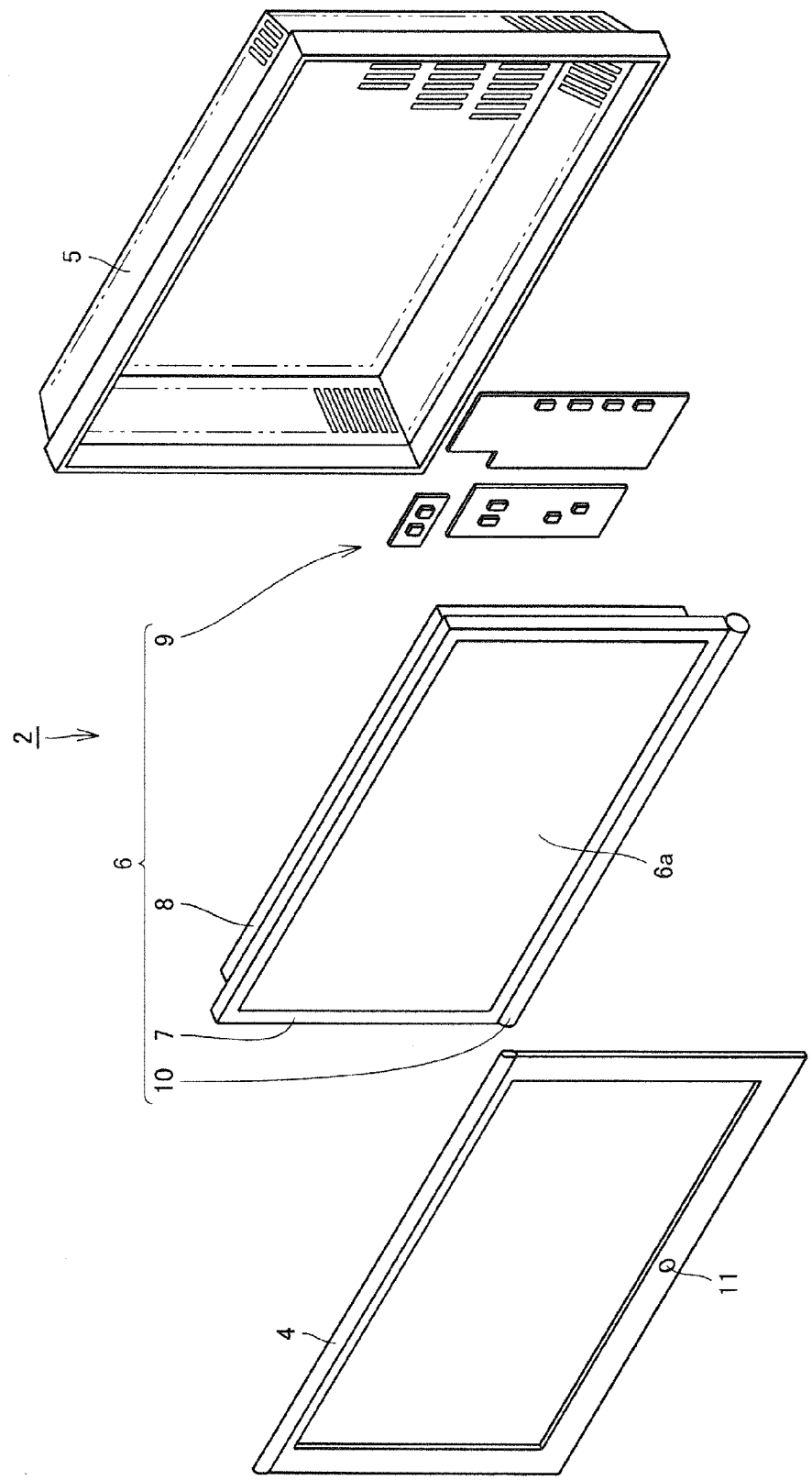
FIG. 2 is an exploded perspective view of a liquid crystal display device 2.

FIG. 1 is a perspective view of an information display 1 that includes a liquid crystal display device. As shown in FIG. 1, the information display 1 includes a liquid crystal display device 2 and a stand 3 that supports the liquid crystal display device 2. FIG. 2 is an exploded perspective view of the liquid crystal display device 2. The liquid crystal display device 2 of the present embodiment has touch functionality. A control part installed in the liquid crystal display device 2 cleans the display surface in a short period of time efficiently by dividing the display surface into a plurality of partitioned areas, and blowing ions onto a partitioned area touched by a user more than a prescribed number of times.

A configuration of the liquid crystal display device 2 will be described in detail. As shown in FIG. 2, the liquid crystal display device 2 includes a front cover 4, a rear cover 5, a liquid crystal display module 6 disposed between the front cover 4 and the rear cover 5 and having a display surface 6a, and a human presence sensor 11 provided on the front cover 4.

The front cover 4 is formed in a frame shape, and has a window portion such that the display surface 6a is visible from outside. The rear cover 5 is formed so as to have a bottom and the liquid crystal display module 6 can be inserted therein.

The liquid crystal display module 6 includes a display panel 7, a backlight module 8 that radiates light to the display panel 7, a control part 9 that controls the driving of the backlight module 8 and the display panel 7, and an ion discharge module 10 that blows ions towards the display surface 6a. The backlight module 8 is located closer to the rear cover 5 than the display panel 7. The display panel 7 is a substantially rectangular cuboid, and the display surface 6a is rectangular.

The human presence sensor 11 is provided on the lower side of the front cover 4 and can detect whether or not a person is present in the vicinity of the display panel 7. The human presence sensor 11 is a sensor for detecting the presence of a human, and can detect the presence of a person by using infrared rays, ultrasonic sound waves, visible light, or the like.

Figure 3:
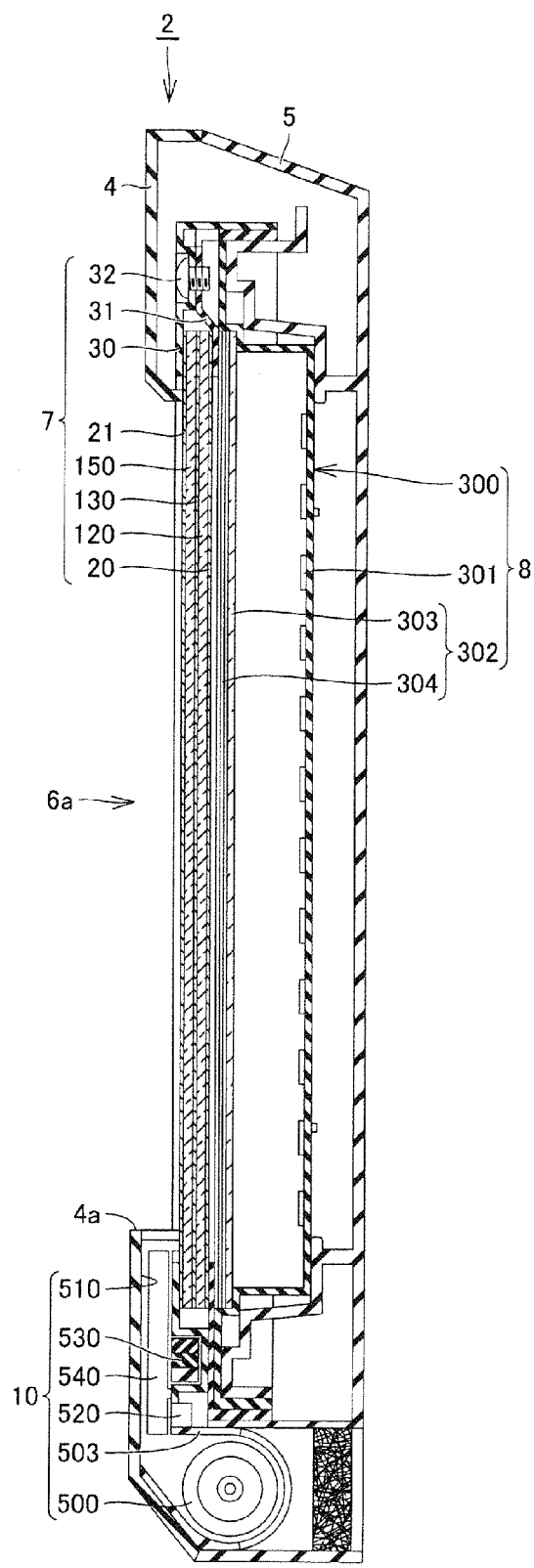
FIG. 3 is a side cross-sectional view of the liquid crystal display device 2.

FIG. 3 is a side cross-sectional view of the liquid crystal display device 2. As shown in FIG. 3, the display panel 7 includes a polarizing plate 20, an active matrix substrate 120 located further to the front than the polarizing plate 20, a liquid crystal layer 130 located further to the front than the active matrix substrate 120, an opposite substrate 150 located further to the front than the liquid crystal layer 130, a polarizing plate 21 located further to the front than the opposite substrate 150, a front bezel 30, and a pressing member 31.

The polarizing plate 20 extracts an oscillating component that oscillates in one direction from light radiated from the backlight module 8.

The active matrix substrate 120 includes a glass substrate, a plurality of TFT transistors formed on a main surface of the glass substrate that faces the opposite substrate 150, and pixel electrodes.

The opposite substrate 150 includes a glass substrate, color filters formed on the glass substrate, an opposite electrode, and an alignment film. The liquid crystal layer 130 is sealed between the active matrix substrate 120 and the opposite substrate 150, and in the liquid crystal layer 130 there are a plurality of liquid crystal molecules.

The polarizing plate 21 is formed so as to allow through oscillating components of light that oscillate in a direction perpendicular to the oscillating components that have passed through the polarizing plate 20.

The front cover 4 covers the outer edge of the main surface of the front side of the polarizing plate 21. Of the main surface of the polarizing plate 21, the part exposed in a window portion 4a of the front cover 4 is the display surface 6a, which is a display region that displays images. On the other hand, the part of the main surface of the polarizing plate 21 covered by the front cover 4 is a non-display region.

The pressing member 31 and the front bezel 30 sandwich the polarizing plate 20, the active matrix substrate 120, the liquid crystal layer 130, the opposite substrate 150, and the polarizing plate 21, and keep each member fixed in position. The front bezel 30 and the pressing member 31 are fixed to each other by a fixing member 32 such as a screw or a bolt.

The display panel 7 includes a touch sensor that can detect where a user has touched the display surface 6a, but specific configurations of the active matrix substrate 120 and the opposite substrate 150 including a configuration of the touch sensor, and a drive state thereof will be described below. The backlight module 8 includes a rear bezel 300 that has a bottom, a plurality of LEDs (light emitting diodes) 301 disposed on the bottom surface of the rear bezel 300, and a group of layered sheets 302 disposed so as to cover the opening of the rear bezel 300.

Figure 4:
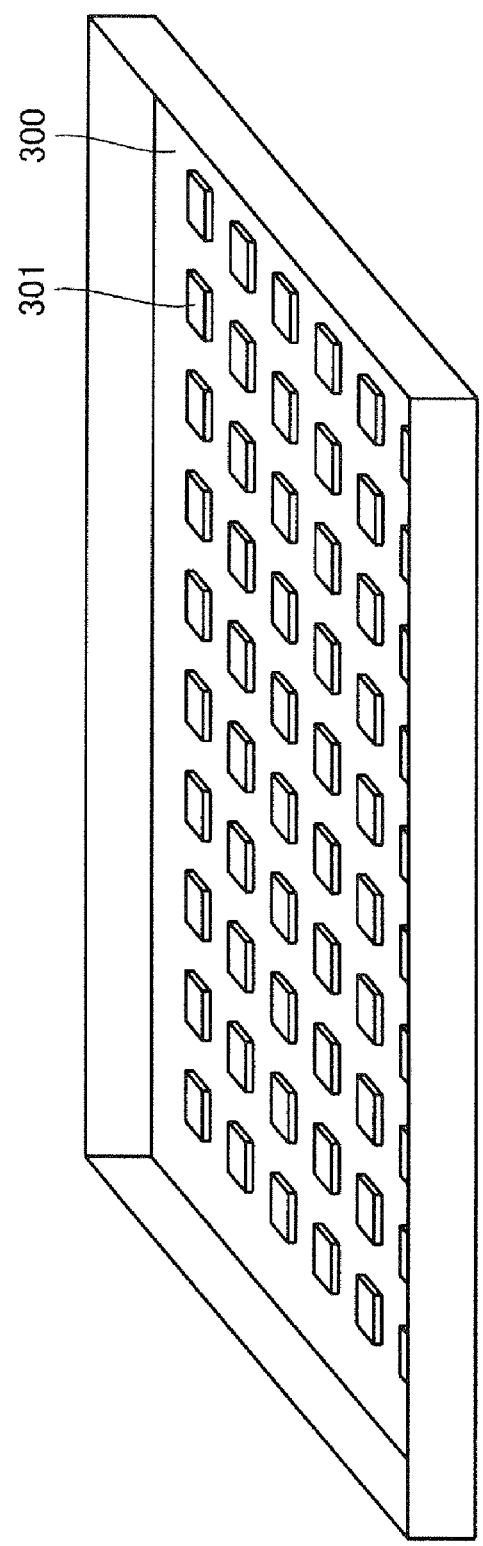
FIG. 4 is a perspective view that shows a rear bezel 300 and LEDs 301.

The rear bezel 300 is fixed to the front bezel 30 by a fixing member not shown in drawings. As shown in FIG. 4, the plurality of LEDs 301 are disposed in an array on the bottom surface of the rear bezel 300. In FIG. 3, the LEDs 301 radiate light towards the group of layered sheets 302. The group of layered sheets 302 includes a diffusion sheet 303, and a plurality of prism sheets 304 disposed further to the front than the diffusion sheet 303.

The group of layered sheets 302 is fixed by being sandwiched between the rear bezel 300 and the pressing member 31.

Figure 5:
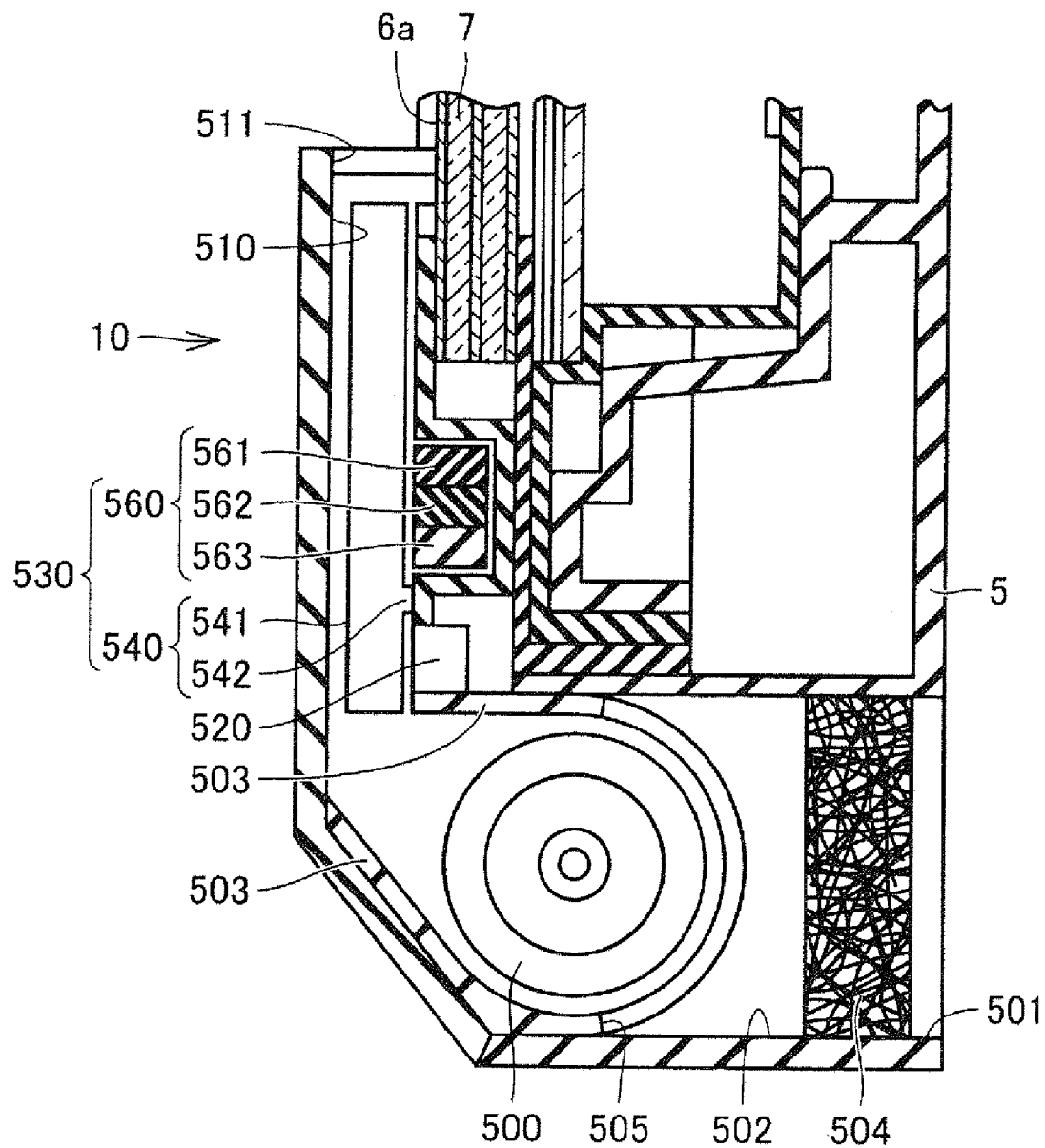
FIG. 5 is a cross-sectional view that shows details of an ion discharge module 10.

The pressing member 31 is inserted between the display panel 7 and the backlight module 8, and forms a gap between the display panel 7 and the backlight module 8. If the display panel 7 and the backlight module 8 were to come into contact, Newton's rings would be formed. As a countermeasure, a gap of approximately 2 mm, for example, is formed between the polarizing plate 20 and the prism sheets 304. FIG. 5 is a cross-sectional view that shows details of an ion discharge module 10. As shown in FIG. 5, the ion discharge module 10 includes a fan 500, an intake pipe 502 that is connected to an intake opening 501 formed in the rear cover 5 and supplies external air to the fan 500, and a straightening vane 503 that straightens the flow of air in the periphery of the fan 500.

In addition, the ion discharge module 10 includes an outtake pipe 510 that blows air from the fan 500 to the display surface 6a, an ion-generating device 520 provided in the outtake pipe 510, and an adjusting mechanism 530 that adjusts the airflow direction of air blown from an outtake opening 511 of the outtake pipe 510 to the display surface 6a.

A cross-flow fan or the like is used as the fan 500, for example, and is formed so as to be cylindrical. The circumferential surface of the fan 500 is provided with a plurality of fins.

A filter 504 is provided in the intake pipe 502. An input opening 505 is formed in the straightening vane 503, and when the fan 500 rotates, outside air that enters from the intake opening 501 reaches the fan 500 through the input opening 505.

The straightening vane 503 straightens the flow of air around the fan 500, and guides the air blown from the fan 500 to the outtake pipe 510.

The ion-generating device 520 is a device that can selectively generate positive ions and negative ions, and the ions generated thereby are carried by the airflow from the fan 500 and flow through the outtake pipe 510.

The air that includes ions is blown towards the display surface 6a from the outtake opening 511.

The adjusting mechanism 530 includes a plurality of first louvers 540 and a louver adjusting mechanism 560 that adjusts the direction of the first louvers 540.

Figure 6:
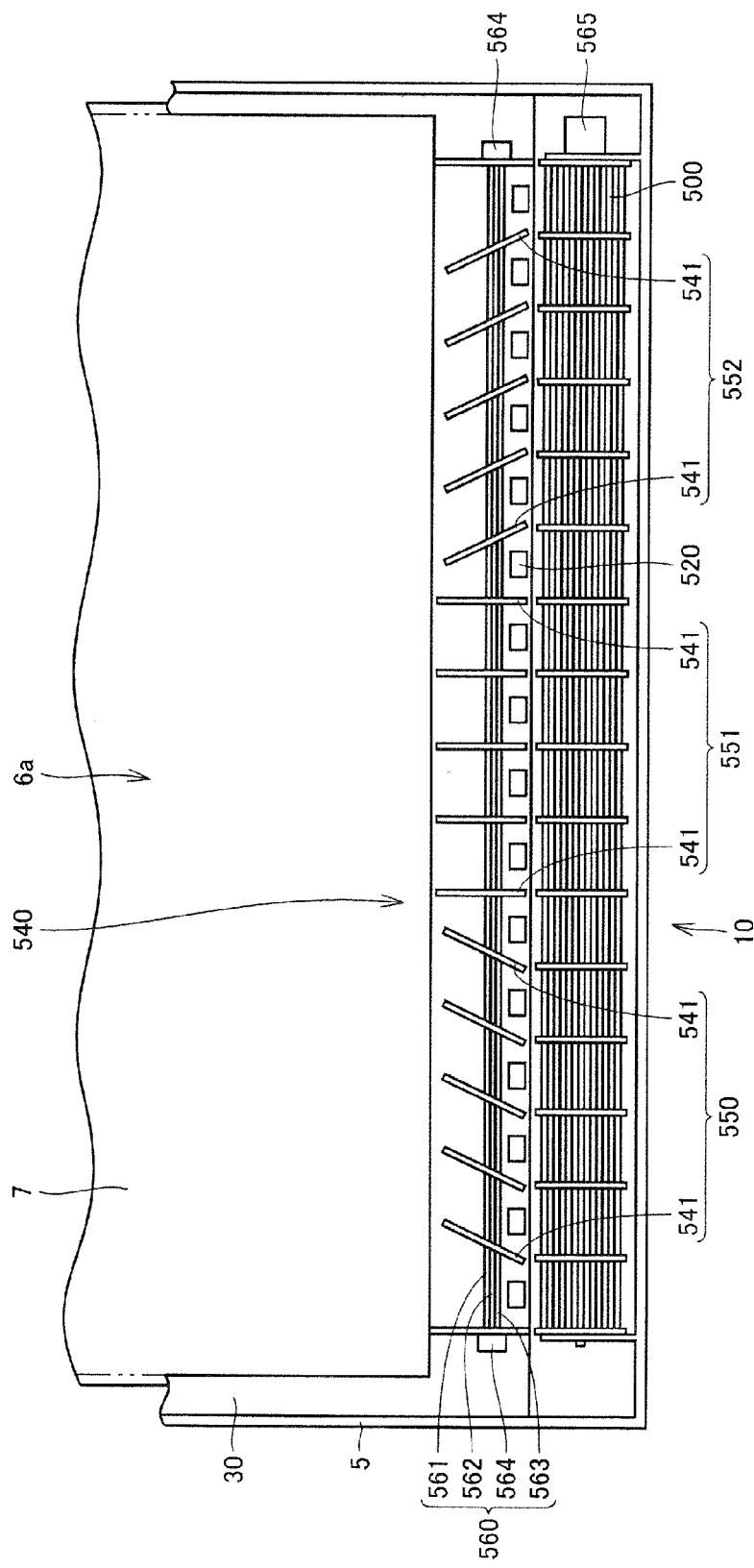
FIG. 6 is a front view that schematically shows a portion of the liquid crystal display device 2.

FIG. 6 is a front view that schematically shows a portion of the liquid crystal display device 2 in which the front cover 4 and the straightening vane 503 are removed and portions of the rear cover 5 and the front bezel 30 are omitted.

As shown in FIG. 6, the first louvers 540 are disposed on a lower side of the front bezel 30. The first louvers 540 include a plurality of partitioned louvers 550, 551, and 552 aligned along the lower side of the rear cover 5. Each partitioned louver 550, 551, and 552 includes a plurality of fins 541.

The louver adjusting mechanism 560 includes a plurality of slide bars 561, 562, and 563, and a slide mechanism 564 that causes each slide bar 561, 562, and 563 to slide along the lower side of the rear cover 5.

The slide bar 561 is connected to the fins 541 of the partitioned louver 550, and the slide bar 562 is connected to the fins 541 of the partitioned louver 551. The slide bar 563 is connected to the fins 541 of the partitioned louver 552.

As shown in FIG. 5, each fin 541 is provided so as to be rotatable around an axle 542. The fins 541 rotate around the axles 542 when the slide bars 561, 562, and 563 connected thereto slide along the lower side of the rear cover 5.

Thus, in FIG. 6, if the slide bar 561 slides along the lower side of the rear cover 5, for example, then the fins 541 of the partitioned louver 550 connected to the slide bar 561 rotate, causing the air traveling through the partitioned louver 550 to change airflow direction.

Similarly, if the slide bar 562 slides along the lower side of the rear cover 5, then the fins 541 of the partitioned louver 551 rotate, causing the air traveling through the partitioned louver 551 to change airflow direction. If the slide bar 563 slides along the lower side of the rear cover 5, then the fins 541 of the partitioned louver 552 rotate, causing the air traveling through the partitioned louver 552 to change airflow direction.

A plurality of fins 541 are disposed in a row with gaps therebetween along the lower side of the front bezel 30, and the ion-generating devices 520 are disposed between each fin 541.

The ion-generating devices 520 generate positive ions and negative ions. The ions generated by the ion-generating devices 520 are sent towards the display surface 6a along with air from the fan 500.

In a state shown in FIG. 6, the partitioned louvers 550, 551, and 552 guide the air and ions toward the center of the display panel 7 in the width direction.

Figure 7:
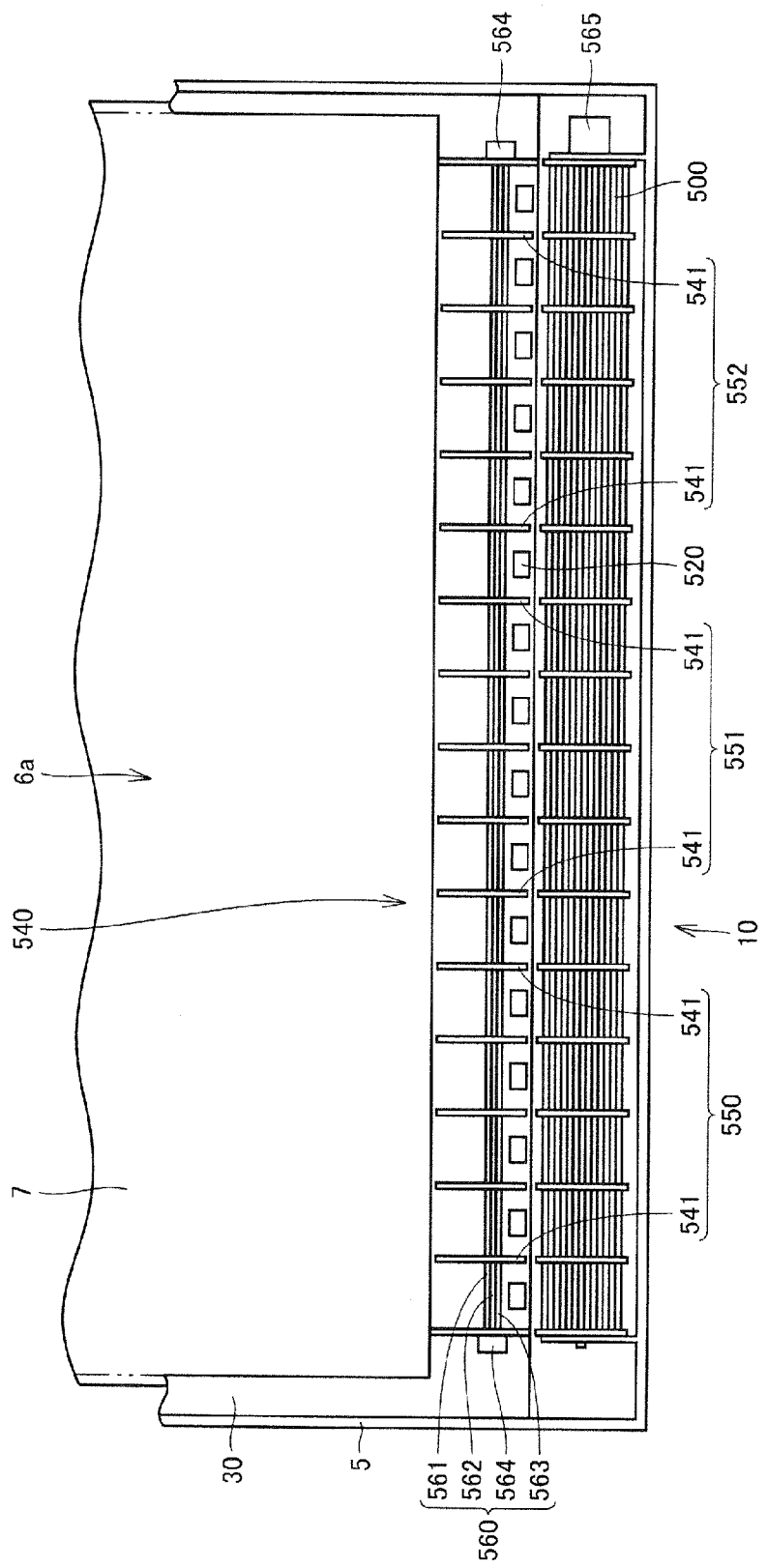
FIG. 7 is a front view that schematically shows a portion of the liquid crystal display device 2.

Also, as shown in FIG. 7, the ion discharge module 10 can guide air and ions evenly along the entire display surface 6a by having all fins 541 face upwards.

Figure 8:
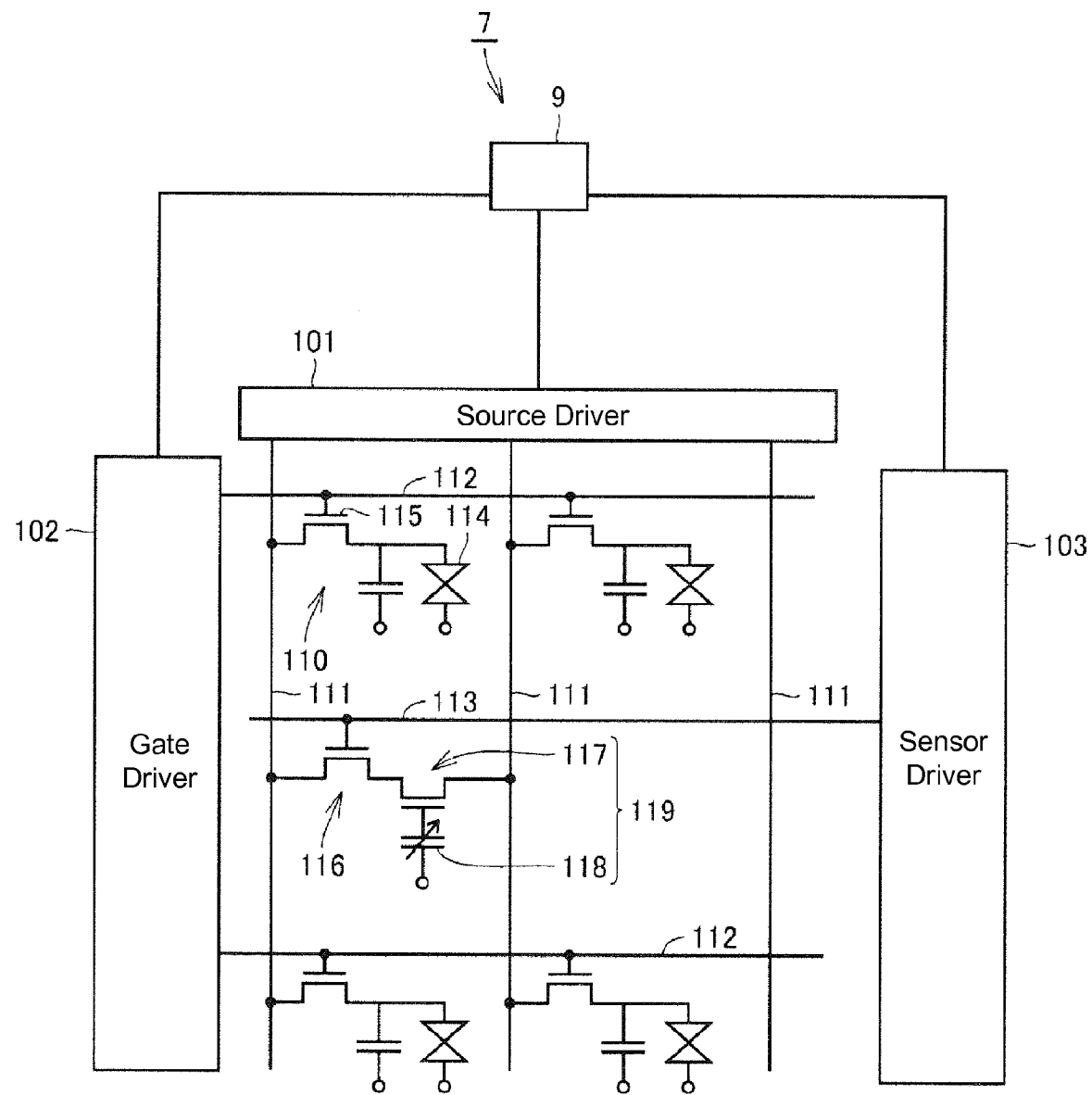
FIG. 8 is a circuit diagram that schematically shows a circuit diagram of a display panel 7.

The configuration of the display panel 7 having touch functionality will be described with reference to FIGS. 8 to 16. FIG. 8 is a circuit diagram that schematically shows a circuit diagram of a display panel 7. As shown in FIG. 8, the display panel 7 includes a plurality of pixels 110 disposed in an array, and the pixels 110 include a plurality of TFT (thin film transistor) elements 115, and pixel electrodes 114 connected to the TFT elements 115.

The display panel 7 includes a plurality of gate wiring lines 112 and sensor gate wiring lines 113, which extend along a first direction and have gaps along a second direction, and a plurality of source wiring lines 111, which extend along the second direction and have gaps along the first direction.

The respective gate wiring lines 112 are connected to a gate driver 102, and the respective source wiring lines 111 are connected to a source driver 101. The plurality of sensor gate wiring lines 113 are formed extending along the first direction with gaps therebetween along the second direction such that each sensor gate wiring line 113 is disposed between adjacent gate wiring lines 112. The sensor gate wiring lines 113 are connected to the sensor driver 103.

The source driver 101, the gate driver 102, and the sensor driver 103 are connected to the control part 9. Each pixel 110 is defined by two adjacent gate wiring lines 112 and two adjacent source wiring lines 111.

A TFT element 115, a selection TFT element 116, and a pressure detection element 119 are disposed in each pixel 110. The source electrode of the TFT element 115 is connected to a source wiring line 111, and the gate electrode of the TFT element 115 is connected to a gate wiring line 112. The drain electrode of the TFT element 115 is connected to a pixel electrode 114.

The source electrode of the selection TFT element 116 is connected to the source wiring line 111, and the gate electrode of the selection TFT element 116 is connected to a sensor gate wiring line 113. The pressure detection element 119 is connected to the drain electrode of the selection TFT element 116.

The pressure detection element 119 includes an output element 117 connected to the drain electrode of the selection TFT element 116, and a pressure sensor (pressure detection device) 118 connected to the gate electrode of the output element 117. The output element 117 includes the source electrode connected to the drain electrode of the selection TFT element 116, the drain electrode connected to a source wiring line 111, and the gate electrode connected to a lower electrode of the pressure sensor 118. The source wiring line 111 connected to the source electrode of the selection TFT element 116 is adjacent to the source wiring line 111 connected to the drain electrode of the output element 117.

The selection TFT element 116 can be turned ON/OFF at an appropriate interval of time, and the control part 9 detects output from the pressure detection element 119 connected to the selection TFT element 116 that has been selected. Specifically, the control part 9 detects the amount of current from the pressure detection element 119 as an electric property thereof.

The output from the output element 117 changes depending on the voltage applied to the gate electrode of the output element 117. The voltage applied to this gate electrode is determined by the potential of the lower electrode of the pressure sensor 118 connected to the gate electrode. The potential of the lower electrode of the pressure sensor 118 is determined by the capacitance between the lower electrode and an upper electrode. The capacitance between the upper electrode and the lower electrode changes depending on the pressure applied on the substrate where the upper electrode is provided. In other words, the control part 9 can detect pressure applied to the substrate from the amount of current from the output element 117.

Figure 9:
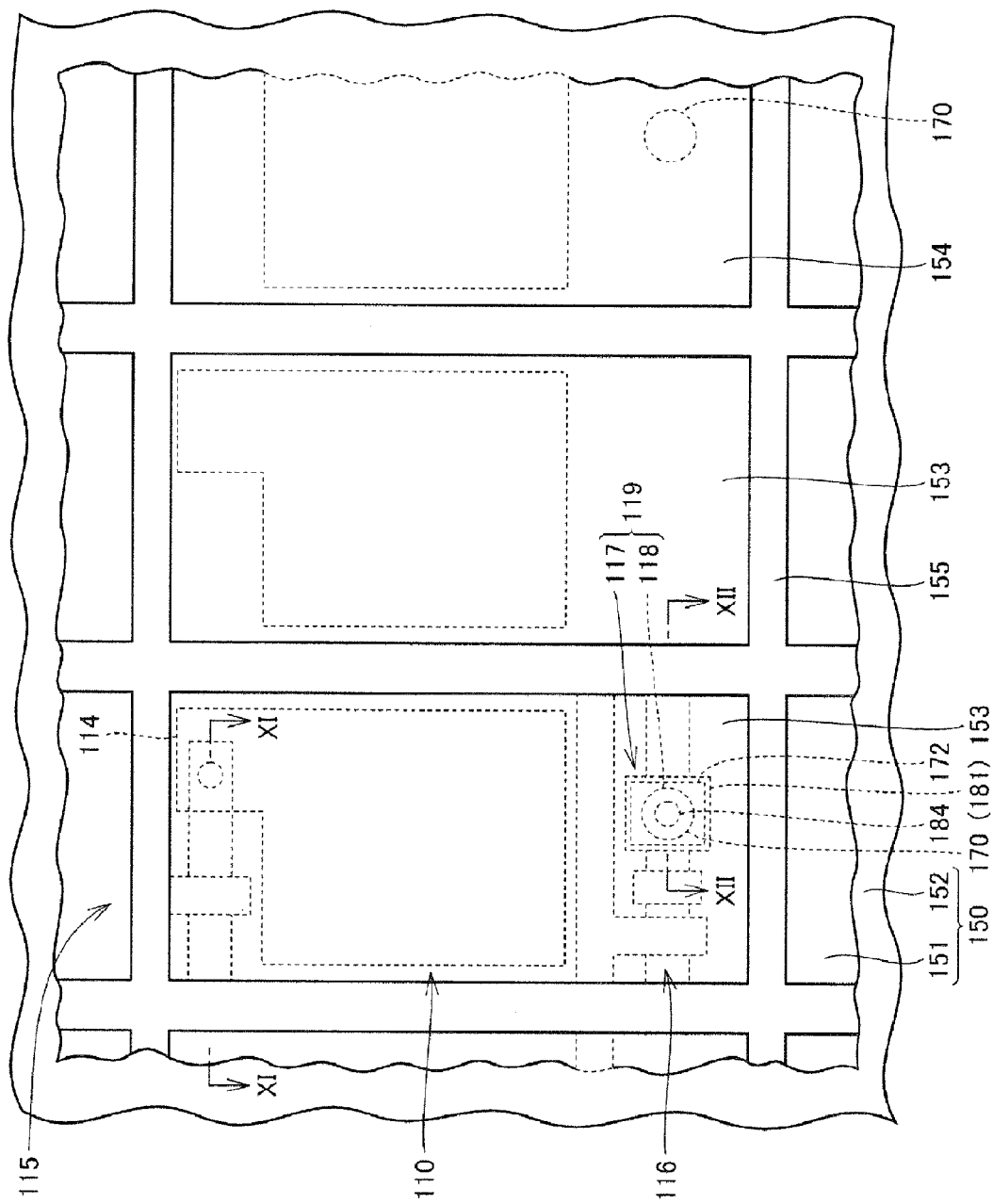
FIG. 9 is a plan view that shows a portion of the display panel 7 from the opposite substrate 150 side.

FIG. 9 is a plan view that shows a portion of the display panel 7 from the opposite substrate 150 side. As shown in FIG. 9, the opposite substrate 150 includes a color filter substrate 151 and an opposite electrode 152 disposed on a lower surface of the color filter substrate 151.

The color filter substrate 151 includes a black matrix 155 formed in a grid pattern, and colored layers 153 formed within the frames of the black matrix 155 and made of materials respectively including red, green, and blue color pigments. One colored layer 153 is disposed per pixel 110, above the pixel 110.

The opposite electrode 152 is a transparent electrode made of ITO (indium tin oxide), for example.

Figure 10:
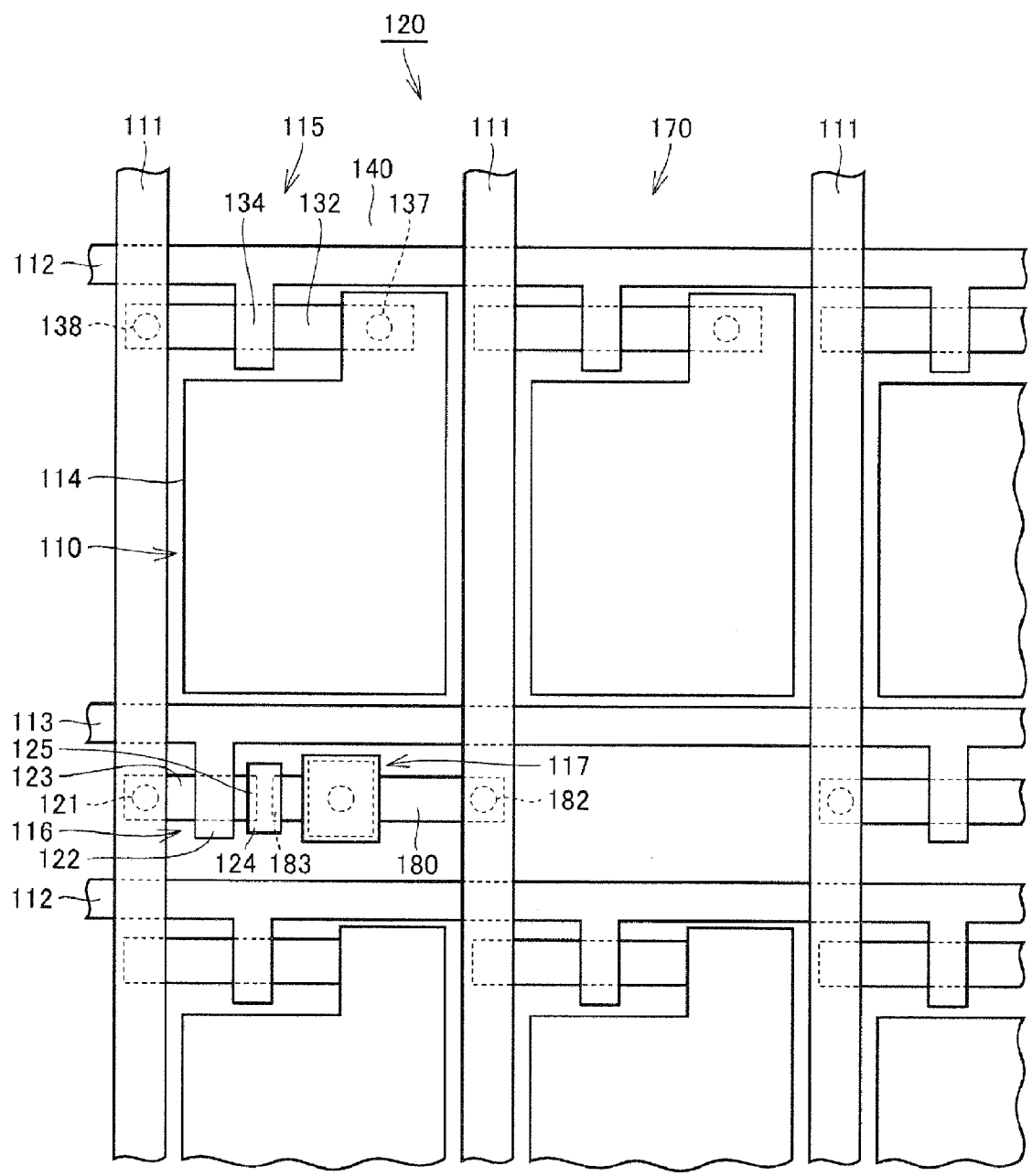
FIG. 10 is a plan view that shows an output element 117 and the like formed on an active matrix substrate 120.

FIG. 10 is a plan view of the active matrix substrate 120 disposed below the opposite substrate 150, and in FIGS. 9 and 10, the source wiring lines 111 and the gate wiring lines 112 are positioned below the black matrix 155. The selection TFT element 116 and the pressure detection element 119 are disposed on the side of the pixel electrode 114 opposite to the TFT element 115.

As shown in FIG. 10, the selection TFT element 116 includes a semiconductor layer 123, a source electrode 121 connected to the semiconductor layer 123 and the source wiring line 111, a gate electrode 122 connected to the sensor gate wiring line 113, and a drain electrode 125.

A source electrode 183 of the output element 117 and the drain electrode 125 of the selection TFT element 116 are connected to each other via a connecting wiring line 124. In the present embodiment, the semiconductor layer 123 of the selection TFT element 116 is separate from the semiconductor layer 180 of the output element 117 while the drain electrode 125 of the selection TFT element 116 is connected to the source electrode 183 of the output element 117 via the connecting wiring line 124, but the semiconductor layer 123 and the semiconductor layer 180 may be formed integrally so as to connect the drain electrode 125 and the source electrode 183.

Figure 11:
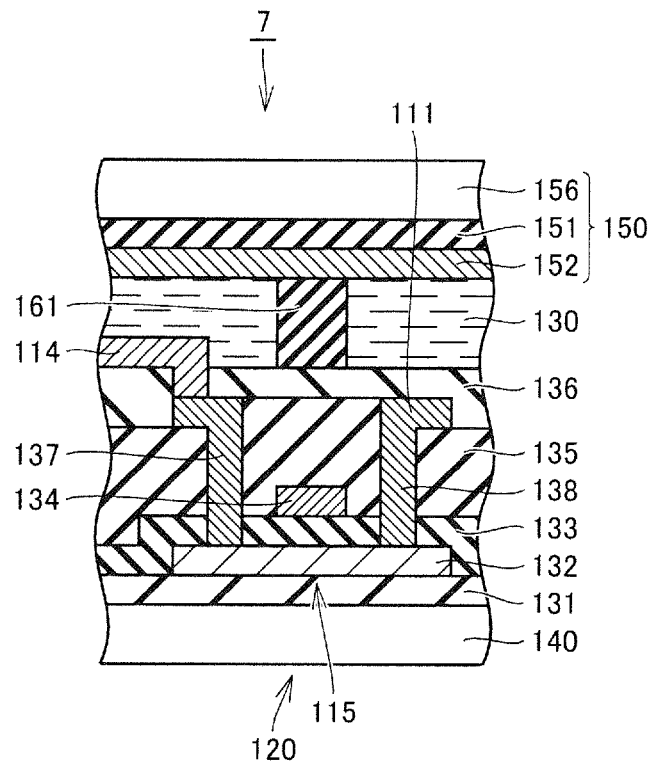
FIG. 11 is a cross-sectional view that schematically shows a cross-section of FIG. 9 along the line XI-XI.

FIG. 11 is a cross-sectional view that schematically shows a cross-section of FIG. 9 along the line XI-XI. The cross-sectional views shown in FIG. 11 and FIGS. 12, 13, and the like to be mentioned later are simplified for ease of explanation, and the length to width ratio and the like in each drawing is not to scale.

As shown in FIG. 11, the display panel 7 includes the active matrix substrate 120, the opposite substrate 150 disposed facing the active matrix substrate 120 with a gap therebetween, and a liquid crystal layer (display medium layer) 130 that fills the space between the opposite substrate 150 and the active matrix substrate 120. Between the active matrix substrate 120 and the opposite substrate 150, a spacer 161, which maintains a prescribed gap between the active matrix substrate 120 and the opposite substrate 150, is formed.

The two polarizing plates 20 and 22 are not shown in FIG. 11.

The opposite substrate 150 includes a glass substrate 156 with a main surface, a color filter substrate 151 formed on the main surface of the glass substrate 156, and the opposite electrode 152 formed below the color filter substrate 151.

The active matrix substrate 120 includes a glass substrate (first substrate) 140 that has a main surface (first main surface), and pixel electrodes 114 formed above the glass substrate 140, and TFT elements (switching elements) 115 are formed on the main surface of the glass substrate 140.

A base layer 131 constituted of an insulating layer such as a silicon oxide layer (SiO₂ layer), a silicon nitride layer (SiN), and a silicon nitroxide layer (SiNO layer) is formed on the main surface of the glass substrate 140. The thickness of the base layer 131 is between 0 nm and 500 nm inclusive, for example, and preferably between 0 nm and 400 nm inclusive.

The TFT element 115 includes a semiconductor layer 132 formed on an upper surface of the base layer 131, a gate insulating layer 133 formed so as to cover the semiconductor layer 132, a gate electrode 134 formed on an upper surface of the gate insulating layer 133, and a drain electrode 137 and a source electrode 138 connected to the semiconductor layer 132.

The gate electrode 134 is located over the semiconductor layer 132, on the upper surface of the gate insulating layer 133. The drain electrode 137 is disposed at a distance from the gate electrode 134. The source electrode 138 is on a side of the gate electrode 134 opposite to the drain electrode 137. The source electrode 138 is connected to the source wiring line 111, and the drain electrode 137 is connected to the pixel electrode 114.

When a prescribed voltage is applied to the gate electrode 134, the TFT element 115 turns ON, and when a prescribed voltage is applied to the source wiring line 111 and the source electrode 138, a prescribed voltage is applied to the drain electrode 137 and the pixel electrode 114.

The TFT element 115 switches the voltage applied to the pixel electrode 114, and thus, the orientation of the liquid crystal molecules in the liquid crystal layer 130 located between the pixel electrodes 114 and the opposite electrode 152 is controlled. By switching the orientation of the liquid crystal molecules, it is possible to switch between two states: a state in which light from a backlight unit passes through a polarizing plate disposed on an upper surface of the opposite substrate 150; and a state in which the light from the backlight unit is blocked by the polarizing plate disposed on the upper surface of the opposite substrate 150.

The semiconductor layer 132 is made of a continuous grain silicon film or the like, for example, and the thickness of the semiconductor layer 132 is 20 nm to 200 nm inclusive, for example. It is preferable that the thickness of the semiconductor layer 132 be approximately 30 nm to 70 nm inclusive.

The gate insulating layer 133 is made of an insulating layer such as SiO₂, SiN, and SiNO, for example. The thickness of the gate insulating layer 133 is between 20 nm and 200 nm inclusive, for example, and preferably between 50 nm and 120 nm inclusive.

The gate electrode 134 is a conductive layer made of a metal layer such as tungsten (W), tantalum (Ta), titanium (Ti), and molybdenum (Mo), an alloy thereof, or a compound or the like that includes an element such as tungsten (W), tantalum (Ta), titanium (Ti), and molybdenum (Mo), for example. The thickness of the gate electrode 134 is between 50 nm and 600 nm inclusive, for example, and is preferably between 100 nm and 500 nm inclusive.

An interlayer insulating layer 135 is formed on an upper surface of the gate insulating layer 133 so as to cover the gate electrode 134. The interlayer insulating layer 135 is made of an insulating layer such as SiO₂, SiN, and SiNO, for example. The thickness of the interlayer insulating layer 135 is between 100 nm and 1000 nm inclusive, for example, and is preferably between 100 nm and 700 nm inclusive.

The source wiring line 111 is located on the upper surface of the interlayer insulating layer 135, and the source electrode 138 is connected to the source wiring line 111. The drain electrode 137 is also formed so as to reach the upper surface of the interlayer insulating layer 135.

The source wiring line 111, the source electrode 138, and the drain electrode 137 may be made of a metal layer such as aluminum (Al), copper (Cu), gold (Au), and titanium (Ti), for example, or layered metal layers constituted of these metal layers layered in that order. The thickness of these source wiring lines 111 and the like is between 300 nm and 1000 nm inclusive, and is preferably between 400 nm and 800 nm inclusive.

An upper layer insulating layer 136 is formed on an upper layer of the interlayer insulating layer 135 so as to cover the source wiring line 111. The upper layer insulating layer 136 is made of an insulating layer such as SiO₂, SiN, and SiNO. The thickness of the upper layer insulating layer 136 is between 50 nm and 500 nm inclusive, for example, and is preferably between 50 nm and 200 nm inclusive.

The pixel electrode 114 is formed on an upper surface of the upper layer insulating layer 136. The pixel electrode 114 is made of a transparent conductive layer such as ITO.

Figure 12:
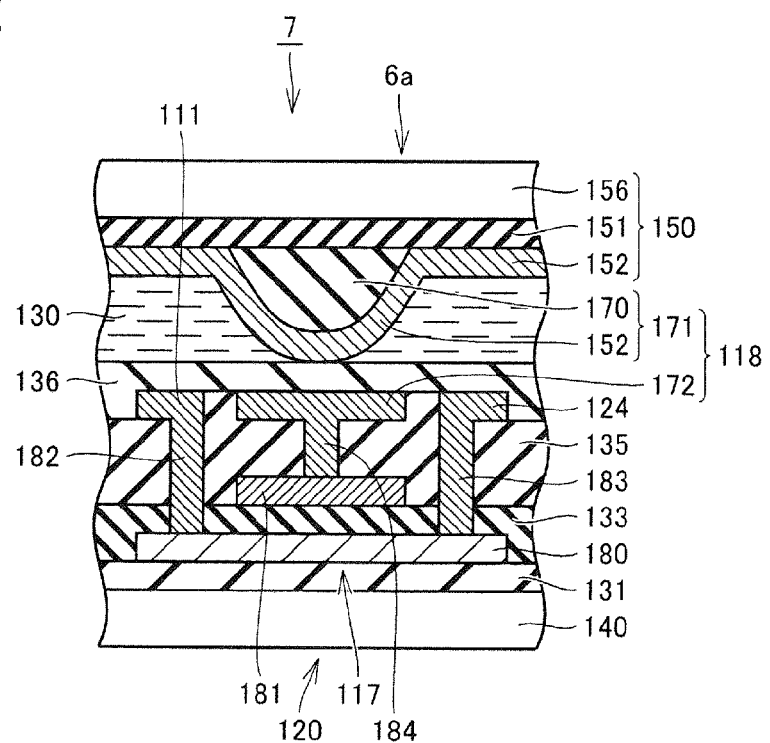
FIG. 12 is a cross-sectional view of FIG. 9 along the line XII-XII.

FIG. 12 is a cross-sectional view of FIG. 9 along the line XII-XII. As shown in FIG. 12, the base layer 131 is formed on the main surface of the glass substrate 140, and the output element 117 is formed on the upper surface of the base layer 131.

The output element 117 includes the semiconductor layer 180 formed on the base layer 131, the gate insulating layer 133 formed so as to cover the semiconductor layer 180, a gate electrode 181 formed on a part of the upper surface of the gate insulating layer 133 above the semiconductor layer 180, and the source electrode 183 and a drain electrode 182 connected to the semiconductor layer 180.

The source electrode 183 is disposed at a distance from the gate electrode 181, and the drain electrode 182 is disposed on a side of the gate electrode 181 opposite to the source electrode 183.

The interlayer insulating layer 135 is formed on the upper surface of the gate insulating layer 133 so as to cover the gate electrode 181.

The drain electrode 182 is connected to the source wiring line 111 formed on the upper surface of the interlayer insulating layer 135, passing through the gate insulating layer 133 and the interlayer insulating layer 135. The source electrode 183 is also formed so as to reach the upper surface of the interlayer insulating layer 135, passing through the gate insulating layer 133 and the interlayer insulating layer 135.

A lower electrode 172 and a connecting wiring line 124 are formed on the upper surface of the interlayer insulating layer 135. The connecting wiring line 124 is connected to the drain electrode 125 of the selection TFT element 116 shown in FIG. 10. The lower electrode 172 is connected to the gate electrode 181 via a contact 184. With this configuration, a voltage applied to the gate electrode 181 is determined by the potential of the lower electrode 172.

The upper layer insulating layer 136 is formed on the lower electrode 172. The lower electrode 172 is formed to have a flat surface. At least a part of the upper layer insulating layer 136 located on the lower electrode 172 is formed to have a flat surface along the upper surface of the lower electrode 172.

The pressure sensor (pressure detection device) 118 includes the lower electrode 172 and an upper electrode 171 located above the lower electrode 172.

In the present embodiment, the upper electrode 171 is formed at the opposite substrate 150, and the upper electrode 171 is constituted of a protrusion 170 formed below the color filter substrate 151 and the opposite electrode 152 formed so as to cover the surface of the protrusion 170.

The protrusion 170 is made of an elastically deformable material such as an acrylic resin or a plastic resin, for example. The protrusion 170 may be made of an elastically deformable conductive resin.

The height of the protrusion 170 is between 1 μm and 10 μm inclusive, for example. The height of the protrusion 170 is preferably between 1.5 μm and 5 μm inclusive.

As shown in the example of FIG. 12, the part of the opposite electrode 152 corresponding to a peak of the protrusion 170 is in contact with the upper layer insulating layer 136.

In the present embodiment, the protrusion 170 is formed such that a cross-section thereof perpendicular to the protruding direction is circular, and the surface of the protrusion 170 has a smooth curved surface. As shown in FIG. 9, there are a plurality of protrusions 170 formed with gaps therebetween.

The shape of the protrusion 170 is not limited to the above-mentioned shape. For example, the protrusion 170 may be formed so as to extend over the lower electrodes 172 of the plurality of pressure sensors 118. The shape of the protrusion 170 is not limited to a circular cross-section, and furthermore, the outer surface thereof is not limited to a smooth curve.

Figure 13:
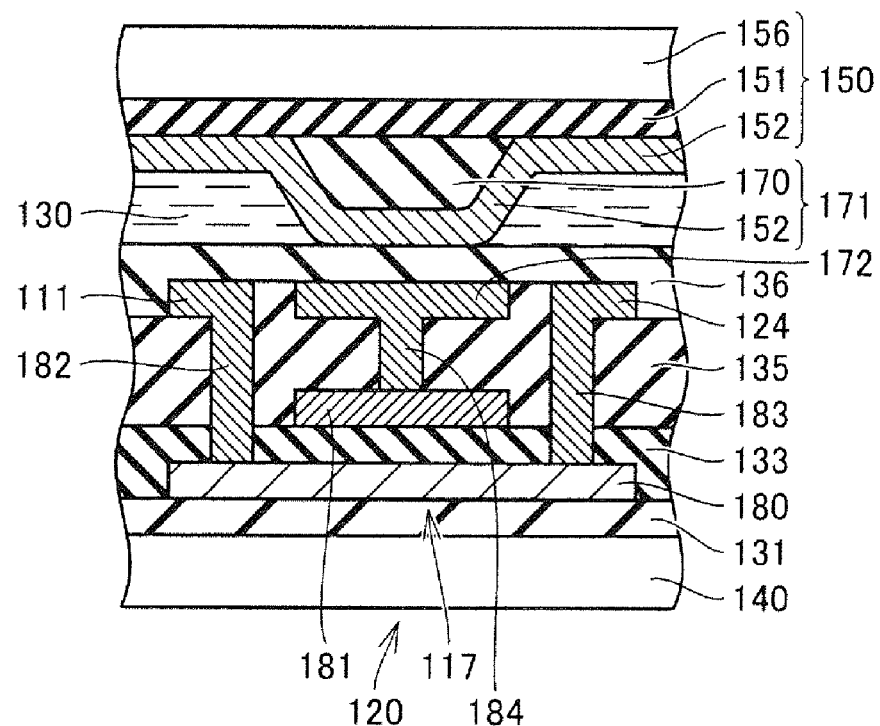
FIG. 13 is a cross-sectional view of the display panel 7 when the opposite substrate 150 is pressed.

FIG. 13 is a cross-sectional view of the display panel 7 when the opposite substrate 150 is pressed. As shown in FIG. 13, when pressed by a stylus or a finger of a person, the pressed part and the vicinity thereof of the opposite substrate 150 warp.

As the glass substrate 156 deforms, the upper electrode 171 becomes closer to the lower electrode 172. As the upper electrode 171 becomes closer to the lower electrode 172, the upper electrode 171 is pressed against the upper layer insulating layer 136, causing the protrusion 170 to be elastically deformed, making the upper electrode 171 deform along the lower electrode 172.

Figure 14:
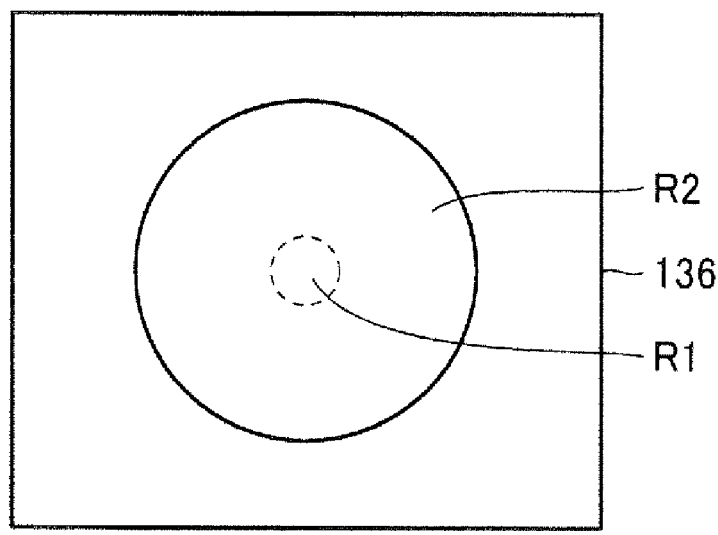
FIG. 14 is a plan view that schematically shows a region where an upper electrode 171 comes into contact with an upper layer insulating layer 136.

FIG. 14 is a plan view that schematically shows a region where the upper electrode 171 comes into contact with the upper layer insulating layer 136. In FIG. 14 a region R1 is a region surrounded by a broken line in FIG. 14, and a region R2 is a region surrounded by a solid line. The region R1 shows the contact region between the upper electrode 171 and the upper layer insulating layer 136 in a state in which the opposite substrate 150 is not pressed (initial state).

The region R2 shows a contact region between the upper electrode 171 and the upper layer insulating layer 136 in the state shown in FIG. 13. As shown in FIG. 14, as the upper electrode 171 is slightly displaced, the area of contact between the upper electrode 171 and the upper layer insulating layer 136 is greatly increased.

In the part where the upper electrode 171 is in contact with the upper layer insulating layer 136, the upper electrode 171 and the lower electrode 172 are both in contact with the upper layer insulating layer 136, and the gap between the upper electrode 171 and the lower electrode 172 is equal to the thickness of the upper layer insulating layer 136.

Specifically, the distance between the opposite electrode 152 located on the surface of the upper electrode 171, and the lower electrode 172, is equal to the thickness of the upper layer insulating layer 136.

With this configuration, the capacitance between the upper electrode 171 and the lower electrode 172 in the state shown in FIG. 13 is much greater than the capacitance between the upper electrode 171 and the lower electrode 172 in the initial state shown in FIG. 12.

Figure 15:
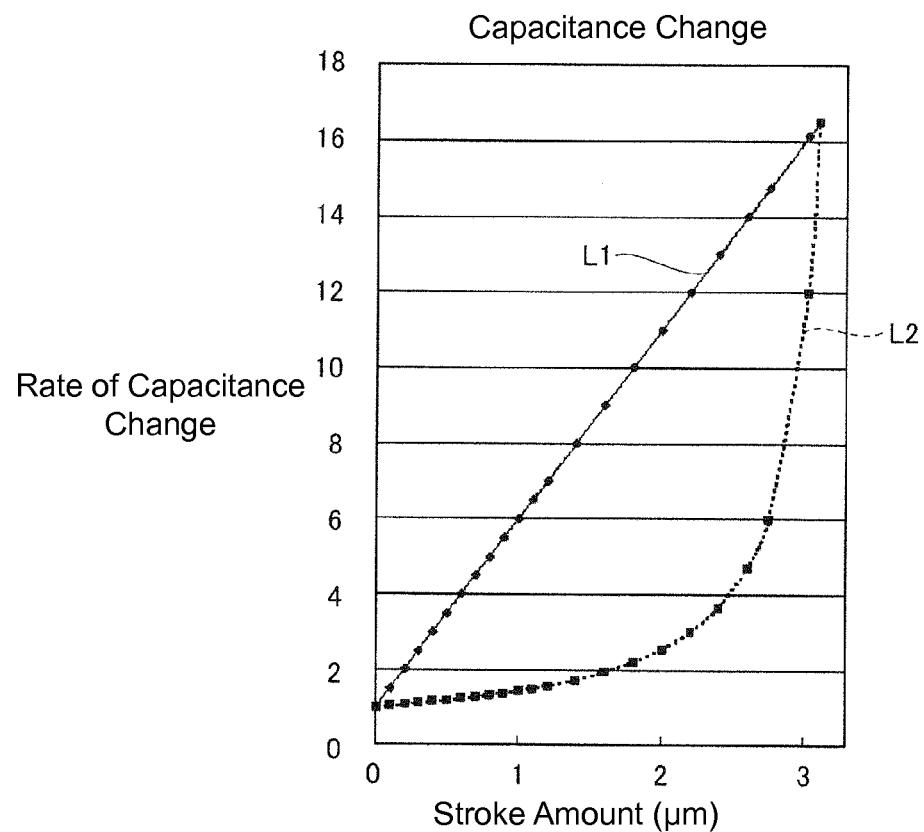
FIG. 15 is a graph that compares properties of a pressure sensor 118 according to the present embodiment, and properties of a pressure sensor of another example.

FIG. 15 is a graph that compares a property of the pressure sensor 118 of the present embodiment and a property of a pressure sensor of another example.

In the graph shown in FIG. 15, the horizontal axis is the stroke amount of the upper electrode, and the vertical axis is the rate of capacitance change between the upper electrode and the lower electrode. The solid line L1 in the graph shows the property of the pressure sensor of the present embodiment, and the broken line L2 shows the property of the pressure sensor of the other example.

Figure 16:
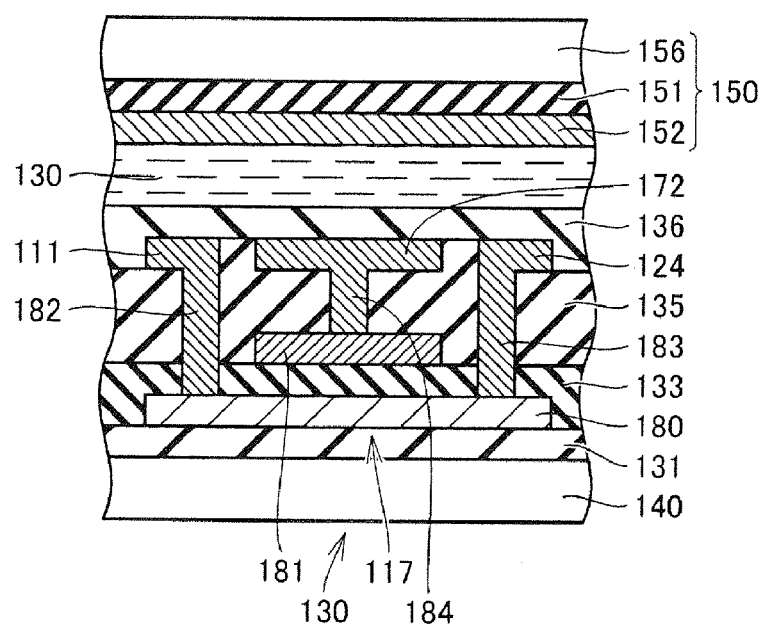
FIG. 16 is a cross-sectional view that shows a display device that includes a pressure sensor of the other example.

FIG. 16 is a cross-sectional view that shows a display device that includes the pressure sensor of the other example. Unlike the pressure sensor 118 of the present embodiment, the pressure sensor of the other example shown in FIG. 16 does not include a protrusion 170. Thus, the pressure sensor of the other example includes an opposite electrode 152 formed to have a flat surface on the lower surface of a color filter substrate 151, and a lower electrode 172.

The distance between an opposite substrate 150 and an active matrix substrate 120 of the other example, and the distance between the opposite substrate 150 and the active matrix substrate 120 of the present embodiment are both 3.3 μm.

In the other example, when the opposite substrate 150 is pressed, the opposite electrode 152 approaches the lower electrode 172. As the distance between the opposite electrode 152 and the lower electrode 172 becomes smaller, the capacitance between the opposite electrode 152 and the lower electrode 172 becomes greater.

As shown in FIG. 15, when the amount of change (stroke amount) of the upper electrode is small, the rate of capacitance change of the pressure sensor of the other example is smaller than the rate of capacitance change of the pressure sensor 118 of the present embodiment.

In the pressure sensor of the other example, when the pressure on the opposite substrate 150 is small, it is difficult to accurately detect the change in capacitance, and thus, it is difficult to accurately detect the amount of pressure applied thereon.

On the other hand, as shown in FIG. 15, in the pressure sensor 118 of the present embodiment, even if the stroke amount of the upper electrode is small, the rate of capacitance change is high. Thus, in the pressure sensor 118 of the present embodiment, even if the stroke amount of the upper electrode is small, it is possible to greatly change the amount of voltage applied to the gate electrode 181 shown in FIG. 15. Thus, it is possible for the control part to accurately detect the amount of pressure applied.

In the pressure sensor of the other example, if the stroke amount exceeds a prescribed value, the rate of capacitance change undergoes a dramatic increase. In the range in which the capacitance changes dramatically, even if the distance between the upper electrode and the lower electrode shrinks slightly, the capacitance changes dramatically. As a result, in the range in which the capacitance undergoes a dramatic change, the amount of voltage applied to the gate electrode of the output element also changes dramatically, which causes great variation in the amount of current from the output element 117. As a result, it is difficult for the control part to calculate an accurate pressure.

On the other hand, with the pressure sensor 118 of the present embodiment, even if the stroke amount increases, the rate of capacitance change is substantially constant. Thus, in the pressure sensor 118 of the present embodiment, because the rate of capacitance change is substantially constant, the pressure applied can be calculated with ease based on the capacitance between the upper electrode and the lower electrode, and it is possible to calculate an accurate applied pressure.

In this manner, the pressure sensor 118 of the present embodiment includes the lower electrode 172, the upper electrode 171 disposed facing the lower electrode 172 with a gap therebetween, and the upper layer insulating layer (insulating layer) 136 formed between the upper electrode 171 and the lower electrode 172, and the upper electrode 171 is formed on the surface of the elastically deformable protrusion 170. With the protrusion 170 in contact with the upper layer insulating layer 136 and being pressed against the upper layer insulating layer 136, the opposite electrode 152 on the protrusion 170 deforms along the lower electrode 172. The capacitance between the lower electrode 172 and the upper electrode 171 changes while maintaining a constant rate of change at a prescribed value. Thus, by detecting the amount of current from the output element 117, it is possible to detect the capacitance between the upper electrode 171 and the lower electrode 172, and therefore, it is possible to accurately calculate the applied pressure.

The display panel 7 of Embodiment 1 has the pressure sensor 118 that can accurately output changes in capacitance, and thus, even if the opposite substrate 150 does not warp greatly, it is possible to accurately calculate the amount of pressure applied to the opposite substrate 150. Thus, even if the glass substrate 156 of the opposite substrate 150 is thicker than the glass substrate 140, it is possible to calculate the amount of applied pressure. Thus, it is possible to increase the rigidity of the opposite substrate 150.

The advantages of the pressure sensor shown in FIG. 13 and the like were described using FIG. 16, but a pressure sensor of the other example shown in FIG. 16 is not excluded, and may be used.

In addition, in the example shown in FIG. 13, the upper electrode of the pressure sensor is formed integrally with the opposite electrode, but the upper electrode and the opposite electrode may be formed separately.

Figure 17:
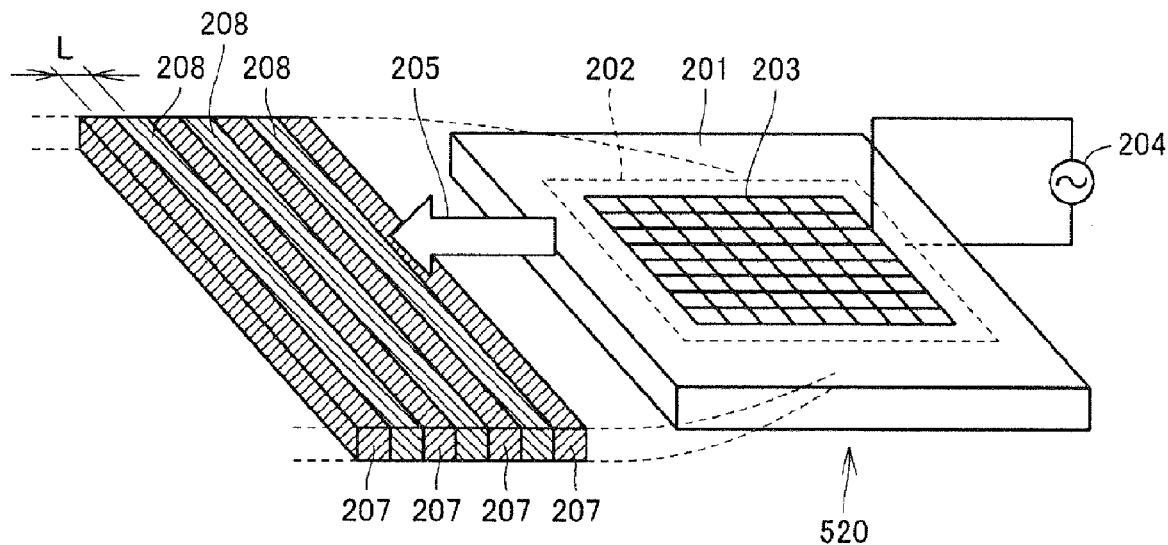
FIG. 17 is a perspective view that schematically shows an ion-generating device.
Figure 18:
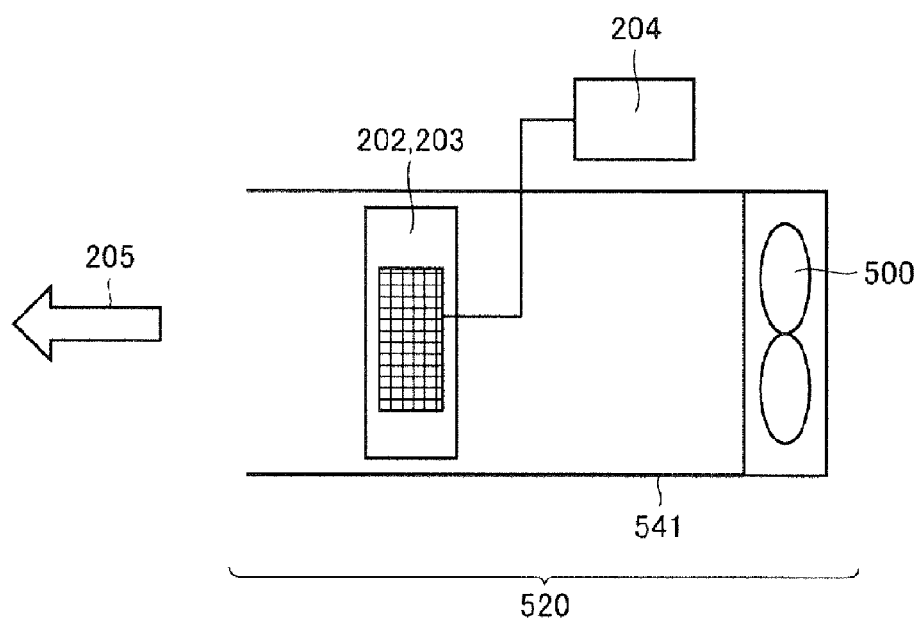
FIG. 18 is a schematic drawing that schematically shows an ion-generating device.

The ion-generating device 520 will be described with reference to FIGS. 17 to 19. The ion-generating device 520 installed in the liquid crystal display device 2 of the present embodiment can switch between the following settings: a setting with an increased "sterilization function"; and a setting with an increased "antistatic function".

First, a method for switching between the setting with the increased "sterilization function" and the setting with the increased "antistatic function" will be summarized.

The ion-generating device 520 generates positive ions and negative ions alternately, and the positive ions and negative ions generated thereby flow along an airflow direction 205 of air from the fan 500. As a result, an air region 207 with a high concentration of positive ions and an air region 208 with a high concentration of negative ions are alternately formed in the airflow direction 205. The ion-generating device 520 can switch between the setting with the increased "sterilization function" and the setting with the increased "antistatic function" by adjusting a distance L between the center of the air region 207 and the center of the air region 208.

The "sterilization function" refers to a function that affects bacteria, viruses, and allergens so as to mitigate their activity or effects or that changes harmful chemicals or the like so as to mitigate the harmfulness thereof, and the "antistatic function" refers to a function in which microbes or dust attached to an object such as a wall or clothes are removed from the object by eliminating static electricity. Also, the "setting with the increased sterilization function" has both the sterilization function and the antistatic function but has a higher sterilization function, and the "setting with the increased antistatic function" has both the sterilization function and the antistatic function but has a higher antistatic function.

Switching between these settings occurs by changing the distance between the air regions 207 and the air regions 208. In other words, if the distance between the air region 207 and the air region 208 in the setting with an increased sterilization function is L1, and the distance between the air region 207 and the air region 208 in the setting with the increased antistatic function is L2, then it is possible to switch between the setting with an increased sterilization function and the setting with an increased antistatic function by switching between L1 and L2.

In the present invention, it is preferable that ions be discharged in the air so as to fulfill L1<L2. In the present invention, L1 is generally set within a range of 1 μm to less than 1 mm, and L2 is generally set within a range of 1 mm to 1000 mm.

A configuration of the ion-generating device 520 that allows switching between the setting with the increased "sterilization function" and the setting with the increased "antistatic function" in this manner will be described.

The ion-generating device 520 includes an alumina dielectric body 201, an electrode 202 embedded in the alumina dielectric body 201, an electrode 203 formed on the surface of the alumina dielectric body 201, and a high voltage alternating current voltage pulse generator 204 that applies a voltage to the electrode 202 and the electrode 203.

The high voltage alternating current pulse generator 204 applies positive and negative voltages periodically as alternating current pulses. Although the applied voltage and the peak-to-peak voltage have no special limitation, in the present embodiment, the frequency of the voltage is 20 kHz, and the peak-to-peak voltage is 3 kV for positive and negative, respectively.

With the above-mentioned voltage applied to the electrodes 202 and 203, positive ions and negative ions are discharged to a space from the electrode 202 alternately at a frequency of 20 kHz.

As for positive ions, $H^+(H_2O)_m$ is a main component generated, and as for negative ions, $O^{2-}(H_2O)_n$ is a main component generated (with m and n being natural numbers), but in general, ions discharged from the discharge electrode can be changed in terms of type by adjusting the discharge voltage and the electrode structure.

Therefore, "positive ions" in the present specification include not only $H^+(H_2O)_m$, but also ions such as $H_2O^+$, $H_3O^+$, $N_2^+$, $O_2^+$, and $CO_2^+$, for example, and "negative ions" in the present specification include not only $O^{2-}(H_2O)_n$, but also ions such as $OH^-$, $H_2O^-$, $O_3^-$, $O_2^-$, $NO_2^-$, $N_2^-$, $NO_3^-$, $CO_2^-$, and $CO_3^-$, for example.

As for ions with sterilization properties, $H^+(H_2O)_m$ as the main positive ion, and $O^{2-}(H_2O)_n$ as the main negative ion can be suitably used. These ions undergo chemical reactions with the surfaces of airborne microbes and airborne viruses and generate radicals (—OH) or hydrogen peroxide ($H_2O_2$)

as active species, which kill airborne microbes and render airborne viruses inactive by pulling hydrogen atoms from proteins on the surfaces of the airborne microbes and airborne viruses.

The discharged negative ions and positive ions are respectively sent in the airflow direction 205 of air from the fan 500.

As a result, the air region 207 with a high concentration of positive ions, and the air region 208 with a high concentration of negative ions are sequentially sent periodically in a row.

When increasing the "sterilization function", for example, the frequency of the voltage applied to the electrode 202 and the electrode 203 is 20 kHz. At this time, the period at which the positive ions and negative ions are discharged is 25 µs.

When the airflow speed of air in the vicinity of the electrodes 202 and 203 is 1 m/s, for example, then the distance L1 between the positive ion-rich air region 207 and the negative ion-rich air region 208 is 0.025 mm.

In this manner, the distance L1 between the air region rich in positive ions and the air region rich in negative ions, the positive and negative ions being discharged by the discharge device, is relatively short, which means that ions in the air quickly bond with each other. The bond energy generated by ions or in other words charged particles bonding, or the energy of generated radicals acts on airborne microbes or dust or the like to which airborne microbes are attached, thus killing the microbes or changing the properties thereof to a greater degree.

Next, when increasing the "antistatic function", the frequency of the voltage applied to the electrode 202 and the electrode 203 is decreased. FIG. 19 is a graph that schematically shows voltage pulses applied to the electrodes 202 and 203.

Figure 19:
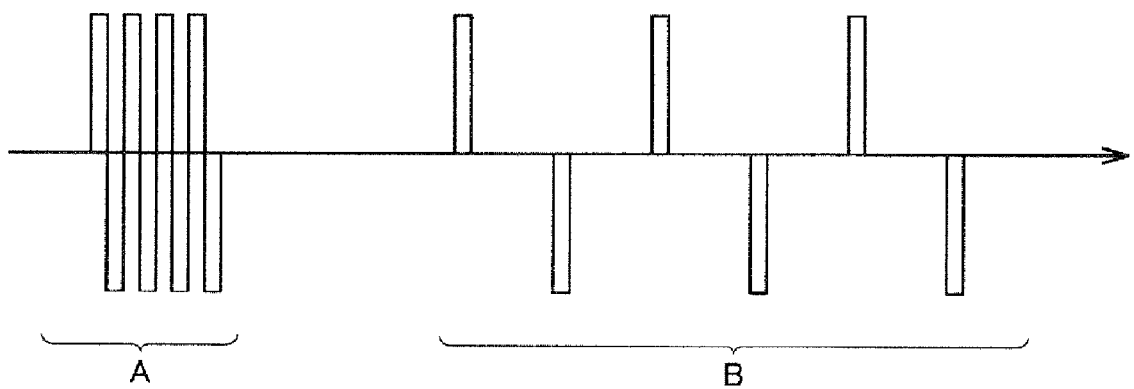
FIG. 19 is a graph that schematically shows voltage pulses applied to electrodes 202 and 203.

In FIG. 19, "A" is the group of voltage pulses for when the "sterilization function" is increased, and "B" is the group of voltage pulses for when the "antistatic function" is increased.

By changing the frequency of voltage applied to the electrodes 202 and 203, it is possible to increase the distance between the air region 207 and the air region 208, thus increasing the "antistatic function".

In the setting with the increased "antistatic function", by applying a positive voltage pulse or a negative voltage pulse to the electrode 202 and the electrode 203, it is possible to generate only positive ions or only negative ions.

Figure 20:
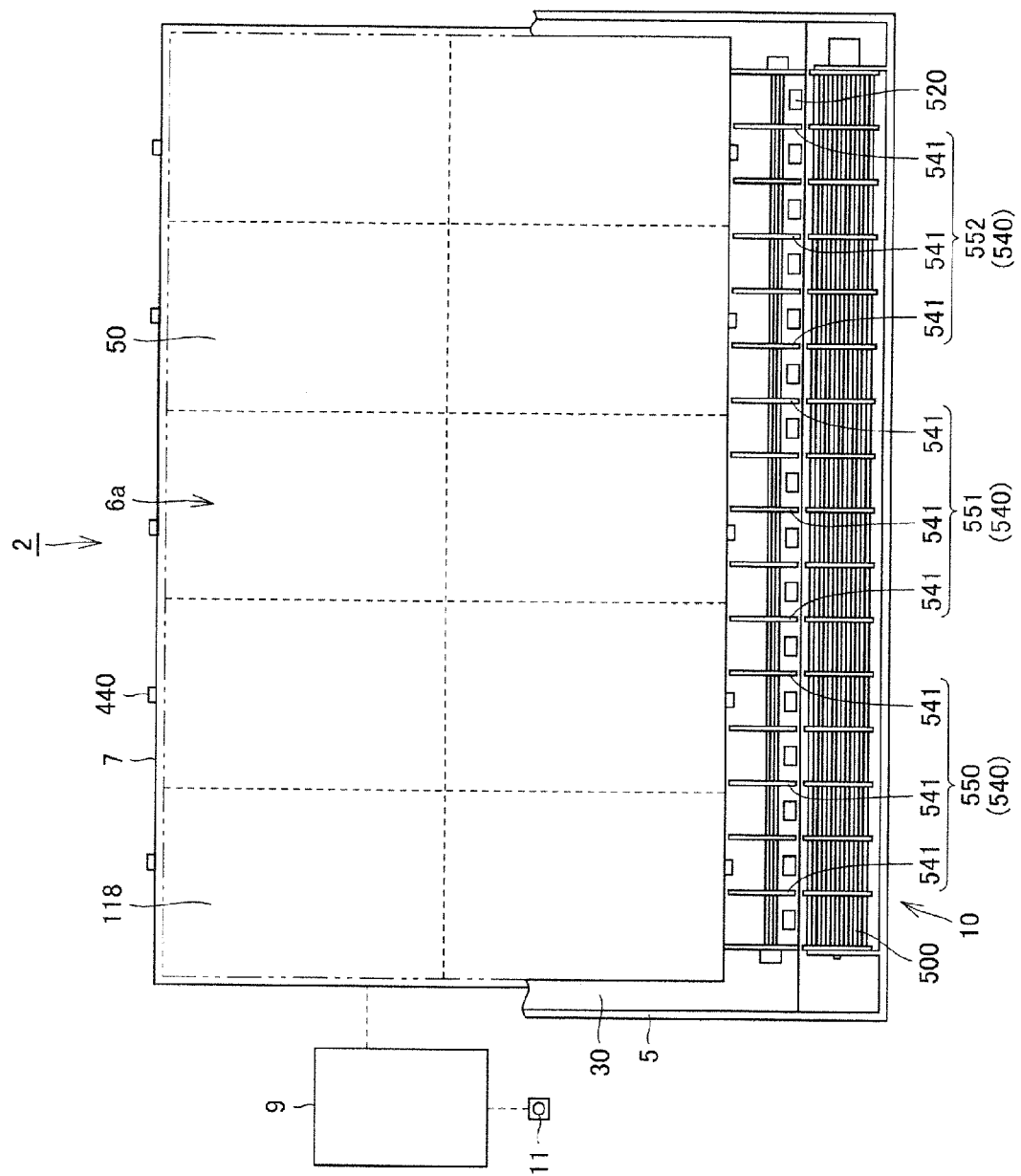
FIG. 20 is a front view that schematically shows a liquid crystal display device.
Figure 21:
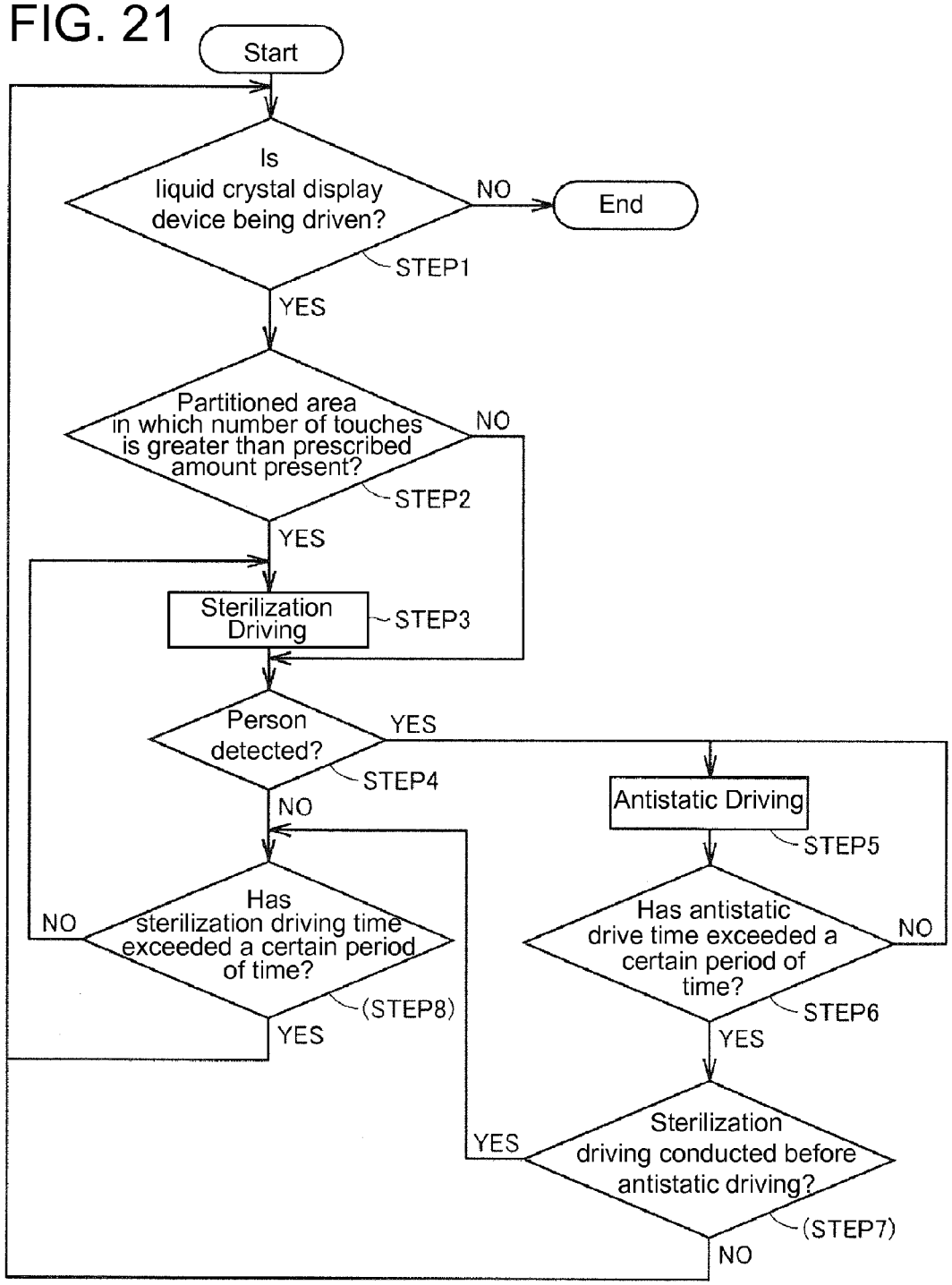
FIG. 21 is a flowchart that shows a control flow of a control part 9.

FIG. 20 is a front view that schematically shows a liquid crystal display device, and FIG. 21 is a flowchart that shows a control flow of the control part 9.

As stated above, the liquid crystal display device 2 according to the present embodiment includes the ion discharge module 10 that blows ions towards the display surface 6a, the control part 9 that controls the driving of the ion discharge module 10, and the human presence sensor 11 that can sense whether or not a person is in the vicinity of the display surface 6a.

The ion discharge module 10 includes the ion-generating device 520 that can switch between the "antistatic function" and the "sterilization function", the fan 500, and the first louvers 540 that control the direction that the air and ions flow from the fan 500.

The control part 9 determines whether the liquid crystal display device 2 is being driven (STEP 1). If the liquid crystal display device 2 is being driven, the control part 9 determines whether or not a target partitioned area exists in which the number of touches has exceeded a prescribed value (STEP 2). The prescribed value can be appropriately changed, and may be 1. The control part 9 stores the number of touches per partitioned area 50, and designates the partitioned area 50 where the number of touches has exceeded the prescribed number as the target partitioned area.

Specifically, the control part 9 sets a plurality of partitioned areas 50 in the display surface 6a. In the example shown in FIG. 20, there are 10 partitioned areas 50 in the display surface 6a, but the number of partitioned areas 50 is not limited thereto. Each partitioned area 50 is provided with a charge sensor 440.

The control part 9 stores the number of touches per partitioned area 50 based on the output signal from the pressure sensors 118.

When the control part 9 detects a target partitioned area in which the number of touches has exceeded the pre-set number of touches, it causes the ion discharge module 10 to conduct sterilization driving. If there are no target partitioned areas in which the prescribed number of touches has been exceeded, then the control part 9 determines whether or not a person is present in the vicinity.

During sterilization driving, the control part 9 drives the first louvers 540 such that ions are blown in the target partitioned area where the number of touches has exceeded the prescribed value.

Figure 22:
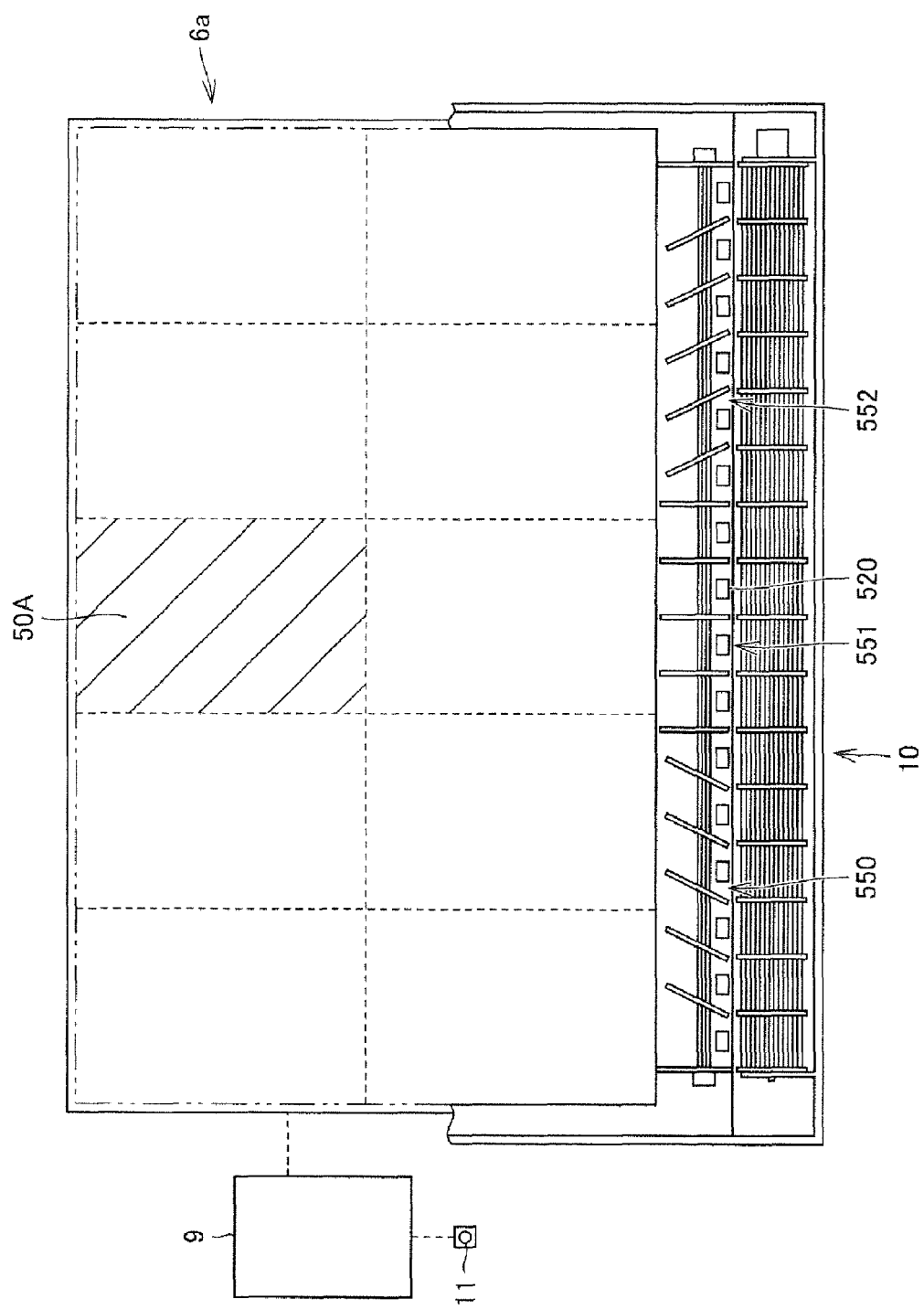
FIG. 22 is a front view that schematically shows a liquid crystal display device when a partitioned area 50A is cleaned.

In FIG. 22, the partitioned area 50A is the target partitioned area where the number of touches has exceeded the prescribed value, for example. In this case, the ion discharge module 10 causes each partitioned louver 550, 551, and 552 to face the partitioned area 50A. In addition, the control part 9 sets the ion-generating devices 520 to the sterilization setting in which the "sterilization function" is increased. As a result, the partitioned area 50A is effectively cleaned (STEP 3).

The control part 9 detects whether or not a person is present in the vicinity of the liquid crystal display device 2 based on output from the human presence sensor 11 (STEP 4).

When a person is detected, the control part 9 stops the sterilization driving of the ion discharge module 10 and causes the ion discharge module 10 to conduct antistatic driving.

During antistatic driving, as shown in FIG. 20, the control part 9 drives the first louvers 540 so as to blow ions to the entire display surface 6a substantially evenly. In addition, the control part 9 switches the setting of the ion-generating devices 520 to the setting with the increased "antistatic function" (STEP 5). At this time, if the display surface 6a is determined to be negatively charged based on output from the charge sensors 440, the control part 9 supplies positive ions to the display surface 6a. If the display surface 6a is positively charged, the control part 9 supplies negative ions to the display surface 6a.

Thus, it is possible to eliminate static electricity on the surface of the display surface 6a, thus mitigating the attraction of dust and the like on the clothes of a person or kicked up by a passing person to the display surface 6a.

In addition, by eliminating static electricity on the display surface 6a, it is possible to mitigate errors in the operation of the pressure sensors 118, but details thereof will be described later.

The control part 9 continues "antistatic driving" until a prescribed amount of time has passed since starting the "antistatic driving" (STEP 6).

After the "antistatic driving" has been conducted for a prescribed amount of time, the control part 9 determines whether or not "sterilization driving" has been conducted before the "antistatic driving" (STEP 7). If the "sterilization driving" has not been conducted before the "antistatic driving", then the control part 9 returns to "STEP 1".

If "sterilization driving" has been conducted before the "antistatic driving", then the control part 9 determines whether or not the total amount of time that the "sterilization driving" was conducted has exceeded a prescribed amount of time (STEP 8). If the total amount of time has not exceeded the prescribed amount of time, then "sterilization driving" is conducted.

If the total driving time for the "sterilization driving" has exceeded the prescribed amount of time, then the control part 9 returns to "STEP 1".

In this way, in the liquid crystal display device 2 of Embodiment 1, it is possible to clean the partitioned areas 50 where the number of touches has exceeded the prescribed number of touches. In addition, it is possible to mitigate dust and the like being attracted to the display surface 6a. By blowing more ions towards an operating section displayed on the display surface 6a, it is possible to effectively clean regions of the display surface 6a where a user is most likely to touch.

In addition, as will be described below, it is possible to mitigate errors in the operation of the pressure sensor 118 shown in FIG. 12 by eliminating static electricity in the display surface 6a.

In FIG. 20, the static electricity on the display surface 6a is usually not evenly distributed on the display surface 6a, and there are variations in the distribution of static electricity. As a result, it is possible for differences to emerge in the amount of charge stored in different parts of the opposite electrode 152, for example. If differences appear in the amount of charge stored in different places on the opposite electrode 152, this results in differences in the amount of charge stored for each lower electrode 172.

If differences in the amount of charge stored in the lower electrodes 172 occur, an ON current may flow to the output element 117 even if a user has not touched the display surface 6a, or an ON current may not flow to the output element 117 even if a user has touched the display surface 6a, for example.

As a countermeasure, the liquid crystal display device 2 of Embodiment 1 can eliminate static electricity in the display surface 6a, thus mitigating errors in the operation of the pressure sensors 118. In addition, variations in output from the pressure sensors 118 can be mitigated, and it is possible to accurately detect pressure applied on the opposite substrate 150.

In Embodiment 1, an example in which the pressure sensor 118 is installed as the touch sensor was described, but the touch sensor is not limited thereto.

For example, a capacitive change-type touch sensor in which capacitance generated between the lower electrode 172 and a finger of a user is sensed can be used as the touch sensor.

With a capacitive change-type touch sensor also, it is possible that changes in capacitance between a finger and the lower electrode 172 cannot be detected accurately depending on the distribution of static electricity on the display surface 6a. By eliminating static electricity on the display surface 6a, it is possible to detect changes in capacitance accurately even with such a capacitance change-type touch sensor.

Figure 23:
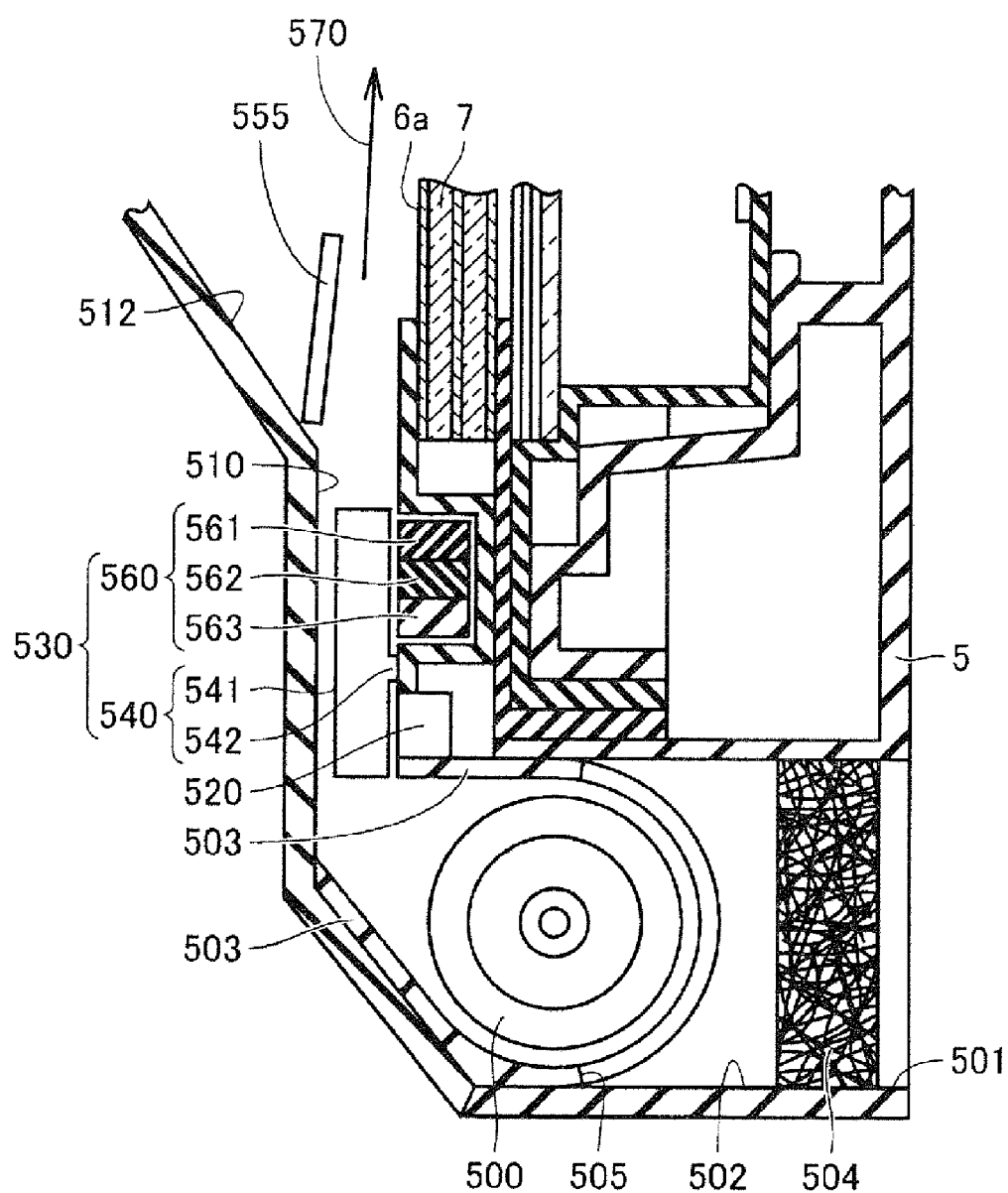
FIG. 23 is a cross-sectional view that shows a modification example of an ion discharge module 10.
Figure 24:
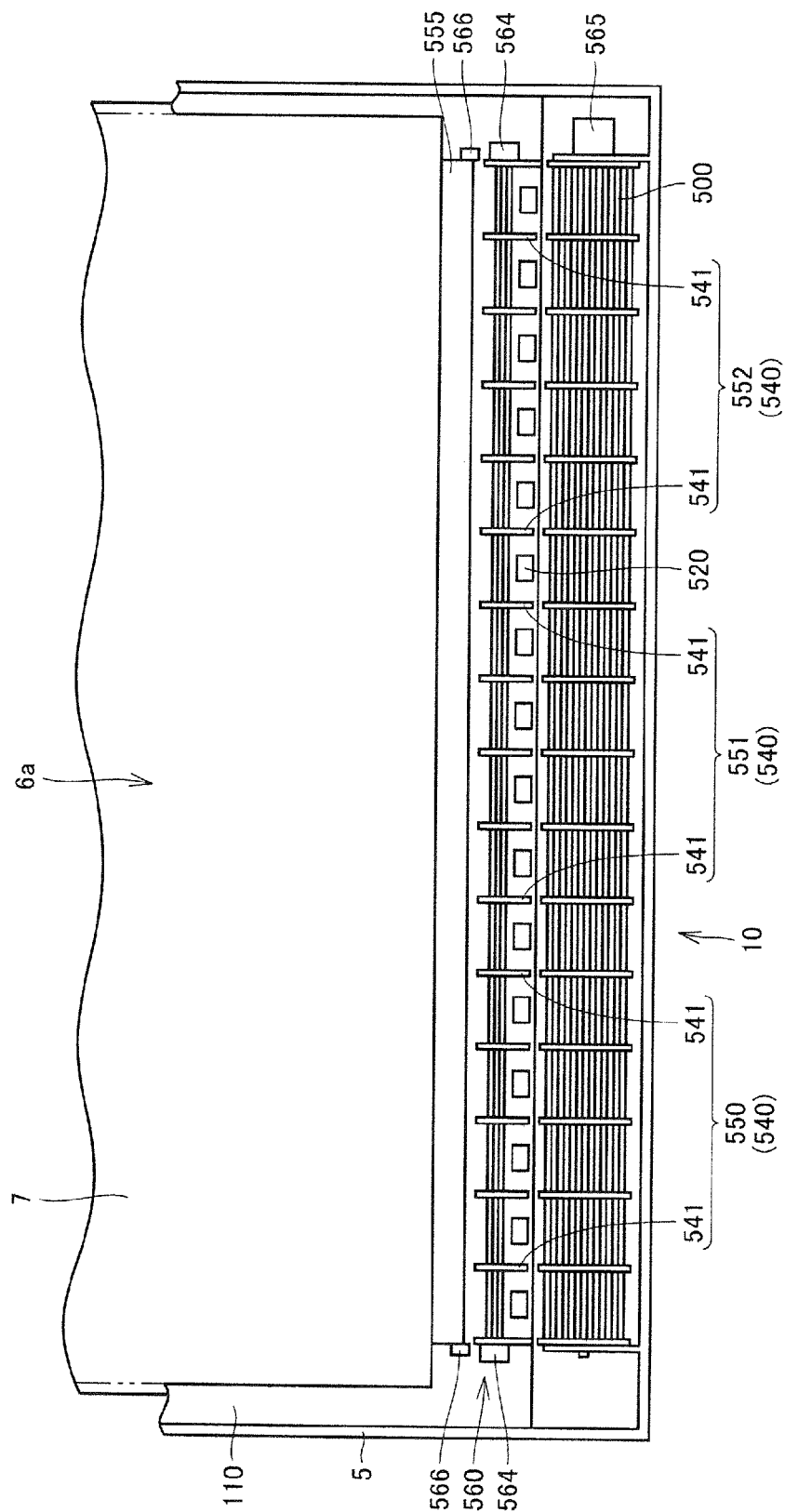
FIG. 24 is a front view of the ion discharge module 10 shown in FIG. 23.

FIG. 23 is a cross-sectional view that shows a modification example of an ion discharge module 10. FIG. 24 is a front view that shows the ion discharge module 10 shown in FIG. 23.

In the example shown in FIGS. 23 and 24, the ion discharge module 10 includes a second louver 555 in addition to the first louvers 540, and a divergent part 512 is formed on the end of the outtake pipe 510.

As shown in FIG. 24, on both ends of the second louver 555, rotating mechanisms 566 are provided in order to rotate the second louver 555.

By adjusting the rotating angle of the second louver 555, it is possible to adjust the direction at which air from the fan 500 and ions generated by the ion-generating device 520 is sent. Specifically, an angle between an airflow direction 570 of air blown by the ion discharge module 10 and the display surface 6a can be adjusted.

For example, if ions are to be focused towards a region of the display surface 6a in the vicinity of the air outlet of the ion discharge module 10, then the second louver 555 is rotated so as to increase the angle formed between the airflow direction 570 shown in FIG. 23 and the display surface 6a.

On the other hand, if ions and air are to be blown towards a region of the display surface 6a away from the air outlet of the ion discharge module 10, then the second louver 555 is rotated so as to decrease the angle between the airflow direction 570 and the display surface 6a.

If effective cleaning of the air surrounding the liquid crystal display device 2, and not just the display surface 6a, is desired, then the second louver 555 is rotated until it comes into contact with an inner wall of the divergent part 512. As a result, ions generated by the ion-generating device 520 are spread over a wide range, which allows the air surrounding the liquid crystal display device 2 to be more effectively cleaned.

A case in which ions are focused towards the partitioned areas 50 where the number of touches has exceeded a prescribed value has been described, but ions may be focused towards specific regions where an operating section such as buttons, pictograms, and the like are displayed in the display surface 6a. The control part 9 stores image data to be displayed in the display surface 6a, and has data relating to the size of the operating section to be displayed and the coordinates thereof. The control part 9 may drive the ion discharge module 10 such that ions are focused towards the operating section such as buttons to be displayed on the display surface 6a based on such image data.

(Embodiment 2)

A liquid crystal display device 2 of Embodiment 2 will be described with reference to FIGS. 25 to 29, and, as appropriate, FIGS. 1 to 24. Of the configurations shown in FIGS. 25 to 29, configurations that are the same or correspond to those of FIGS. 1 to 24 may be assigned the same reference characters with descriptions thereof being omitted.

Figure 25:
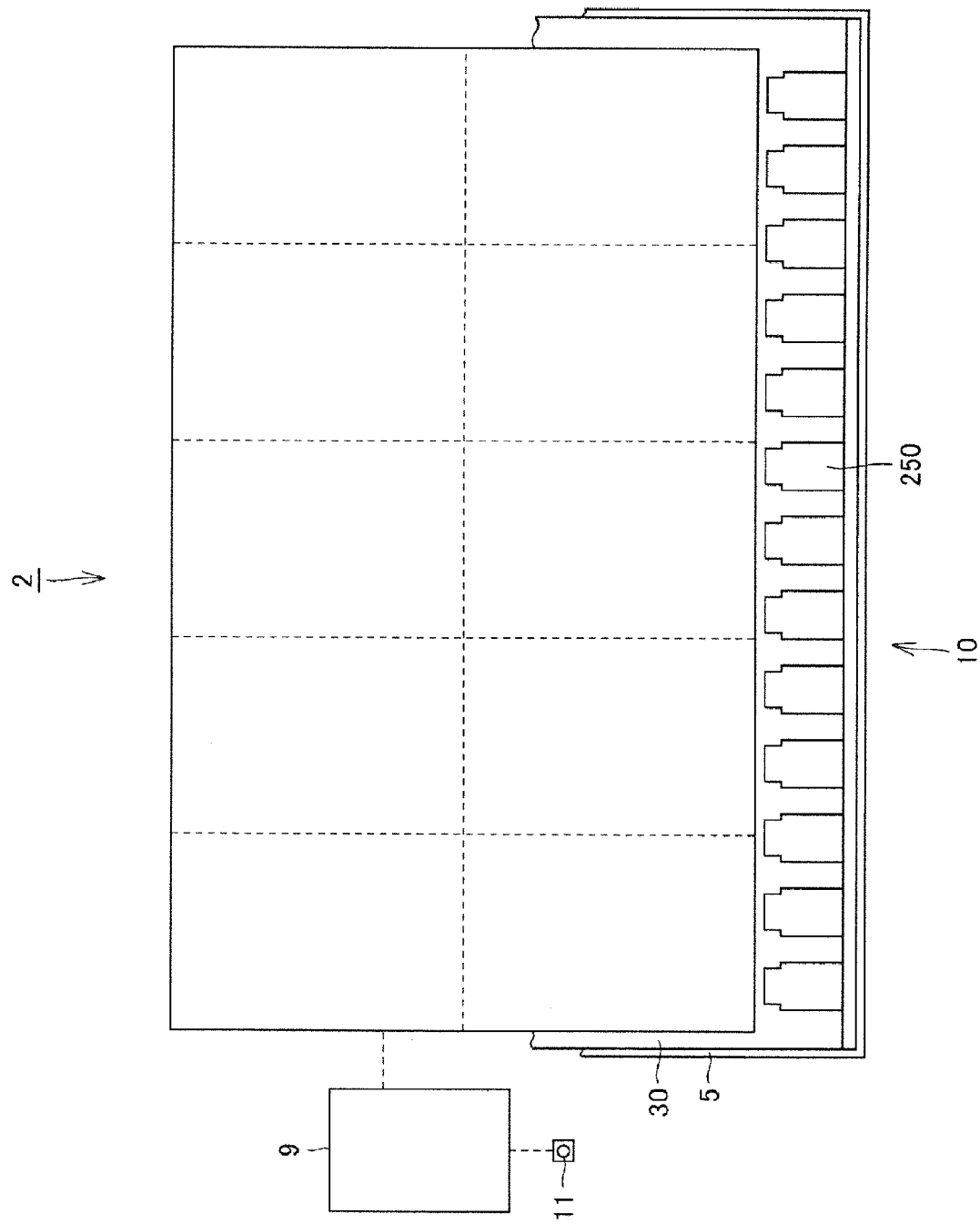
FIG. 25 is a front view that schematically shows a liquid crystal display device 2 according to Embodiment 2.

FIG. 25 is a front view that schematically shows a liquid crystal display device 2 according to Embodiment 2. As shown in FIG. 25, an ion discharge module 10 includes a plurality of discharge units 250.

Figure 26:
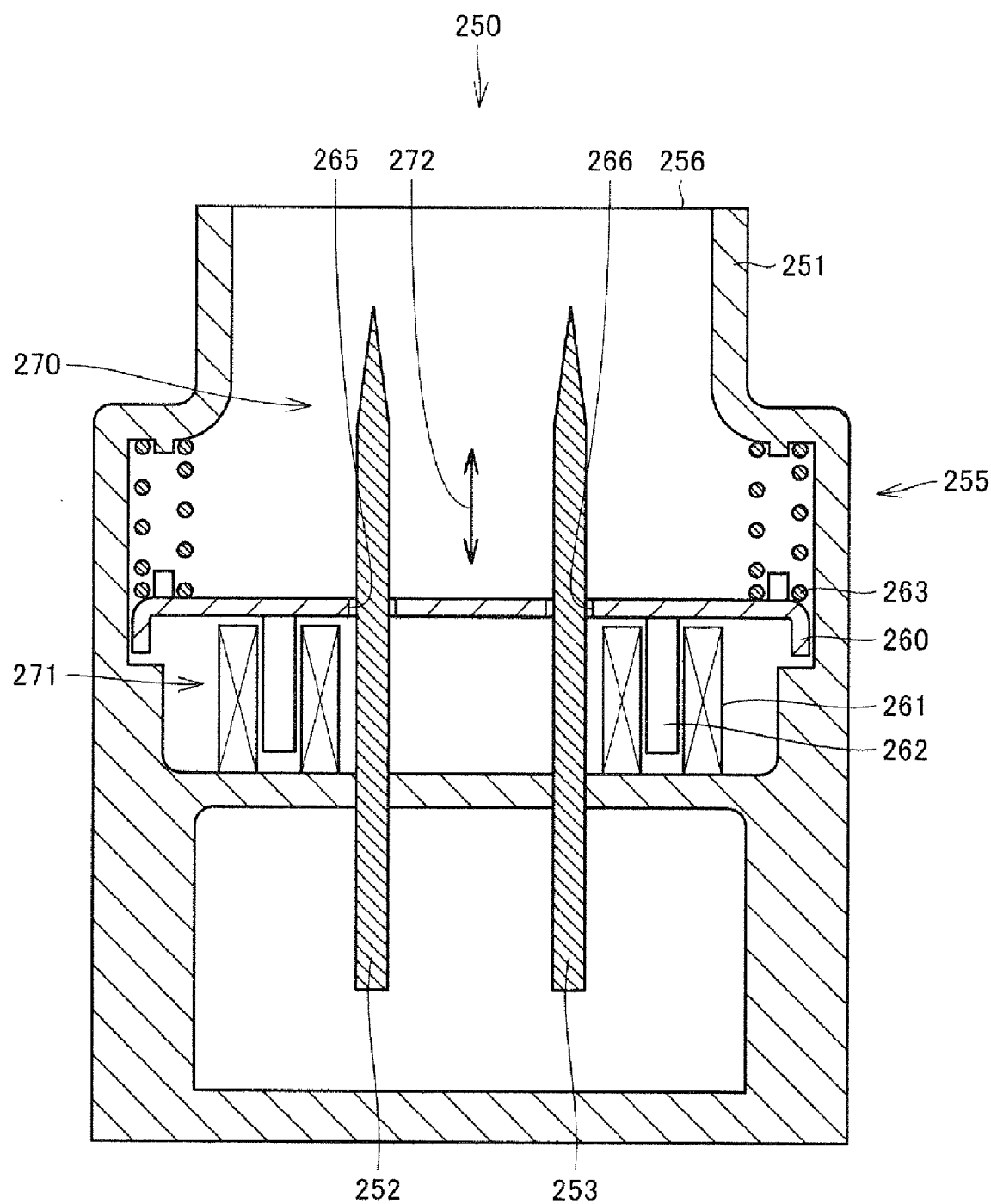
FIG. 26 is a cross-sectional view that shows a discharge unit 250.

The plurality of discharge units 250 are disposed on a bottom side of a front bezel 30 with gaps therebetween. FIG. 26 is a cross-sectional view that shows a discharge unit 250. As shown in FIG. 26, the discharge unit 250 includes a discharge cylinder 251 formed in a cylindrical shape, an electrode 252 and an electrode 253 provided in the discharge cylinder 251, and an air compression device 255 that compresses air in the discharge cylinder 251 and jets the compressed air outside of the discharge cylinder 251.

Pulse voltages are applied at a prescribed interval to the electrode 252 and the electrode 253, causing ions to be generated in the discharge cylinder 251 by corona discharge.

The air compression device 255 includes a dividing plate 260 that is disposed in the discharge cylinder 251 so as to be moveable, coils 261 disposed on the rear surface side of the dividing plate 260, magnetic bodies 262 connected to the rear surface of the dividing plate 260, and springs 263 disposed on the front side of the dividing plate 260.

The dividing plate 260 is disposed so as to separate the space inside the discharge cylinder 251 into an ion-filling chamber 270 and a drive chamber 271.

A penetrating hole 265 and a penetrating hole 266 are formed in the dividing plate 260 with the electrode 252 being inserted through the penetrating hole 265, and the electrode 253 being inserted through the penetrating hole 266. The respective ends of the electrode 252 and the electrode 253 are located in the ion-filling chamber 270.

Thus, positive ions and negative ions generated by the electrode 252 and the electrode 253 fill the ion-filling chamber 270.

The coils 261 and the magnetic bodies 262 are disposed in the drive chamber 271. The coils 261 are electromagnetic coils, and by switching the direction of current provided to the coils 261, it is possible to switch between magnetic attraction and magnetic repulsion between the coils 261 and the magnetic bodies 262.

For example, if a current is supplied to the coils 261 such that the coils 261 and the magnetic bodies 262 repel each other, then the dividing plate 260 moves towards the opening 256 against the resisting force from the springs 263.

If a current is supplied to the coils 261 such that the coils 261 and the magnetic bodies 262 attract each other, then the dividing plate 260 moves away from the opening 256.

As a result, by periodically switching the direction of current flow supplied to the coils 261, the dividing plate 260 oscillates in an oscillation direction 272.

Figure 27:
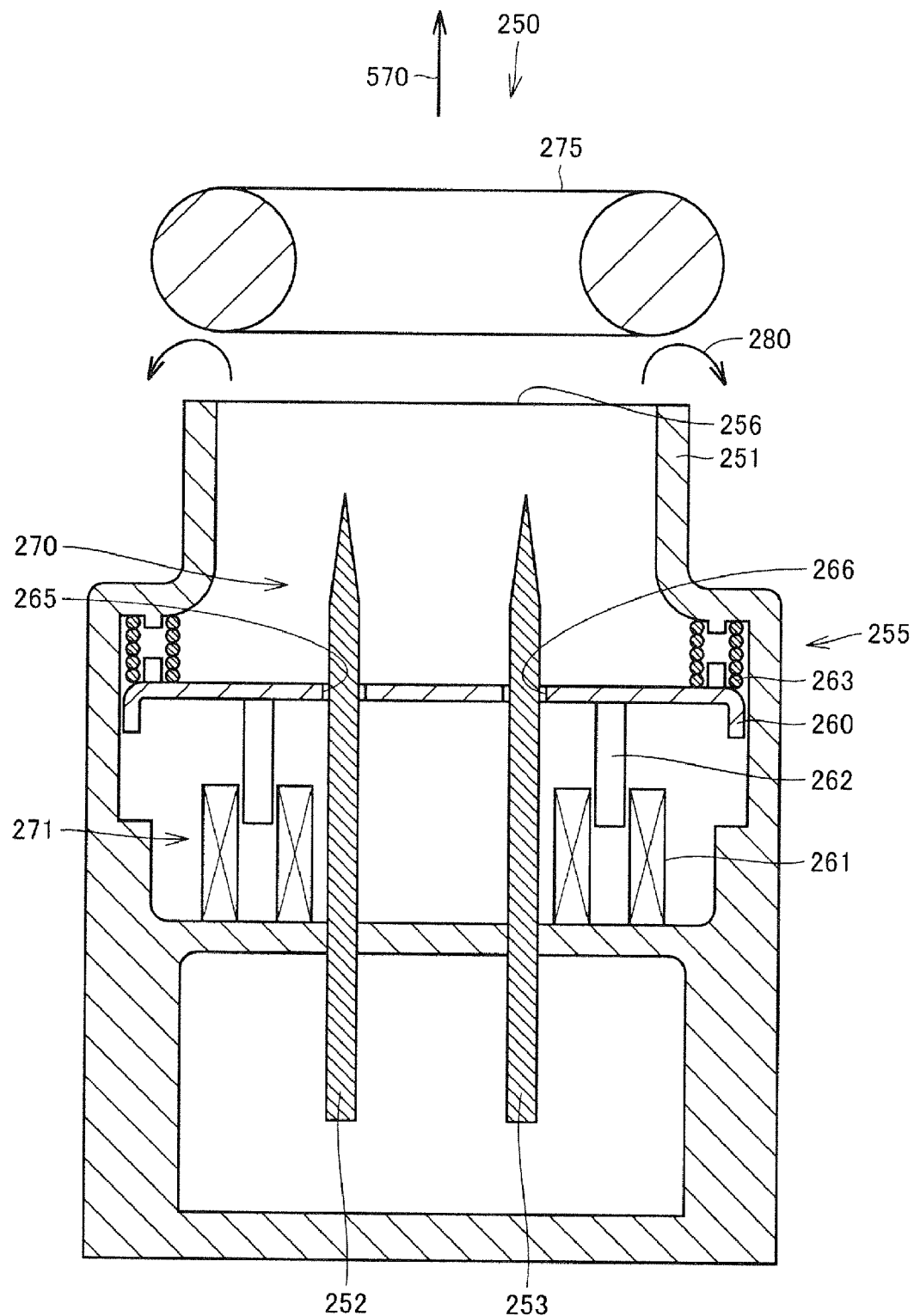
FIG. 27 is a cross-sectional view that shows a discharge unit 250.

As shown in FIG. 27, when the dividing plate 260 moves towards the opening 256, the air inside the ion-filling chamber 270 is compressed, forcing compressed air out of the opening 256. At this time, the ion-filling chamber 270 is filled with ions generated by corona discharge, and thus, ions in the ion-filling chamber 270 are also forced out of the opening 256 along with the compressed air.

When the compressed air is forced out of the opening 256, spinning airflows are formed in a spinning direction 280. As a result, air forced out through the opening 256 forms a ring-shaped air mass 275. While this air mass retains a ring shape, it travels in an airflow direction 570.

At this time, by making the frequency of the current supplied to the electrode 252 and the electrode 253 synchronized with the oscillation frequency of the dividing plate 260, the type of ion included in the air mass 275 blown from the opening 256 can be selected at will. Thus, it is possible to alternately emit an air mass 275 that includes more positive ions and an air mass 275 that includes more negative ions, for example.

The discharge unit 250 adjusts the amount of current and voltage supplied to the coils 261, thus allowing the speed at which the air mass 275 is emitted from the opening 256 to be adjusted.

For example, by increasing the current and voltage supplied to the coils 261, it is possible to increase the speed at which the dividing plate 260 changes position, and thus, it is possible to increase the speed at which the air mass 275 is forced out. On the other hand, if the current and voltage supplied to the coils 261 are decreased, it is possible to decrease the speed at which the air mass 275 is forced out.

Figure 28:
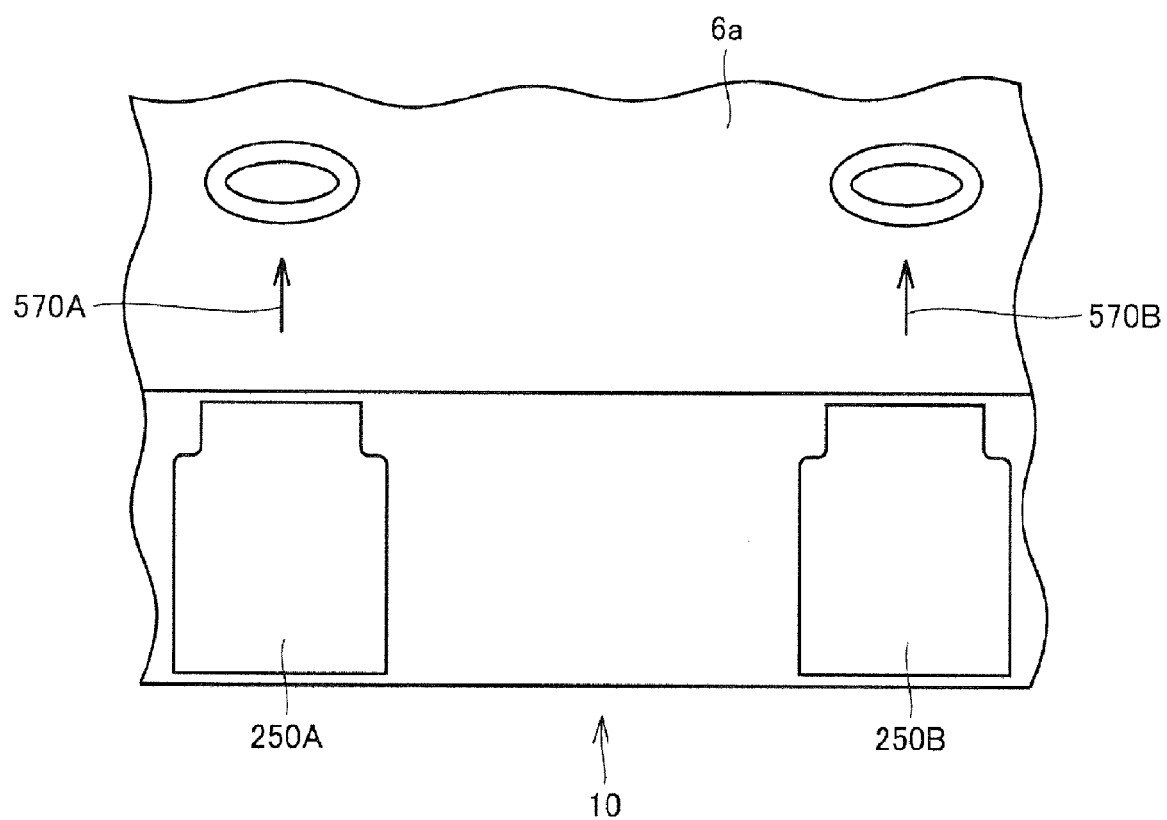

The elimination of static electricity from a display surface 6a will be described with reference to FIGS. 28 and 27. As shown in FIG. 28, a discharge unit 250A and a discharge unit 250B are disposed such that respective airflow directions 570 are parallel to each other.

By periodically changing the current and voltage supplied to the coils 261 shown in FIG. 27, the speed at which the air mass 275 is forced out becomes faster and slower, periodically.

When the speed at which the air mass 275 is forced out is slow, the air mass 275 spreads in the vicinity of the lower side of the display surface 6a, and the ions included in the air mass 275 also spread in the vicinity of the lower side of the display surface 6a.

When the speed at which the air mass 275 is forced out is fast, the air mass 275 spreads in the vicinity of the upper side of the display surface 6a, and the ions included in the air mass 275 also spread in the vicinity of the upper side of the display surface 6a.

By periodically changing the current and voltage supplied to the coils 261 in this manner, it is possible to blow ions substantially evenly over the entire display surface 6a. As a result, it is possible to eliminate static electricity on the display surface 6a.

Figure 29:
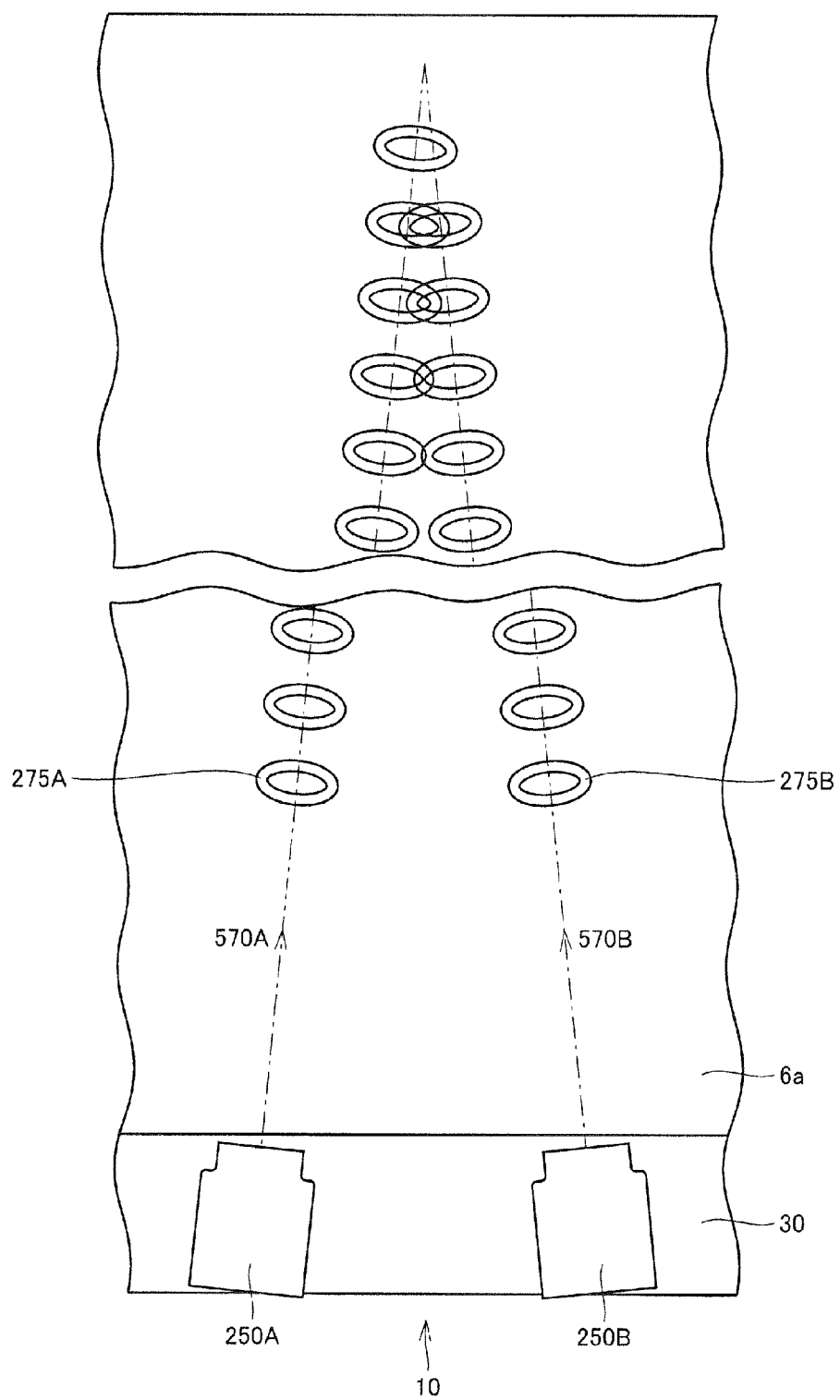
FIG. 29 is a front view that shows discharge units when sterilizing a specific region.

The driving of the ion discharge module 10 when sterilizing a specific region of the display surface 6a will be described with reference to FIG. 29. In FIG. 29, two discharge units 250A and 250B are focused on for ease of description.

As shown in FIG. 29, the discharge units 250A and 250B are disposed such that the respective airflow directions 570A and 570B intersect in a target partitioned area to be sterilized.

Currents are supplied to the electrodes of the discharge units 250A and 250B such that the polarity of the ions included in the air mass 275A blown from the discharge unit 250A differs from the polarity of the ions included in the air mass 275B blown from the discharge unit 250B.

The air mass 275A and the air mass 275B mix with each other in the region to be sterilized, and the ions included in the respective air masses 275A and 275B bond with each other.

The bond energy or the energy of the generated radicals acts on airborne microbes or dust and the like to which airborne microbes are attached, and the display surface 6a is thus sterilized.

As stated above, by increasing the current supplied to the coils 261 of the discharge unit 250A and the discharge unit 250B or increasing the voltage thereof, it is possible to have the intersection point of the air mass 275A and the air mass 275B far from the discharge units 250A and 250B.

As a result, even if the display surface 6a is large, it is possible to sterilize a desired portion of the display surface 6a.

(Embodiment 3)

A liquid crystal display device 2 according to Embodiment 3 will be described with reference to FIGS. 30 to 34. Of the configurations shown in FIGS. 30 to 34, configurations that are the same or correspond to those of FIGS. 1 to 29 may be assigned the same reference characters with descriptions thereof being omitted.

Figure 30:
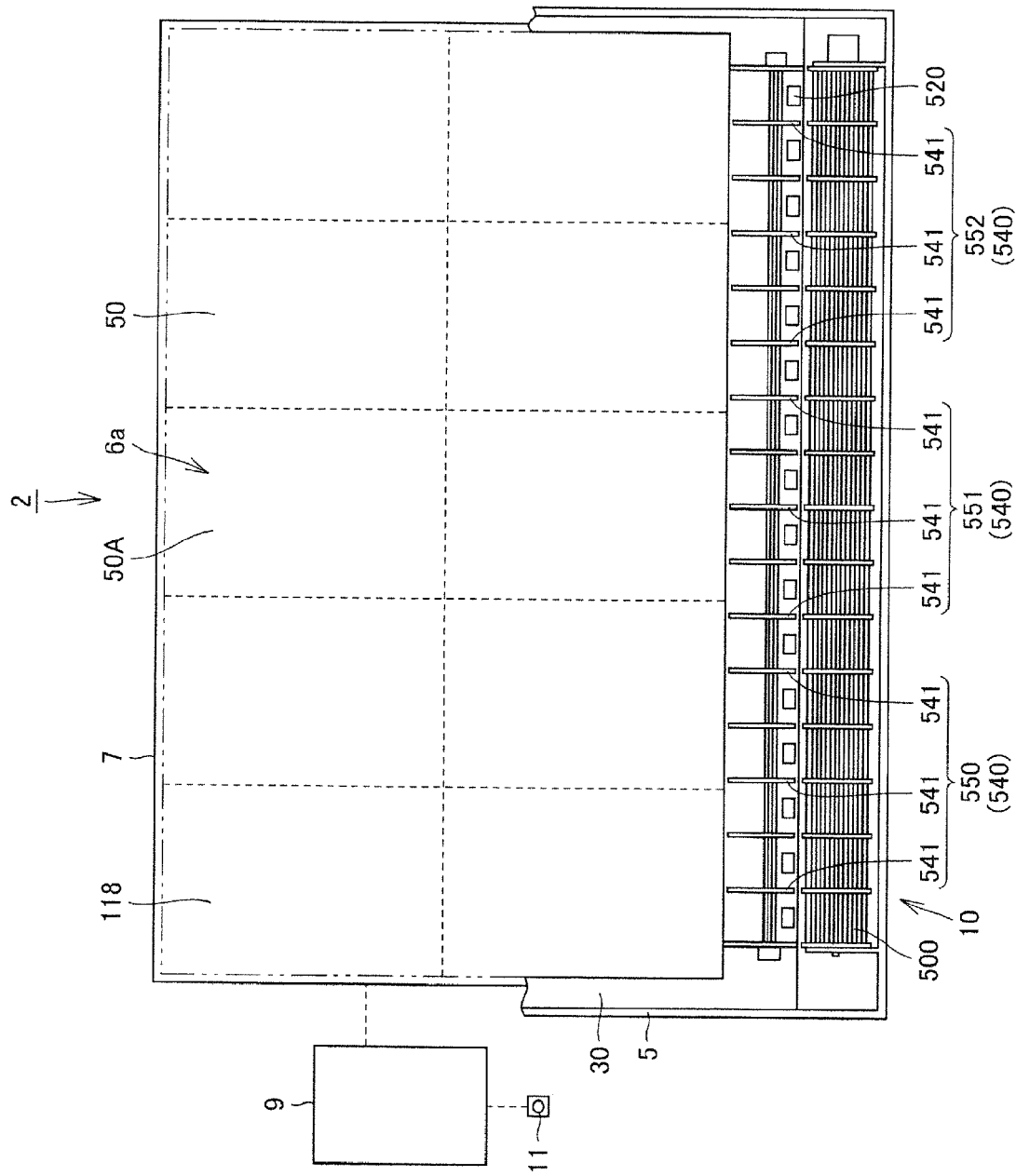
FIG. 30 is a front view that schematically shows a liquid crystal display device 2 according to Embodiment 3.
Figure 31:
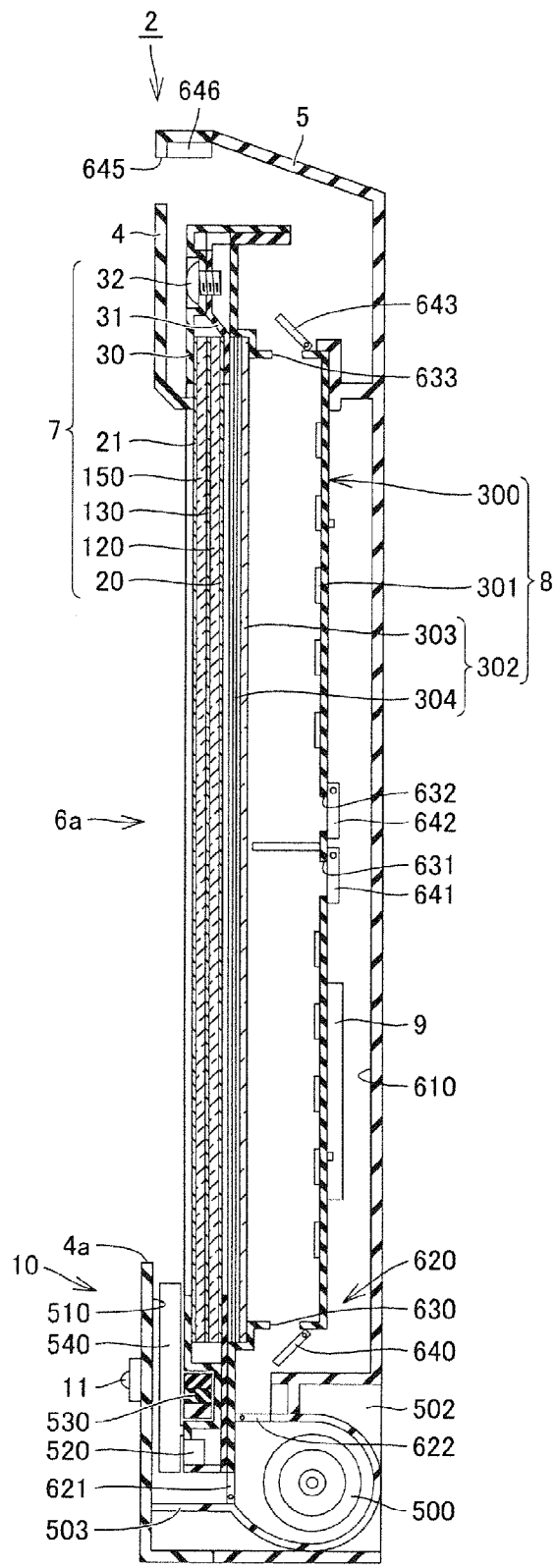
FIG. 31 is a cross-sectional view of the liquid crystal display device 2 shown in FIG. 30.

FIG. 30 is a front view that schematically shows a liquid crystal display device 2 according to Embodiment 3. In FIG. 30 also, a front cover 4 is removed, and portions of the front bezel 30 and the rear cover 5 are omitted. FIG. 31 is a cross-sectional view of the liquid crystal display device 2 shown in FIG. 30.

The liquid crystal display device 2 according to Embodiment 3 includes a display panel 7 that includes a display surface 6a, a backlight module 8 that radiates light to the display panel 7, an ion discharge module 10, a control part 9 that controls the driving of the ion discharge module 10 and the display panel 7, and a human presence sensor 11.

The ion discharge module 10 includes a fan 500, an outtake pipe 510 that guides air from the fan 500 to the display surface 6a, an outtake pipe 610 that guides the air to the backlight module 8, and a switching device 620 that switches the flow path of the air from the fan 500.

The switching device 620 selectively feeds air from the fan 500 to the backlight module 8, cooling the backlight module 8. The switching device 620 guides air from the fan 500 to the display surface 6a when the presence of a person is detected by the human presence sensor 11.

The outtake pipe 510 is provided with an ion-generating device 520, and ions generated by the ion-generating device 520 are blown onto the display surface 6a.

As a result, the liquid crystal display device 2 according to Embodiment 3 can mitigate the attraction of foreign matter such as dust to the display surface 6a and can additionally sterilize and clean the display surface 6a, similar to the liquid crystal display device 2 of Embodiment 1. The surrounding air can also be cleaned.

A configuration of the ion discharge module 10 that can also cool the backlight module 8 will be described in detail.

As shown in FIG. 31, the ion discharge module 10 includes the switching device 620 that switches the flow path of the air from the fan 500 as described above, and the switching device 620 includes a switching valve 621 provided in an opening of the outtake pipe 510 and a switching valve 622 provided in an opening of the outtake pipe 610.

When the switching valve 621 opens, air from the fan 500 is guided to the display surface 6a. When the switching valve 622 opens, air from the fan 500 is guided to the outtake pipe 610.

The outtake pipe 610 faces openings 630, 631, 632, and 633 provided in a rear bezel 300, and opening/closing valves 640, 641, 642, and 643 are provided at the openings 630, 631, 632, and 633.

Figure 32:
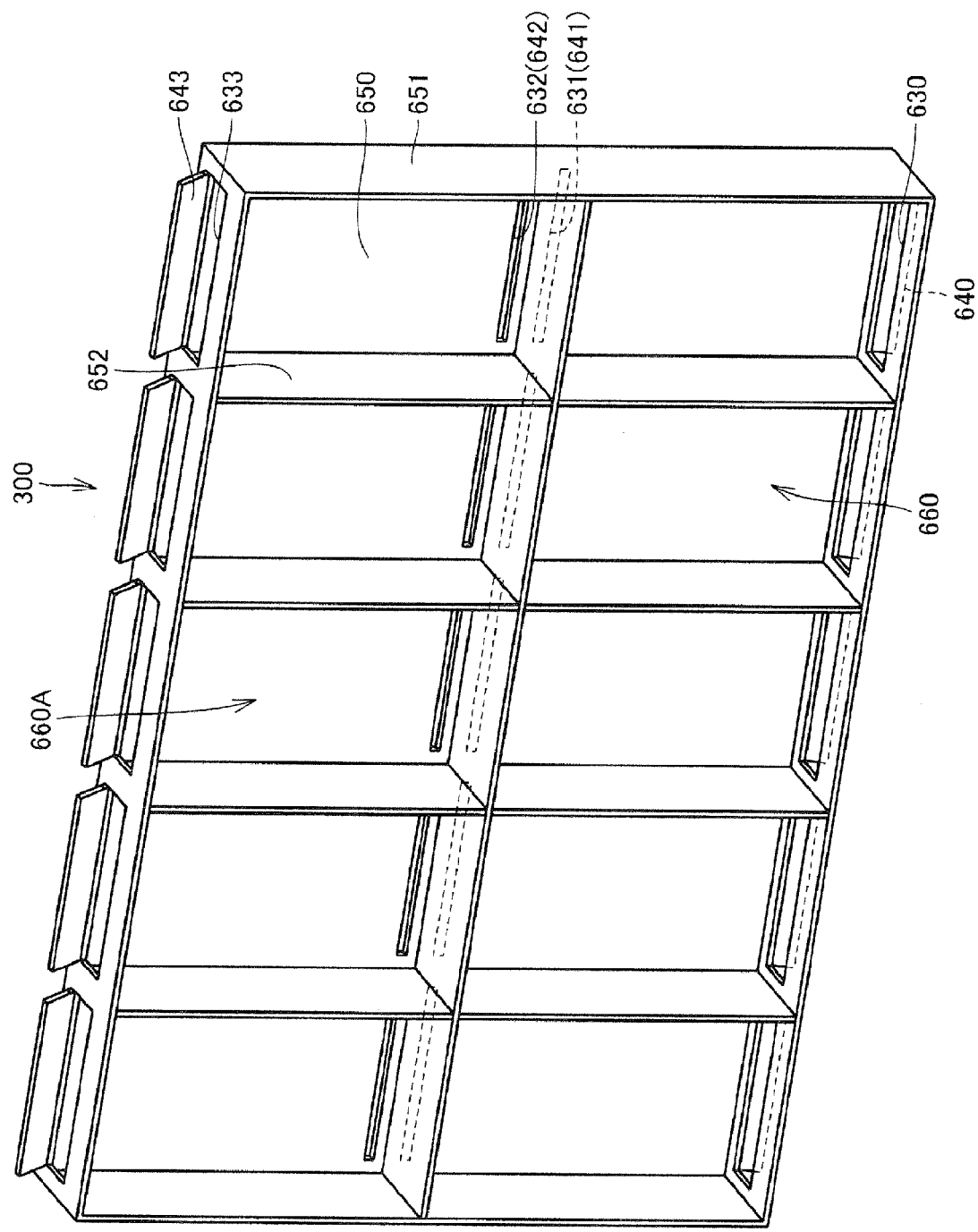
FIG. 32 is a perspective view of a rear bezel 300.

FIG. 32 is a perspective view of the rear bezel 300. As shown in FIG. 32, the rear bezel 300 includes a rear wall 650, a side wall 651 formed on an outer edge of the rear wall 650, and dividing members 652 that divide the space in the rear bezel 300 into a plurality of divided sections 660.

As shown in FIG. 32, the divided sections 660 are in two rows up and down, and the upper row and lower row are respectively provided with five divided sections 660.

The divided sections 660 located in the lower row are each provided with an opening 630 formed on a lower wall of the side wall 651, and an opening 631 formed in the rear wall 650. Each opening 630 is provided with an opening/closing valve 640, and each opening 631 is provided with an opening/closing valve 641.

Each divided section 660 located in the upper row is provided with the opening 632 formed in the rear wall 650 and the opening 633 formed in an upper wall of the side wall 651.

Thus, by controlling the opening and closing of the opening/closing valves 640 to 643, it is possible to send air from the fan 500 to specific divided sections 660.

In FIGS. 32 and 30, the partitioned areas 50 set in the display surface 6a and the divided sections 660 formed in the rear bezel 300 face each other. For example, a partitioned area 50A shown in FIG. 30 is disposed on the front side of a divided section 660A shown in FIG. 32.

Figure 33:
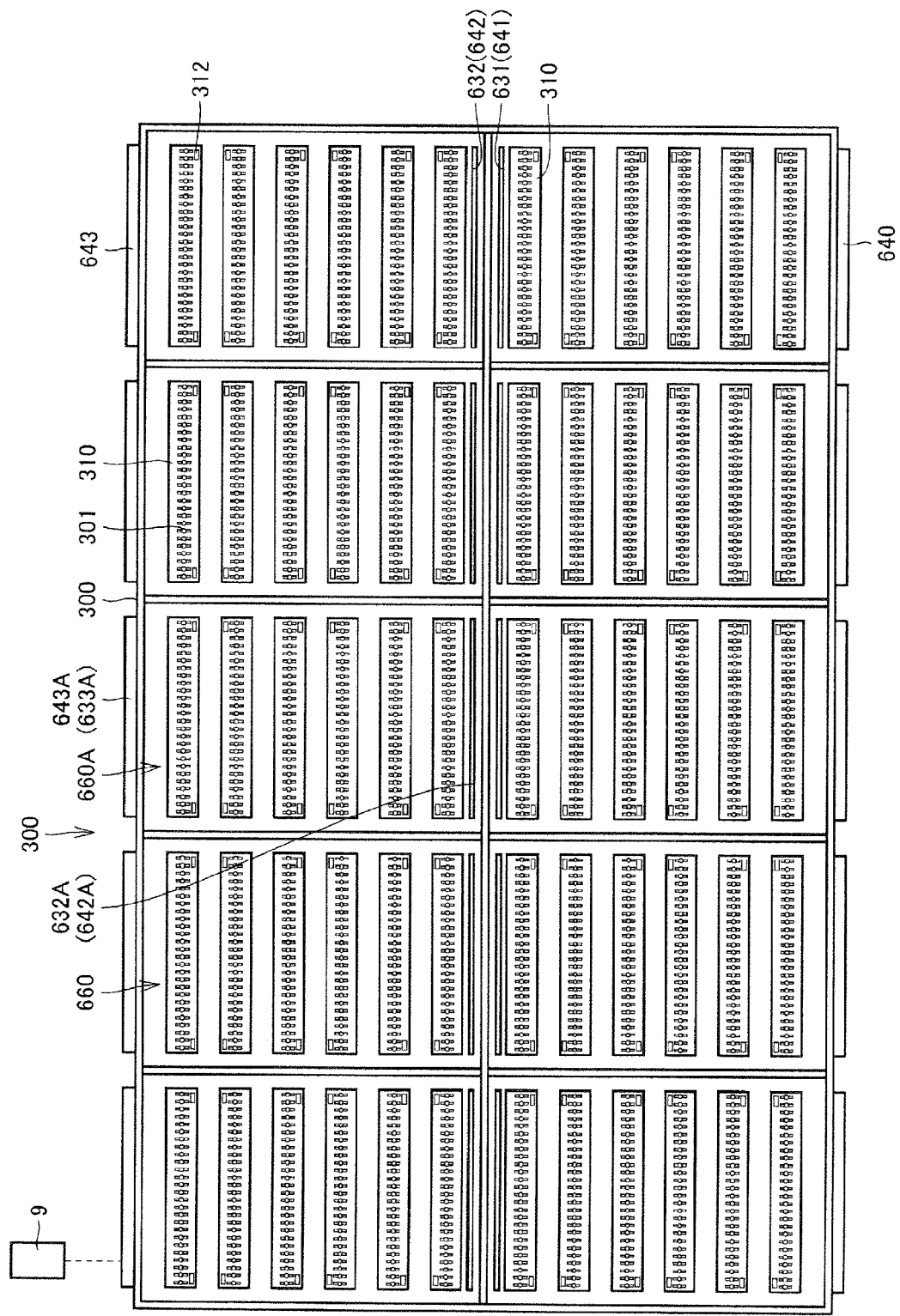
FIG. 33 is a plan view that shows a rear bezel 300 and LED modules 310.

Also, as shown in FIG. 33, a plurality of LED modules 310 having a plurality of LEDs 301 are disposed in each divided section 660.

Figure 34:
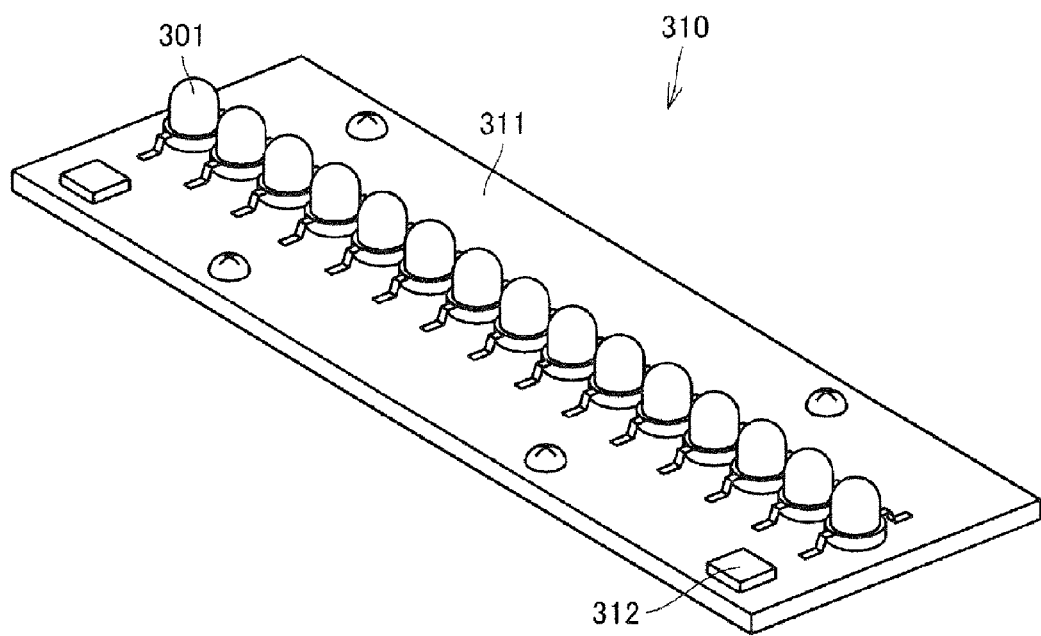
FIG. 34 is a perspective view of an LED module 310.

FIG. 34 is a perspective view of an LED module 310. As shown in FIG. 34, the LED module 310 includes a substrate 311, a plurality of LEDs 301 arranged in a row on a main surface of the substrate 311, and temperature sensors 312 disposed on the main surface of the substrate 311. The temperature sensors 312 output detected temperature data to the control part 9.

In FIG. 33, the control part 9 determines whether or not the temperature in each divided section 660 is higher than a prescribed temperature based on the output from the temperature sensors 312.

If a higher temperature than the prescribed temperature is detected in the divided section 660A, for example, then the control part 9 drives the opening/closing valves 640 to 643 such that air from the fan 500 is effectively guided to the divided section 660A, and drives the ion discharge module 10 such that air from the fan 500 is supplied to the partitioned area 50A as the target partitioned area shown in FIG. 30.

The control part 9 opens the opening/closing valve 643A and the opening/closing valve 642 and closes the other opening/closing valves in order to effectively guide air from the fan 500 to the divided section 660A. Furthermore, in FIG. 31, the switching valve 622 is opened.

As a result, air from the fan 500 enters the outtake pipe 610. Air that enters the outtake pipe 610 enters the divided section 660A from the opening 632A of the divided section 660A shown in FIG. 33. Air from the fan 500 is evacuated from an opening 633A after cooling the inside of the divided section 660A. Then, the air is evacuated from an exhaust hole 645 shown in FIG. 31 to the outside. In this manner, when the temperature in the specific divided section 660A rises, it is possible to immediately lower the temperature in the divided section 660A.

In addition, in order to effectively guide air from the fan 500 to the partitioned area 50A, the control part 9 opens the switching valve 621 shown in FIG. 31 and causes the partitioned louvers 550, 551, and 552 shown in FIG. 30 to face the partitioned area 50A. As a result, air from the fan 500 is blown towards the partitioned area 50A, thus mitigating an increase in temperature of the partitioned area 50A.

In this manner, it is possible to mitigate an increase in temperature in the display panel 7, and thus, the liquid crystal in the display panel 7 can be driven normally.

The response of liquid crystal becomes unstable when the temperature increases. However, it is possible to efficiently mitigate an increase in temperature in the display panel 7 by cooling the target partitioned area from the display side, and the liquid crystal can be driven normally. In addition, the efficiency is even better because the divided section facing the target partitioned area is also simultaneously cooled.

Changes in brightness of LEDs are highly temperature-dependent, but because the target partitioned area is cooled from the display side, it is possible to efficiently mitigate an increase in temperature of the LEDs, and therefore, it is possible to efficiently reduce unevenness in brightness of the LEDs. In addition, the efficiency is even better because the divided section facing the target partitioned area is also simultaneously cooled. The effect is especially marked in a flat panel display device in which a liquid crystal panel is adjacent to LED modules.

Furthermore, the target partitioned area (specific divided section) is cooled only when necessary, thus contributing to a reduction in noise resulting from the fan being driven, and a reduction in the amount of power consumed to drive the fan.

When blowing air to the partitioned area 50A, the ion-generating devices 520 are operated.

By operating the ion-generating devices 520, it is possible to clean the display surface 6a and remove static electricity in the display surface 6a. Also, it is possible to conduct cooling from the display surface 6a side.

The liquid crystal display device 2 according to Embodiment 3 also has the human presence sensor 11, and when the human presence sensor 11 detects a person in the vicinity of the liquid crystal display device 2, the switching valve 621 shown in FIG. 31 is opened, thus blowing air from the fan 500 to the display surface 6a. At this time, the ion-generating devices 520 are operated, thus allowing ions to be included in the air blown to the display surface 6a.

As a result, static electricity can be removed from the display surface 6a, thus mitigating foreign matter such as dust being attracted to the display surface 6a. In addition, by removing static electricity from the display surface 6a, as will be described in Embodiments 4 and 5 below, it is possible to mitigate the effect of static electricity in the display surface 6a on liquid crystal molecules in the liquid crystal display device 2.

A gap is formed between the backlight module 8 and the display panel 7, and when supplying cooling air to the backlight module 8, the cooling air may be supplied to the gap between the display panel 7 and the backlight module 8. As a result, it is possible to efficiently cool the display panel 7.

Figure 35:
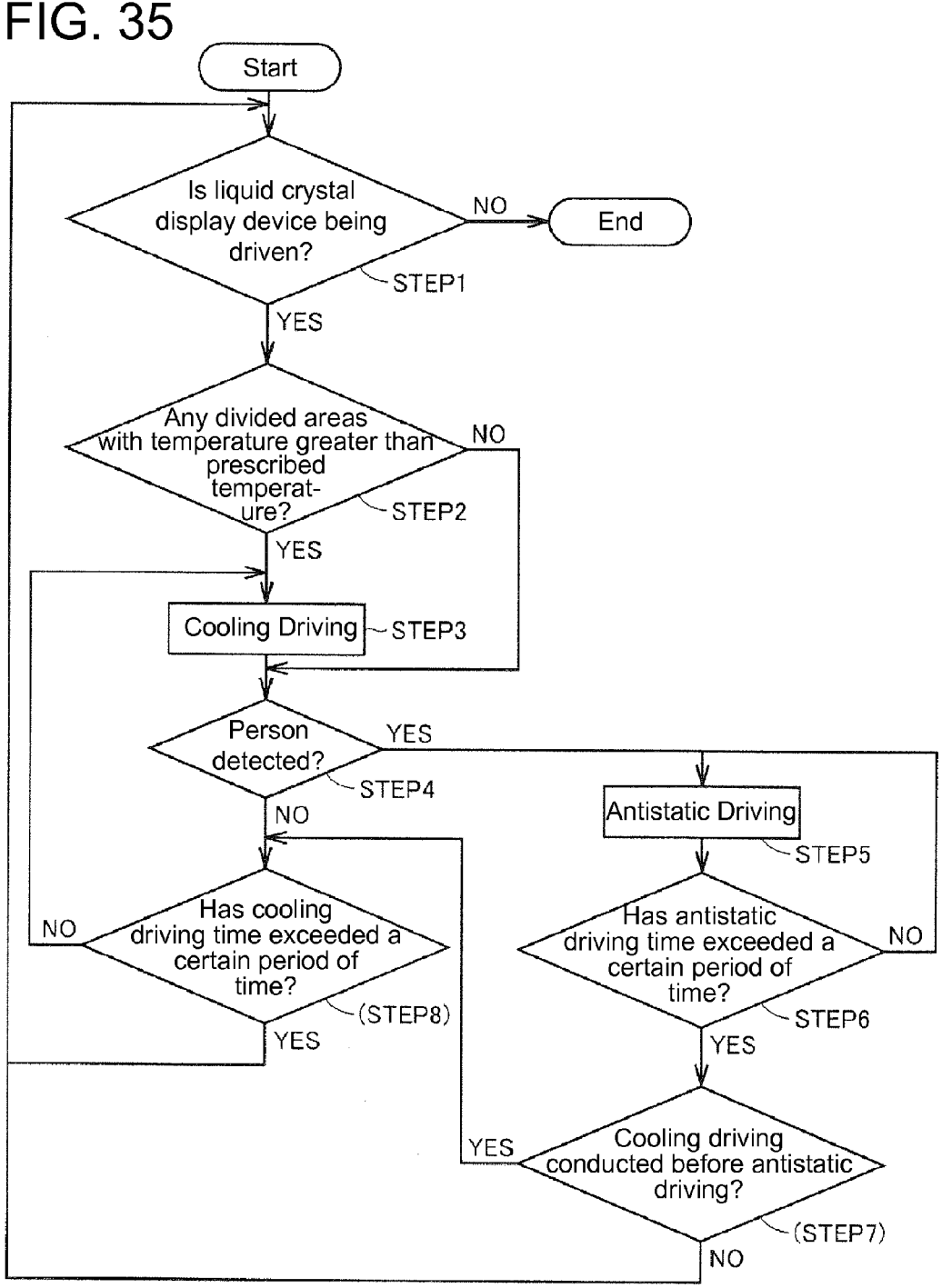
FIG. 35 is a flowchart of a control part 9.

The control flow of the control part 9 of the present embodiment will be described with reference to FIG. 35. The presence or lack of a divided section 660 with a temperature exceeding the prescribed temperature is detected (STEP 2). If a divided section 660 with a higher temperature than the prescribed temperature is detected, the ion discharge module 10 conducts cooling driving. Specifically, air is supplied to a divided section 660 with a high temperature and a partitioned area 50A that faces the divided section 660A.

The control part 9 determines the presence or absence of a person in the vicinity of the liquid crystal display device 2 based on output from the human presence sensor 11. When the presence of a person is detected in the vicinity of the liquid crystal display device 2, the control part 9 starts antistatic driving for eliminating static electricity in the display surface 6a (STEP 5). The control part 9 then continues antistatic driving for a prescribed period of time (STEP 6). Then, the control part 9 determines whether or not cooling driving has been conducted before antistatic driving (STEP 7).

If cooling driving has been conducted, then the control part 9 determines whether or not the total drive time for cooling driving has reached a certain period of time (STEP 8). If the driving time has not reached a certain period of time, then the control part 9 continues cooling driving until the total drive time reaches a prescribed period of time (STEP 8).

(Embodiment 4)

A liquid crystal display device 2 according to Embodiment 4 will be described with reference to FIGS. 36 to 39. Of the configurations shown in FIGS. 36 to 39, configurations that are the same or correspond to those of FIGS. 1 to 35 will be assigned the same reference characters with descriptions thereof being omitted.

Figure 36:
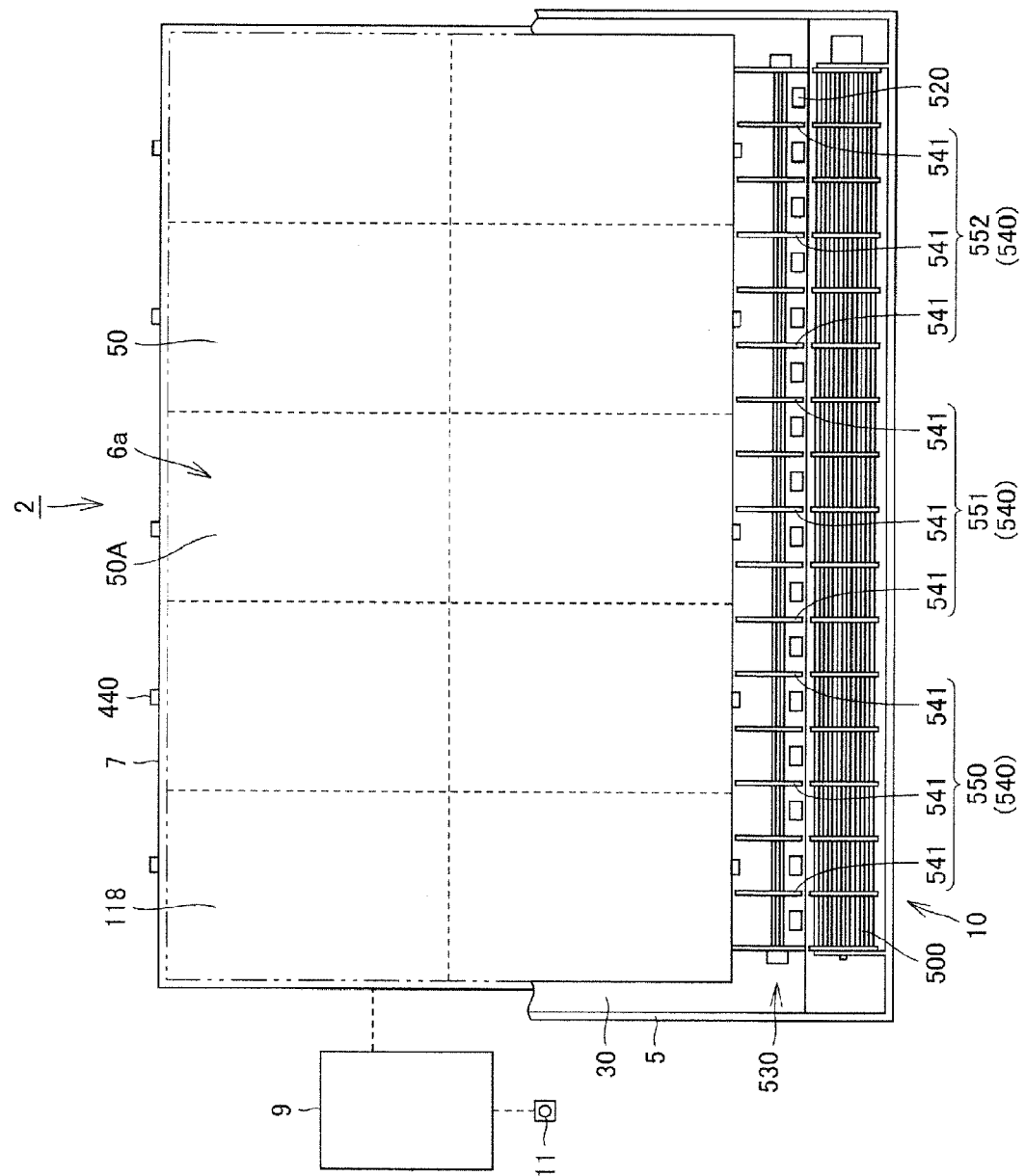
FIG. 36 is a front view that schematically shows a liquid crystal display device.

As shown in FIG. 36, the liquid crystal display device 2 according to Embodiment 4 includes a display panel 7 that has a display surface 6a, an ion discharge module 10 that can selectively blow positive ions and negative ions to the display surface 6a, a control part 9 that sets a plurality of partitioned areas 50 in the display surface 6a, and a charge sensor 440 provided for each set partitioned area 50. The ion discharge module 10 includes an adjusting mechanism 530, and an ion-generating device 520, and the adjusting mechanism 530 includes first louvers 540 that can adjust the direction at which ions are blown. As a result, the ion discharge module 10 can blow ions towards a desired partitioned area 50 and can blow ions towards the entire display surface 6a.

The charge sensor 440 detects an electric field formed by static electricity on the surface of the partitioned area 50, thus detecting the charge voltage of the partitioned area 50.

If the charge voltage of the partitioned area 50 exceeds a prescribed voltage, the control part 9 drives the ion discharge module 10 so as to blow ions towards the partitioned area 50 where the prescribed voltage has been exceeded.

At this time, the control part 9 detects whether positive ion static electricity is present in the partitioned area 50 or negative ion static electricity is present therein, based on output values from the charge sensor 440.

If it is determined that negative ions are in the partitioned area 50, the ion discharge module 10 is driven so as to blow positive ions towards the partitioned area 50. On the other hand, if it is determined that positive ions are in the partitioned area 50, the ion discharge module 10 is driven so as to blow negative ions towards the partitioned area 50.

With the control part 9 driving the ion discharge module 10 in this manner, it is possible to mitigate an accumulation of static electricity in the display surface 6a.

In particular, if the display surface 6a is large, variation in static electricity occurs. In the liquid crystal display device 2 according to Embodiment 4, the display surface 6a is partitioned into a plurality of partitioned areas 50, and the charge voltage is detected for each partitioned area 50. By focusing ions towards a partitioned area 50 with a charge voltage at or higher than a prescribed voltage, the charge voltage can be lowered in a short period of time.

By mitigating an increase in charge voltage in the display surface 6a in this manner, the effect of the charge voltage of static electricity in the display surface 6a on liquid crystal molecules in the liquid crystal display device 2 can be minimized.

The control part 9 calculates an average charge voltage of the entire display surface 6a based on output from each charge sensor 440. If the calculated average charge voltage of the display surface 6a has an absolute value exceeding a prescribed value, then the ion discharge module 10 blows ions towards the entire display surface 6a.

Thus, even when blowing ions on the entire display surface 6a, the ion discharge module 10 blows positive ions on the entire display surface 6a when the display surface 6a is negatively charged, and blows negative ions on the entire display surface 6a when the display surface 6a has positively charged. In this manner, it is possible to mitigate charge accumulation in the display surface 6a. Thus, it is possible to minimize the effect of charge voltage in the display surface 6a on liquid crystal molecules in the liquid crystal display device 2.

The liquid crystal display device 2 of Embodiment 4 is a so-called transverse electric field-type liquid crystal display panel. Details will be described later, but the liquid crystal display panel is a TBA (transverse bend alignment) mode transverse electric field display panel that includes an absorbent barrier layer that absorbs impurity ions included in the liquid crystal layer. The liquid crystal display device 2 also includes a plurality of pressure sensors 118 as in Embodiment 1.

Figure 37:
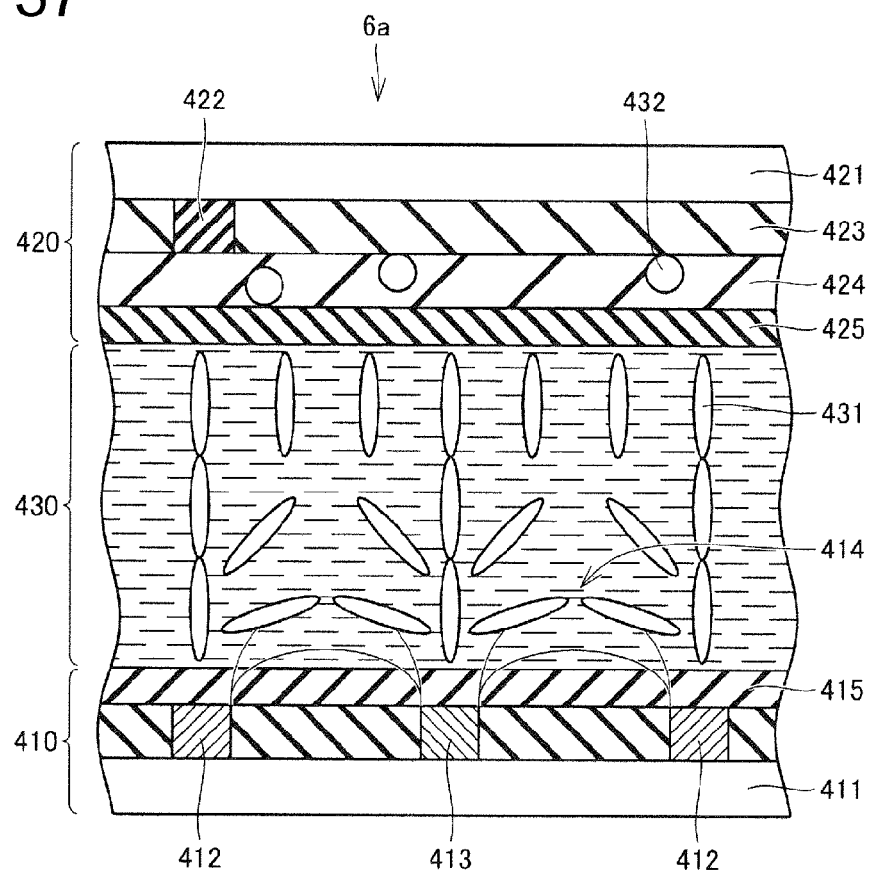
FIG. 37 is a cross-sectional view that schematically shows a display panel 7.

The structure of the inside of the display panel 7 will be described with reference to FIGS. 37 to 39. FIG. 37 is a cross-sectional view that schematically shows a display panel 7. As shown in FIG. 37, the display panel 7 includes an active matrix substrate 410, an opposite substrate 420 that has a main surface facing that of the active matrix substrate 410, and a liquid crystal layer 430 sealed between the opposite substrate 420 and the active matrix substrate 410.

The active matrix substrate 410 includes a transparent substrate 411 that has a main surface, TFT transistors formed on the main surface of the transparent substrate 411, an insulating film formed so as to cover the TFT transistors, pixel electrodes 412 formed on the insulating film and connected to respective drain electrodes of the TFT transistors, a common electrode 413 formed on the insulating film, and a vertical alignment film 415 formed so as to cover the pixel electrodes 412, the common electrode 413, and the insulating film.

The transparent substrate 411 is formed of a plate-shaped glass substrate or the like. The vertical alignment film 415 is formed of a known alignment film material such as a polyimide. The rubbing treatment has not been conducted on the vertical alignment film 415. A plurality of nano-order minute protrusions are formed in the surface of the vertical alignment film 415, and in a state in which a voltage is not applied, liquid crystal molecules 431 are oriented vertically to the vertical alignment film 415.

The opposite substrate 420 includes a glass substrate 421 such as a glass substrate, color filters 423 and a black matrix 422 formed on a main surface of the glass substrate 421 on the side of the liquid crystal layer 430, an absorbent barrier layer 424 formed closer to the liquid crystal layer 430 than the color filters 423 and the black matrix 422, and a vertical alignment film 425 formed closer to the liquid crystal layer 430 than the absorbent barrier layer 424.

The glass substrate 421 has a main surface located on the liquid crystal layer 430 side and provided with the black matrix 422, the color filters 423, and the like, and a main surface located on a side opposite to the aforementioned main surface and functioning as the display surface 6a. A polarizing plate is provided on the main surface of the glass substrate 421 that functions as the display surface, but in FIG. 37, the polarizing plate is omitted.

The black matrix 422 is made in a grid pattern, for example, and the black matrix 422 has a plurality of window portions formed therein.

The color filters 423 may include three color filters such as a blue filter part, a red filter part, and a green filter part, or include four color filters with the addition of a yellow filter part, for example. Each filter part is provided in a window portion formed in the black matrix 422.

The vertical alignment film 425 is similar to the vertical alignment film 415 in being made of polyimide or the like, and when a voltage is not applied thereto, the liquid crystal molecules 431 are oriented so as to be vertical to the vertical alignment film 425.

The absorbent barrier layer 424 absorbs impurity ions included in the liquid crystal layer 430 and mitigates the entrance of impurity ions from the black matrix 422 and the color filters 423 into the liquid crystal layer 430. A specific configuration of the absorbent barrier layer 424 will be described later.

Figure 38:
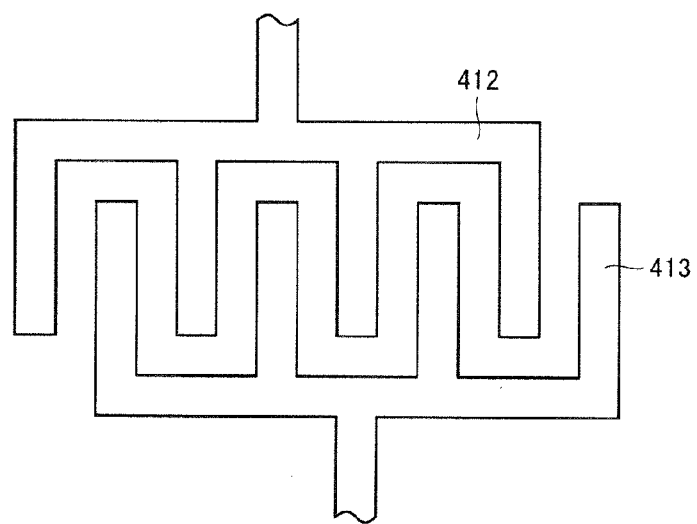
FIG. 38 is a plan view that schematically shows a pixel electrode 412 and a common electrode 413 when viewing an active matrix substrate 410 from a plan view.

FIG. 38 is a schematic plan view of the pixel electrode 412 and the common electrode 413 when viewing the active matrix substrate 410 from a plan view.

As shown in FIG. 38, in one pixel area, the pixel electrode 412 is formed in a comb shape, and the common electrode 413 is also formed in a comb shape. The teeth of the pixel electrode 412 and the teeth of the common electrode 413 are arranged in alternating sequence.

If a drive voltage is applied between the pixel electrode 412 and the common electrode 413, as shown in FIG. 37, an electric field 414 is formed between the adjacent pixel electrode 412 and the common electrode 413. If the transverse electric field 414 is generated in this way, the liquid crystal molecules 431 become inclined along the direction of the electric field 414.

On the other hand, when a drive voltage is not applied between the pixel electrode 412 and the common electrode 413, the liquid crystal molecules are oriented vertically to the opposite substrate 420 and the active matrix substrate 410 by the respective vertical alignment film 425 and vertical alignment film 415.

Thus, the liquid crystal display device 2 according to Embodiment 4 is used as a so-called transverse electric field liquid crystal display device.

Figure 39:
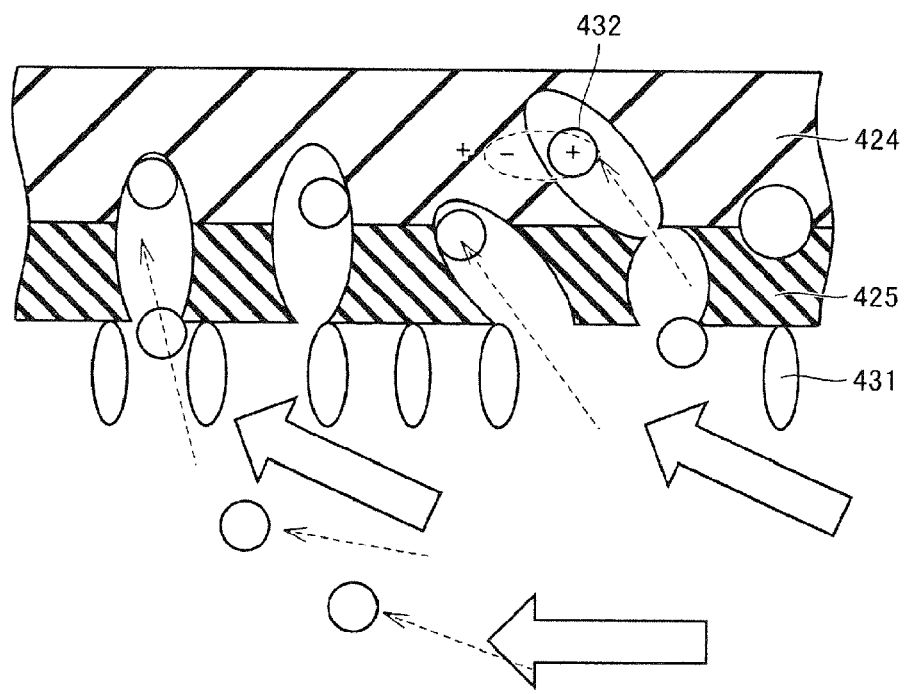
FIG. 39 is a cross-sectional view that schematically shows a configuration of an absorption barrier layer 424 and a vertical alignment film 425.

FIG. 39 is a cross-sectional view that schematically shows a configuration of an absorption barrier layer 424 and a vertical alignment film 425. The absorbent barrier layer 424 is made of a porous material that can absorb the impurity ions 432 included in the liquid crystal layer. The absorbent barrier layer 424 is made of a porous film that is made of an inorganic oxide such as a silicon oxide, an aluminum oxide, or a mixture thereof, for example. The porous film has a large surface area, and thus has the advantage of being able to absorb more impurity ions 432. By using an inorganic oxide, it is possible to sufficiently mitigate the movement of gas components passing through the absorbent barrier layer 424.

The absorbent barrier layer 424 is made of a porous silica film such as hydrogen silsesquioxane (HSQ) that includes an Si—H bond in $SiO_2$, or SiOF (FSG), SiOB (BSG), or SiOC in which some of the oxygen in the silicon oxide is replaced with another element, for example. These materials include bonds other than Si—O, and thus, become porous due to gaps within the molecular structure, which results in a lower relative permittivity (k value) than normal $SiO_2$. More specifically, the k value of normal $SiO_2$ is 4.2, but the k value of FSG is approximately 3.5 to 3.7, the k value of BSG is approximately 3.5, the k value of SiOC is approximately 2.5 to 2.8, and the k value of HSQ is approximately 3.0. SiOC is a compound that is intermediate between organic and inorganic, and is actually a methyl silsesquioxane that contains a large quantity of the Si—$CH_3$ group. Thus, a silicon oxide suitable for use in the absorbent barrier layer 424 may be a compound that is intermediate between organic and inorganic. The SiOC film is formed by the plasma CVD method using, as source gases, an organic silane gas and $N_2O$ gas or $O_2$ gas, for example. Monomethylsilane ($SiH_3CH_3$), dimethylsilane (($CH_3)_2SiH_2$, or the like is used as the organic silane gas. With the absorbent barrier layer 424 being disposed continuously on the entire display region, it is possible to mitigate the occurrence of display anomalies over the entire display region occurring due to impurity ions 432. As the area of the absorbent barrier layer 424 increases, more impurity ions 432 are absorbed and gas components from the black matrix and color filters can be more effectively prevented from entering the liquid crystal layer.

The vertical alignment film 425 has large surface concavities and convexities that follow the surface shape of the absorbent barrier layer 424. Therefore, the vertical alignment film 425 has deep cavities on the surface. The impurity ions 432 are pulled into these deep cavities, and thus, it is possible to mitigate the return of the impurity ions 432 absorbed into the deep cavities to the liquid crystal layer 430.

The behavior of the impurity ions 432 when an $SiO_2$ film is used for the absorbent barrier layer 424 will be described.

The absorbent barrier layer 424 is at electrical equilibrium due to having Si (+), which is a positive ion, and $O_2$ (−), which is a negative ion, and thus, impurity ions 432 that reach the absorbent barrier layer 424 bond with the positive ions or negative ions that constitute the absorbent barrier layer 424.

As a result, the impurity ions 432 are strongly pulled into the absorbent barrier layer 424 by being chemically absorbed thereto. As a result, it is possible to mitigate the return of impurity ions 432 absorbed by the absorbent barrier layer 424 to the liquid crystal layer 430. Also, even if the impurity ions 432 are physically absorbed into the absorbent barrier layer 424, the impurity ions 432 are absorbed into the deep cavities of the vertical alignment film 425, and thus, it is possible to mitigate the return of the impurity ions 432 absorbed by the absorbent barrier layer 424 to the liquid crystal layer 430. In this way, a plurality of impurity ions 432 are absorbed into the absorbent barrier layer 424.

In FIG. 36, the liquid crystal display device 2 can blow ions towards the display surface 6a, and thus static electricity in the display surface 6a is mitigated. As a result, as shown in FIG. 39, it is possible to mitigate the return of the impurity ions 432 from the absorbent barrier layer 424 to the liquid crystal layer 430 due to the impurity ions 432 stuck to the absorbent barrier layer 424 repelling the static electricity in the display surface 6a.

In particular, the control part 9 detects the charge voltage for each partitioned area 50, and drives the first louvers 540 so as to effectively blow ions towards partitioned areas 50 with high charge voltages, and if the average charge voltage of the display surface 6a exceeds a prescribed value, the first louvers 540 are driven so as to blow ions to the entire display surface 6a.

As a result, it is possible to efficiently mitigate the return of impurity ions 432 from the absorbent barrier layer 424 to the liquid crystal layer 430.

In addition, by eliminating static electricity in the display surface 6a, it is possible to mitigate the effect of static electricity in the display surface 6a on the liquid crystal molecules 431 in the liquid crystal layer 430, thus accurately controlling the orientation of the liquid crystal molecules 431 with the pixel electrodes 412 and the common electrode 413. Thus, a clear image can be displayed in the display surface 6a.

In a transverse electric field type, a common electrode 413 to which a fixed potential is applied is not provided on the glass substrate 421, and thus, effects from static electricity in the display surface 6a are felt strongly. On the other hand, in the liquid crystal display device 2 of Embodiment 4, static electricity in the display surface 6a is eliminated, and thus, even with a display panel 7 with a transverse electric field type, a clear image can be displayed.

In the liquid crystal display device 2 of the present embodiment, the ion discharge module 10 includes the first louvers 540, which can switch between blowing ions to the entire display surface 6a and blowing ions to specific partitioned areas 50.

Thus, in the liquid crystal display device 2 of Embodiment 4 also, the control part 9 can blow ions on the entire display surface 6a when a person is detected in the vicinity of the liquid crystal display device 2 based on output from the human presence sensor 11.

In addition, in the liquid crystal display device 2 of Embodiment 4 also, touch sensors such as pressure sensors 118 are provided as in the liquid crystal display device 2 of Embodiment 1, and through a user conducting a touch operation of the display surface 6a, data can be inputted and outputted. In the liquid crystal display device 2 of Embodiment 4 also, ions are blown on the display surface 6a, and thus, it is possible to mitigate a change in capacitance in the pressure sensors 118.

(Embodiment 5)

A liquid crystal display device 2 according to Embodiment 5 will be described with reference to FIG. 36 and FIGS. 40 to 46. Of the configurations shown in FIGS. 40 to 46, configurations that are the same or correspond to those of FIGS. 1 to 39 may be assigned the same reference characters with descriptions thereof being omitted.

As shown in FIG. 36, a liquid crystal display device 2 of Embodiment 5 can also blow ions on an entire display surface 6a or blow ions on specific partitioned areas 50.

Figure 40:
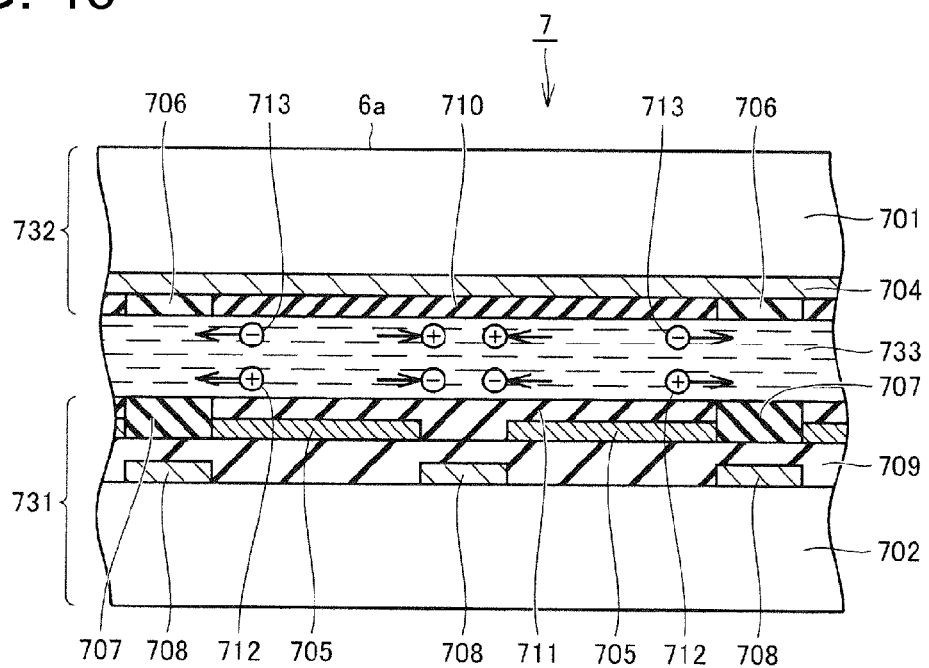
FIG. 40 is a cross-sectional view of a display panel 7 provided in the liquid crystal display device 2 according to the present embodiment.

FIG. 40 is a cross-sectional view of a display panel 7 provided in the liquid crystal display device 2 according to the present embodiment. As shown in FIG. 40, a display panel 7 includes an active matrix substrate 731, an opposite substrate 732 disposed at a distance from the active matrix substrate 731, and a liquid crystal layer 733 sealed between the active matrix substrate 731 and the opposite substrate 732.

The opposite substrate 732 includes a substrate 701 such as a glass substrate, an opposite electrode 704 formed on a main surface of the substrate 701 on the liquid crystal layer 733 side, and an alignment film 710 and alignment films 706 formed closer to the liquid crystal layer 733 than the opposite electrode 704.

The active matrix substrate 731 includes a substrate 702, gate wiring lines 708 formed on a main surface of the substrate 702, an insulating film 709 formed so as to cover the gate wiring lines 708, pixel electrodes 705 formed on an upper surface of the insulating film 709, alignment films 707 formed on the upper surface of the insulating film 709, and an alignment film 711 formed so as to cover the pixel electrodes 705. The alignment film 711 is disposed over two adjacent pixel electrodes 705, and a gate wiring line 708 positioned between the two pixel electrodes 705. The alignment films 707 are disposed both sides of the alignment film 711, and are disposed over the gate wiring lines 708.

Figure 41:
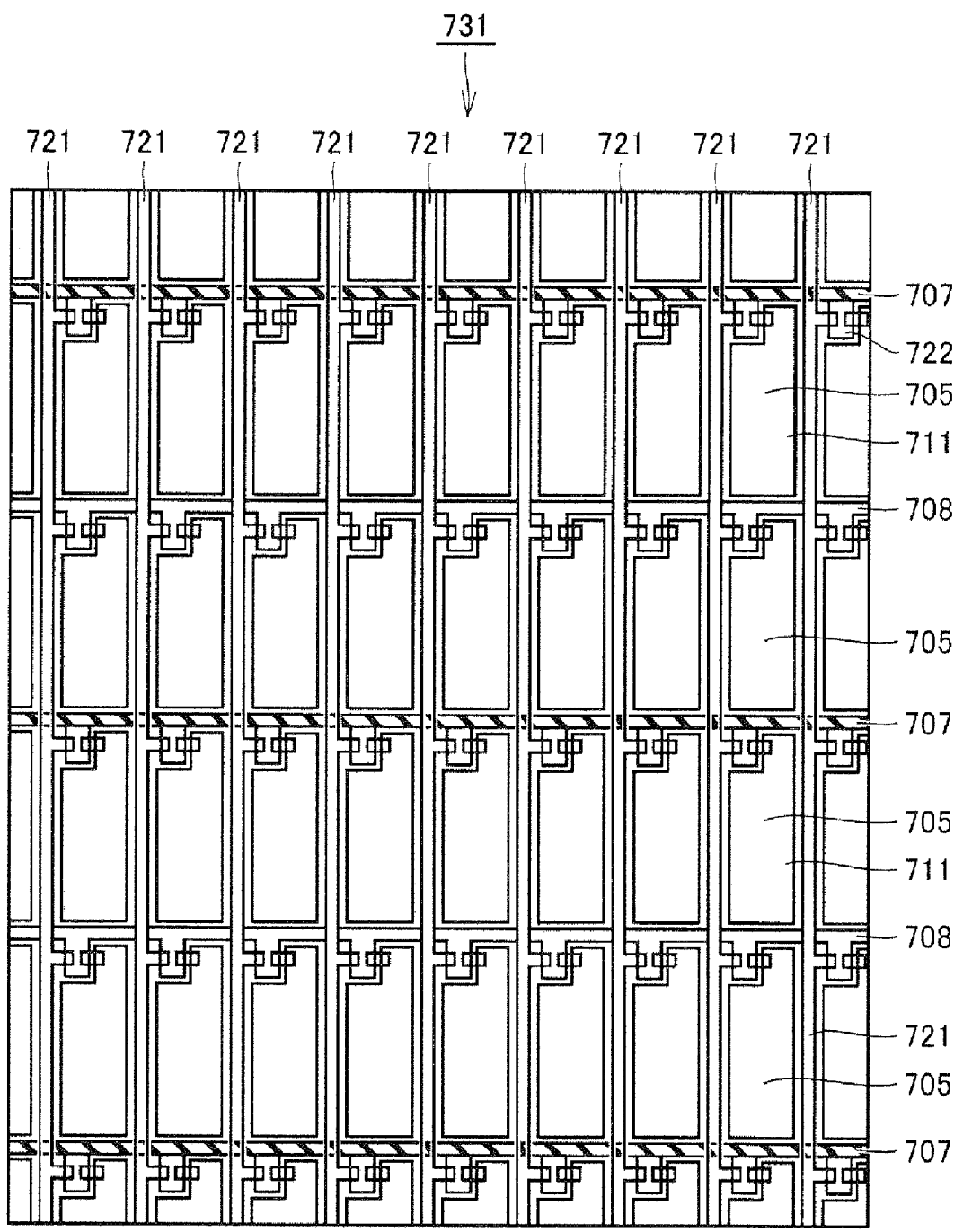
FIG. 41 is a plan view that schematically shows an active matrix substrate 731.

FIG. 41 is a plan view that schematically shows an active matrix substrate 731. As shown in FIG. 41, a plurality of TFT transistors 722 are arranged in an array on the main surface of the substrate 702. Each TFT transistor 722 includes a source electrode, a drain electrode, and a gate electrode. The gate electrodes of the TFT transistors 722 are connected to the gate wiring lines 708 and the source electrodes are connected to source wiring lines 721. The drain electrodes of the TFT transistors 722 are connected to the pixel electrodes 705. A portion surrounded by two adjacent source wiring lines 721 and two adjacent gate wiring lines 708 is one pixel.

A control part applies a prescribed voltage to prescribed gate wiring lines 708 and source wiring lines 721 based on image data, thus turning selected TFT transistors 7220N.

As a result, a prescribed voltage is applied to the pixel electrodes 705, and an electric field is generated between the pixel electrodes 705 and the opposite electrode 704 shown in FIG. 40. As a result, the orientation of the liquid crystal molecules in the liquid crystal layer 733 can be controlled.

Gate wiring lines 708 having the alignment films 707 thereabove and gate wiring lines 708 not having the alignment films 707 thereabove are formed alternately. The alignment films 707 extend in one direction in a manner similar to the gate wiring lines 708. The alignment film 711 shown in FIG. 40 is formed between the alignment films 707.

Also in FIG. 40, the alignment film 710 is formed facing the alignment film 711, and the alignment films 706 are formed facing the alignment films 707.

The rubbing direction of the alignment films 706 and the alignment film 710 is perpendicular to the rubbing direction of the alignment films 707 and the alignment film 711.

The alignment films 706 and the alignment films 707 are made of a material that generates a residual DC voltage with a polarity opposite to an offset voltage when the offset voltage is applied over a long period of time between the pixel electrodes 705 and the opposite electrode 704.

The alignment film 710 and the alignment film 711 are made of a material that generates a residual DC voltage with the same polarity as an offset voltage when the offset voltage is applied between the pixel electrodes 705 and the opposite electrode 704 over a long period of time.

Figure 42:
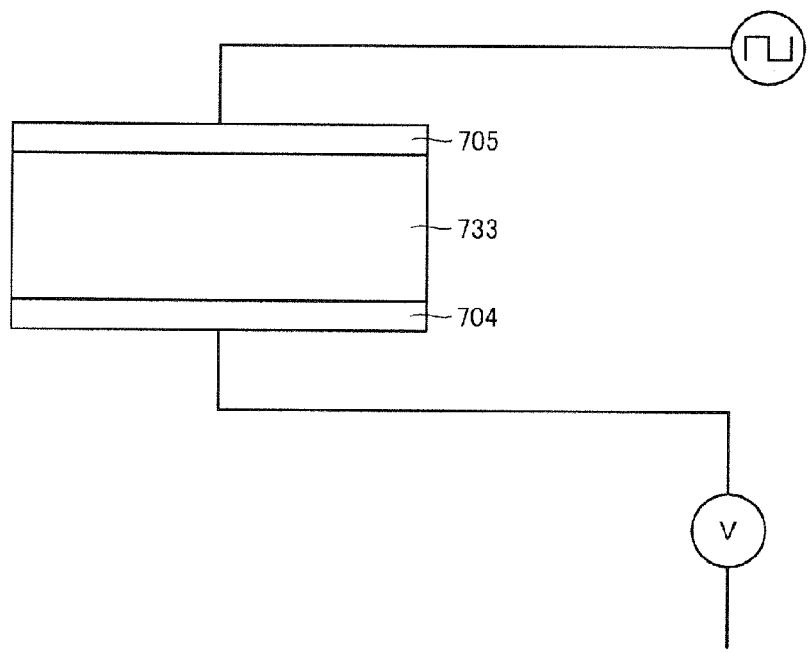
FIG. 42 is a schematic drawing that schematically shows an opposite electrode 704, a liquid crystal layer 733, and a pixel electrode 705 of a conventional display panel.
Figure 43:
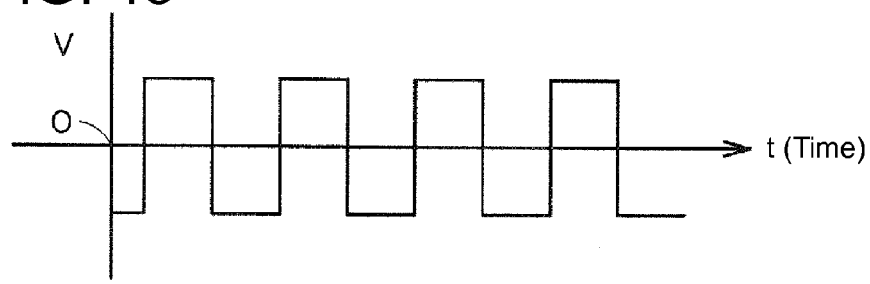
FIG. 43 is a graph that shows a voltage applied to the pixel electrode.
Figure 44:
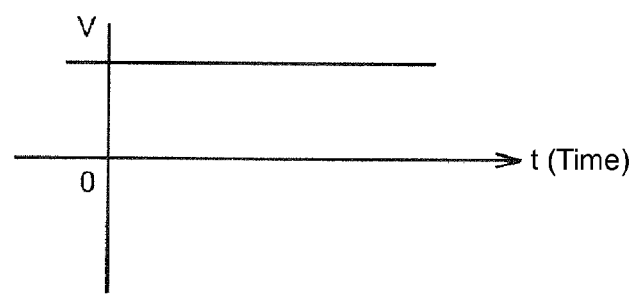
FIG. 44 is a graph that shows a voltage applied to the opposite electrode.

FIG. 42 is a schematic drawing that schematically shows an opposite electrode 704, a liquid crystal layer 733, and a pixel electrode 705 of a conventional display panel. As shown in FIG. 43, an alternating current voltage with a prescribed frequency is applied to the pixel electrode 705 of a selected TFT transistor, and as shown in FIG. 44, a constant voltage is applied to the opposite electrode 704. However, as shown in FIG. 43, it is difficult to apply an alternating current voltage that is symmetrical with respect to the 0V line to the pixel electrode 705, and the current applied to the pixel electrode 705 shifts towards the positive side or the negative side.

Meanwhile, in the manufacturing process, it is unavoidable for impurity ions to be included in the liquid crystal layer 733. As a result, impurity ions gather in the vicinity of the pixel electrode 705.

A voltage applied from outside through an electrode, and a voltage due to an electric charge accumulated in the liquid crystal panel are applied to the liquid crystal layer. If a voltage from outside is added to a voltage resulting from accumulated electric charge in the liquid crystal panel, the voltages applied to the liquid crystal layer differ between positive polarity and negative polarity, resulting in flickering in the liquid crystal panel and not being able to attain a prescribed transmittance. This voltage due to the electric charge accumulated in the liquid crystal panel is referred to as residual DC voltage. Thus, in a conventional display panel, if the same image is displayed over a very long time at or exceeding a few thousand hours, burn-in or flickering results.

On the other hand, in FIG. 40, the display panel of Embodiment 5 includes the alignment film 710 and the alignment film 711 that generate a residual DC voltage at the same polarity as an offset voltage, and the alignment films 706 and the alignment films 707 that generate a residual DC voltage at a polarity opposite to the offset voltage, when the offset voltage is applied over a long period of time.

Thus, as shown in FIG. 40, positive impurity ions 712 are trapped by the alignment films 707 and 710, and the negative impurity ions 713 are trapped by the alignment films 706 and 711.

As a result, it is possible to mitigate the movement of positive impurity ions 712 beyond the alignment films 707 and to other pixels, and to mitigate the movement of negative impurity ions 713 beyond the alignment films 706 and to other pixels.

Thus, it is possible to mitigate the concentration of the impurity ions 712 and 713 in the liquid crystal layer 733 to specific pixels, thus mitigating burn-in and flickering.

In addition, in the liquid crystal display device 2 of Embodiment 5, as shown in FIG. 36, it is possible to eliminate static electricity that has accumulated in the display surface 6a. Thus, as shown in FIG. 40, it is possible to mitigate a positive or negative charge voltage in the display surface 6a due to static electricity, thus mitigating repellence between impurity ions 712 trapped by the alignment film 710 and impurity ions 713 trapped by the alignment film 706, and static electricity in the display surface 6a.

As a result, the return of impurity ions trapped by the alignment film 710 and the alignment films 706 to the liquid crystal layer 733 can be mitigated, thus effectively mitigating the occurrence of burn-in and flickering.

(Embodiment 6)

A liquid crystal display device 2 according to Embodiment 6 will be described with reference to FIGS. 45 and 46. Of the configurations shown in FIGS. 45 and 46, configurations that are the same or correspond to those of FIGS. 1 to 44 may be assigned the same reference characters with descriptions thereof being omitted.

Figure 45:
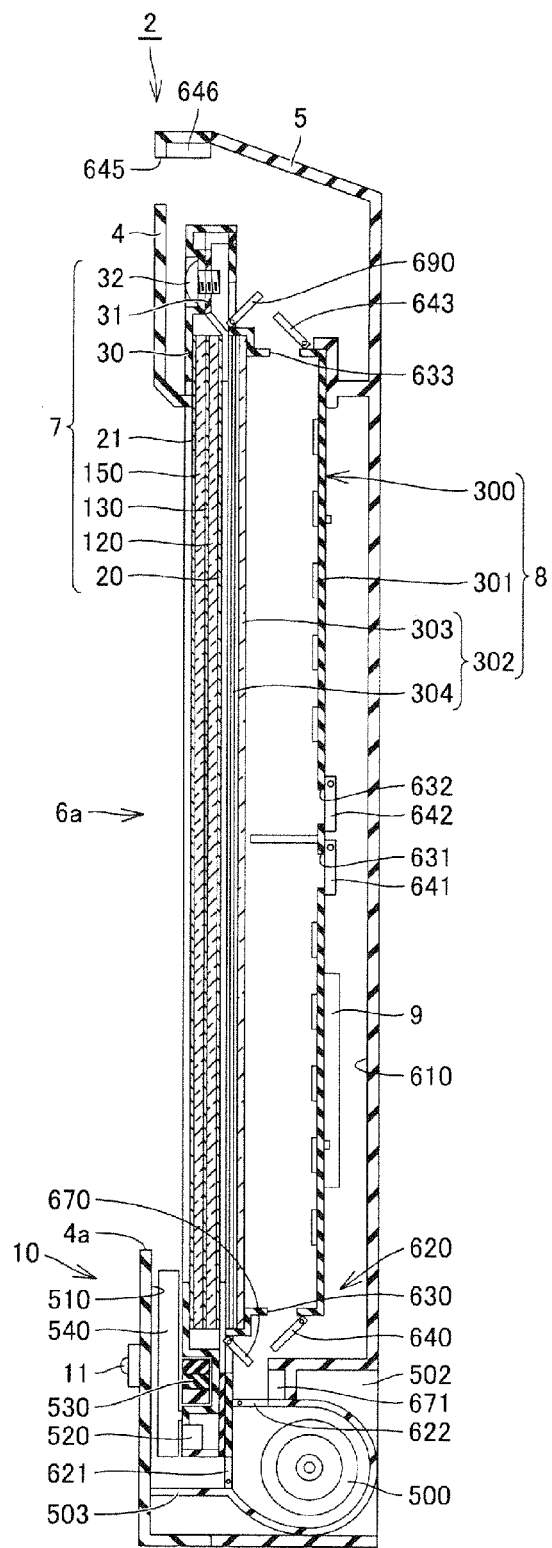
FIG. 45 is a cross-sectional view of a liquid crystal display device 2 according to Embodiment 6.

FIG. 45 is a cross-sectional view of a liquid crystal display device 2 according to Embodiment 6. As shown in FIG. 45, the liquid crystal display device 2 of Embodiment 6 includes a display panel 7 that includes a display surface 6a, and an ion discharge module 10 that can blow ions towards the display surface 6a.

The ion discharge module 10 can selectively guide air from a fan 500 to the display surface 6a, inside a backlight module 8, and to the gap between the display panel 7 and the backlight module 8.

Figure 46:
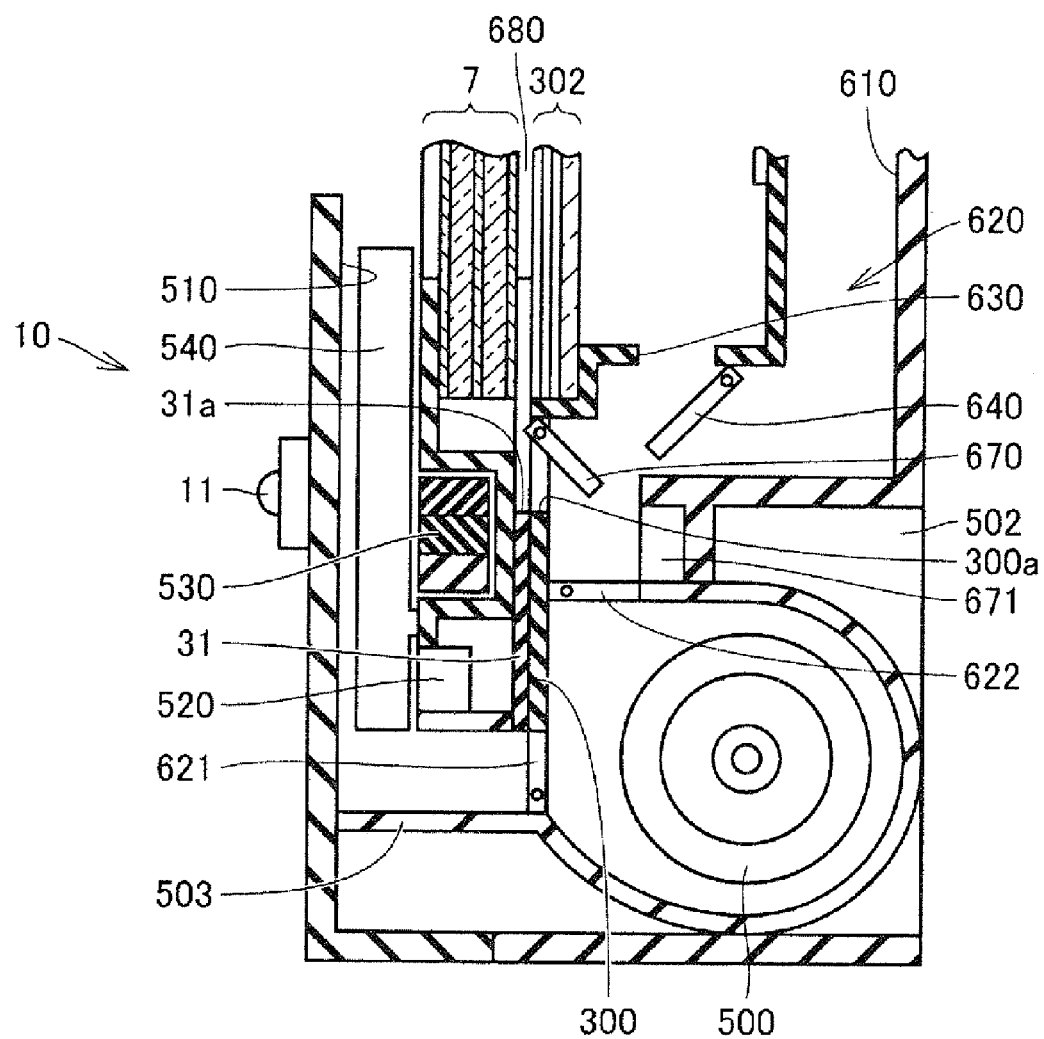
FIG. 46 is a cross-sectional view that shows a configuration of a fan 500 and the periphery thereof.

FIG. 46 is a cross-sectional view that shows a configuration of a fan 500 and the periphery thereof. As shown in FIG. 46, a gap 680 is formed between the display panel 7 and a group of layered sheets 302. Openings 31a and 300a are formed in a pressing member 31 and a rear bezel 300, and air flowing in an outtake pipe 610 passes through the openings 31a and 300a, and is guided to the gap 680.

The ion discharge module 10 includes the outtake pipe 610 that guides air from the fan 500 to the backlight module 8 and the gap 680, an ion-generating device 671 disposed at the intake opening of the outtake pipe 610, and an opening/closing valve 670 provided at the opening 300a.

The ion-generating device 671 can selectively generate positive ions and negative ions. The ions generated by the ion-generating device 671 flow in the outtake pipe 610 when a switching valve 622 is open.

Then, when the opening/closing valve 670 is open, the ions generated by the ion-generating device 671 are guided to the gap 680 along with air from the fan 500. By blowing ions into the gap 680 in this manner, it is possible eliminate static electricity in the display panel 7 and the group of layered sheets 302.

As a result, it is possible to eliminate static electricity accumulated on a main surface of an active matrix substrate of the display panel 7, thus reducing the effect of static electricity on a liquid crystal layer sealed in the display panel 7. Touch sensors are installed in the display panel 7, and when the display panel 7 has touch functionality, a user touches the display surface 6a.

If, at this time, static electricity has accumulated between the display panel 7 and the group of layered sheets 302, there is a possibility of electrical discharge occurring between the display panel 7 and the group of layered sheets 302, but since static electricity in the display panel 7 and the group of layered sheets 302 in the liquid crystal display device 2 of Embodiment 6 can be eliminated, it is possible to mitigate the occurrence of such discharge.

In the display panel 7 with touch sensors, a lower electrode of the touch sensor is disposed on the active matrix substrate, and an upper electrode thereof is disposed on an opposite substrate, and by sensing the capacitance between the upper electrode and the lower electrode, touches on the display surface 6a are detected.

By eliminating static electricity on the surface of the active matrix substrate as stated above, it is possible to minimize the effect of static electricity to the potential of the lower electrode formed on the active matrix substrate. Also, water-resistant sheets are provided on an upper surface of the group of layered sheets 302 facing the gap 680 and the rear surface of the display panel 7, respectively.

(Embodiment 7)

FIGS. 47 to 50 are schematic views that show a display unit according to Embodiment 7. Of the configurations shown in FIGS. 47 to 50, configurations that are the same or correspond to those of FIGS. 1 to 46 are assigned the same reference characters with descriptions thereof being omitted.

Figure 47:
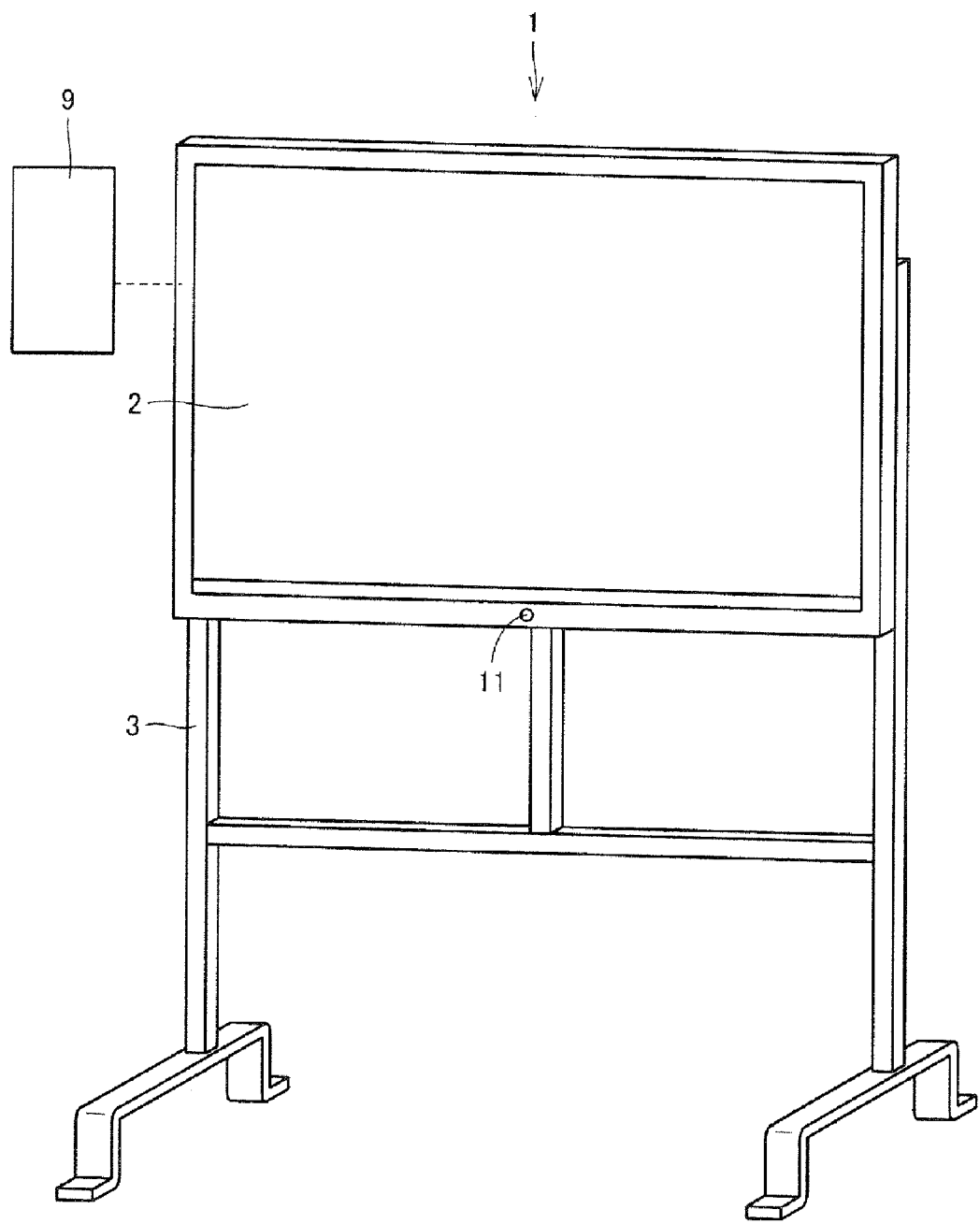
FIG. 47 is a perspective view that shows an information display 1 according to Embodiment 7.

FIG. 47 is a perspective view that shows an information display 1 according to Embodiment 7.

A liquid crystal display device 2 includes a control part 9, which displays images on the display surface of the liquid crystal display device 2 based on image data. The image data is sent to the control part 9 from outside or stored in a memory of the control part 9.

As for image data, various types of image data and position data on image data are stored. Image data includes operating section display data, which is image data of an operating section operated by a user, and position data of an operating section to be displayed.

The liquid crystal display device 2 is driven based on the operating section display data and position data, and the liquid crystal display device 2 displays the operating section in a prescribed position.

Figure 48:
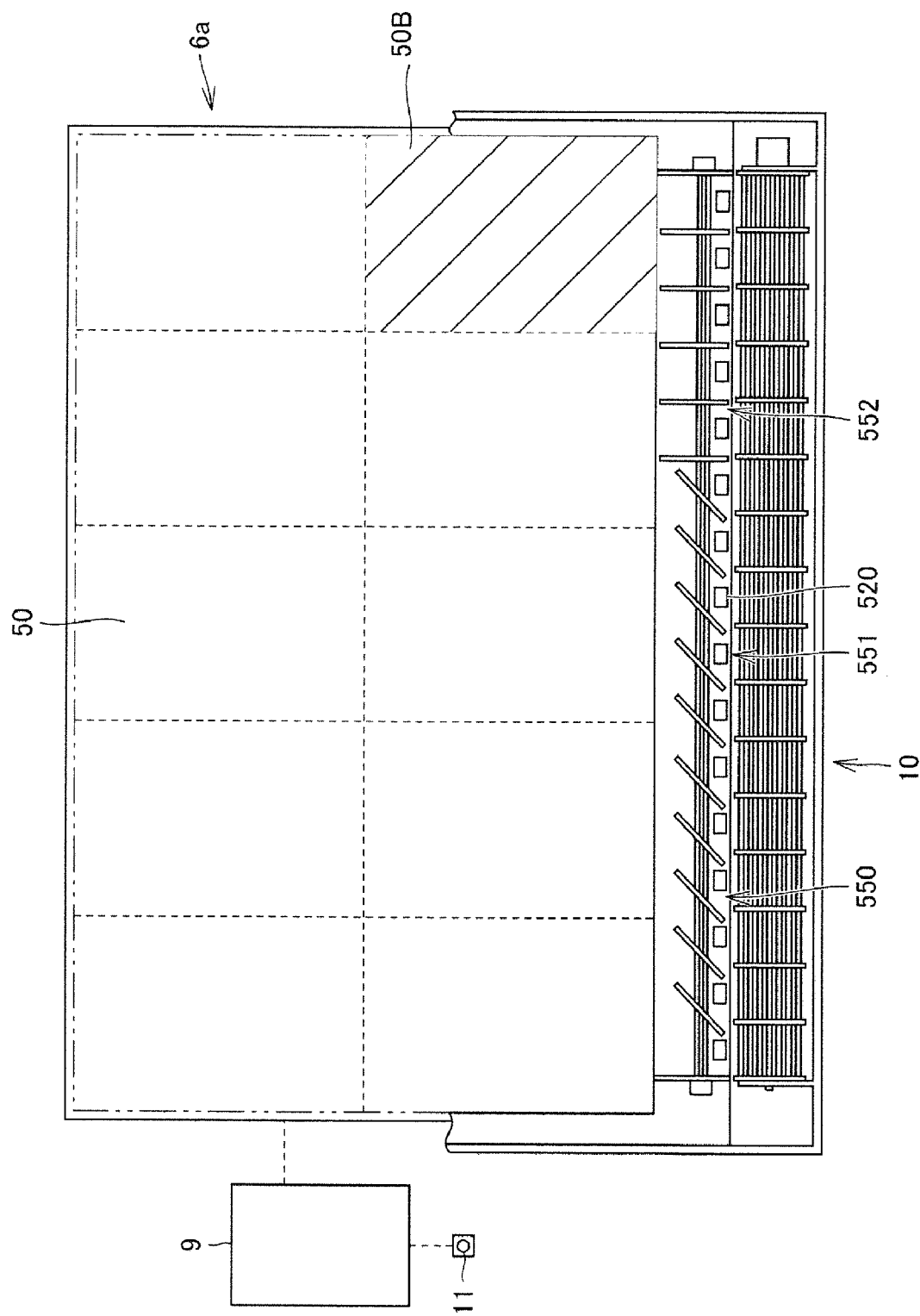
FIG. 48 is a plan view of a portion of a liquid crystal display device 2.

FIG. 48 is a plan view of a portion of a liquid crystal display device 2. As shown in FIG. 48, in an information display 1 according to Embodiment 7 also, the control part 9 sets a plurality of partitioned areas 50 in a display surface 6a. In FIG. 48, a partitioned area 50B is a partitioned area 50 where the operating section is displayed.

Figure 49:
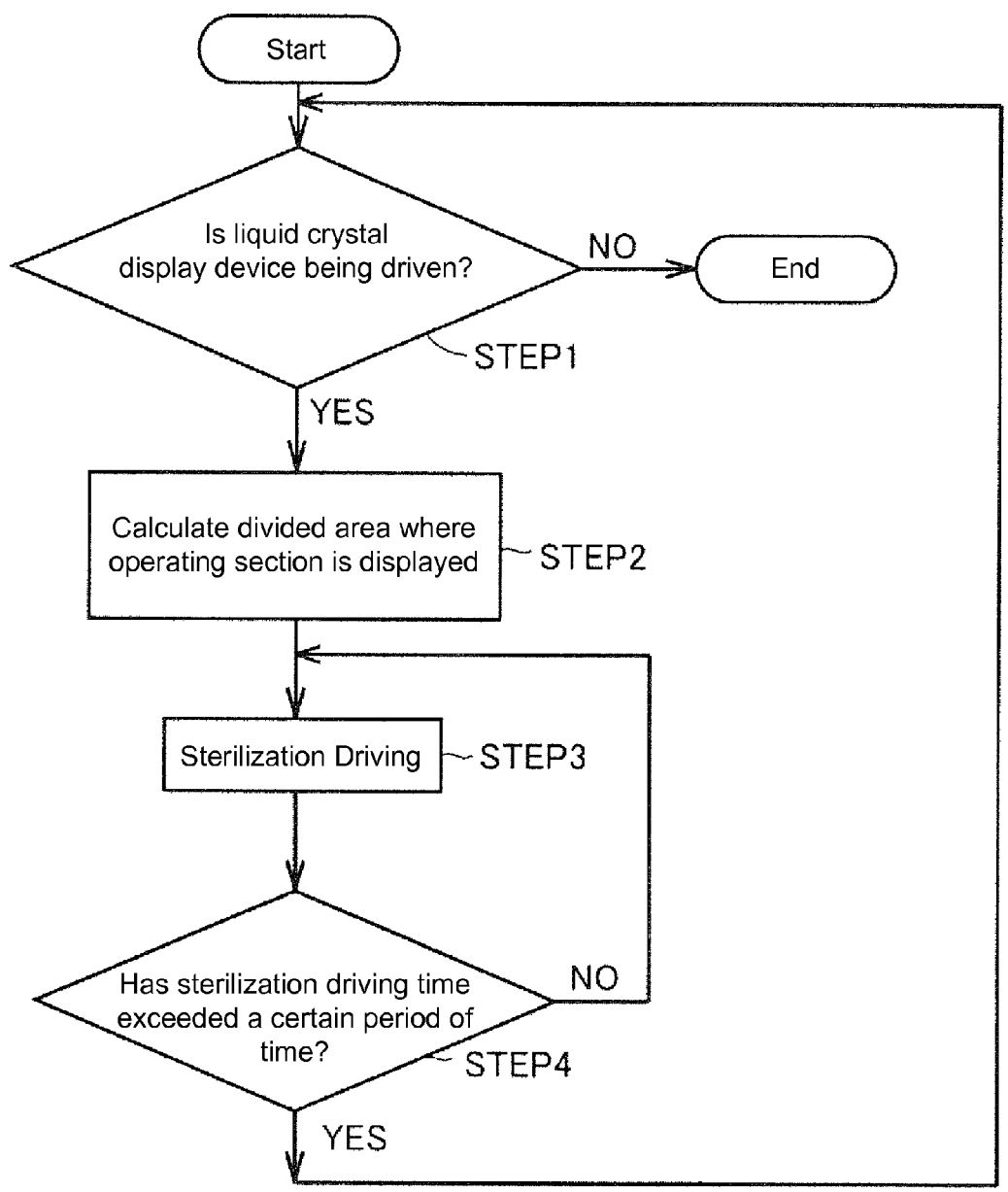
FIG. 49 is a flowchart that shows a control flow of a control part 9.

FIG. 49 is a flowchart that shows a control flow of a control part 9. As shown in FIG. 49, the control part 9 determines whether or not the liquid crystal display device is being driven (STEP 1). If the liquid crystal display device is being driven, the control part 9 calculates a partitioned area where an operating section is displayed according to image data (STEP 2).

The control part 9 conducts sterilization driving to sterilize the partitioned area 50 where the operating section is positioned (STEP 3). Specifically, as described in Embodiment 1, an ion-generating device 520 is driven so as to increase the "sterilization function". The control part 9 continues the increased "sterilization function" state for a prescribed period of time (STEP 4). In an information display 1 configured in this manner, it is known in advance where the operating section is displayed, and thus, drive control of partitioned louvers 550 is very easy.

Figure 50:
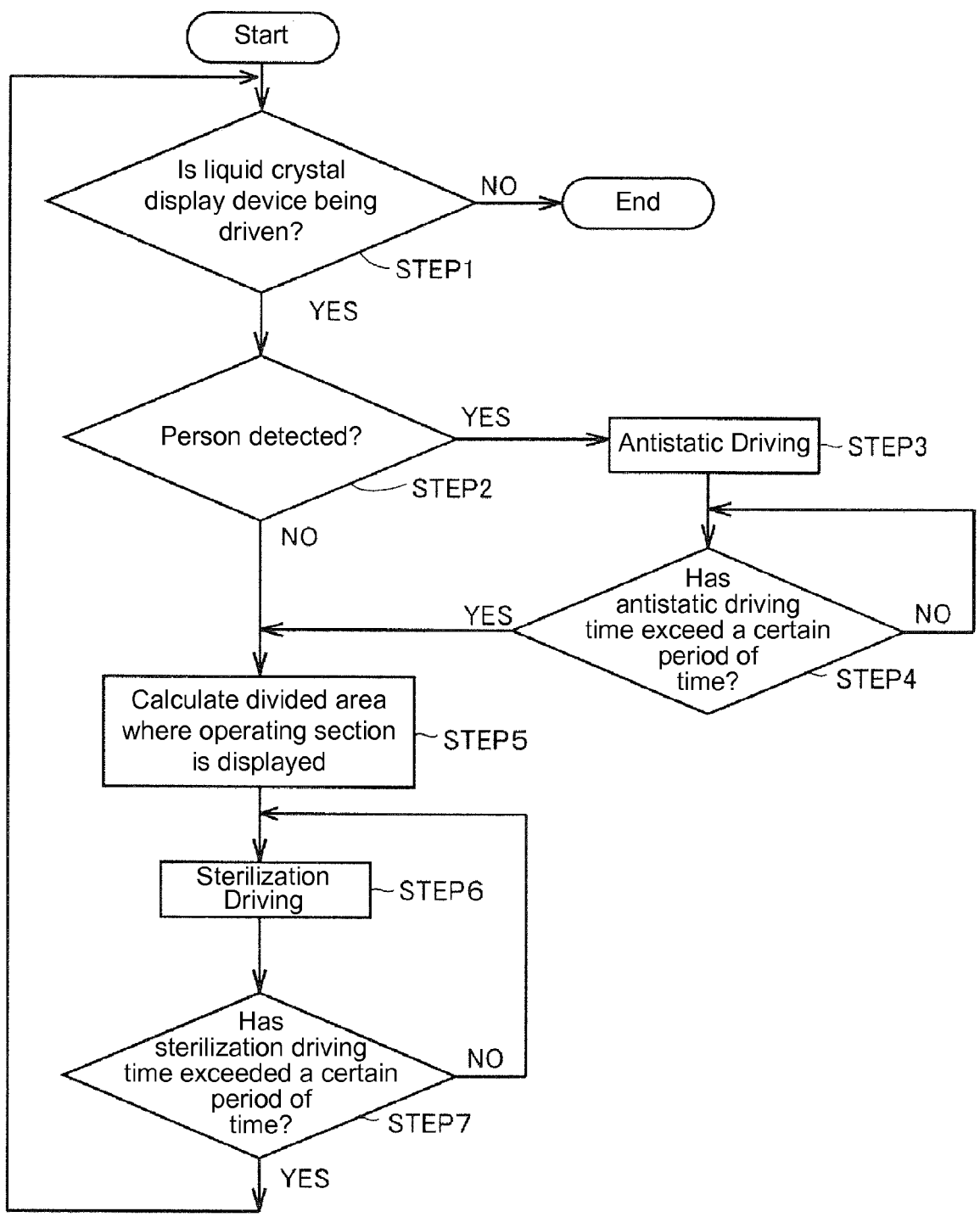
FIG. 50 is a flowchart that shows a modification example of a control flow.

If the area where the operating section is displayed is fixed to the partitioned area 50B shown in FIG. 48, for example, there is no need to drive the individual partitioned louvers 550, thus allowing a very simple configuration for the ion discharge module 10. FIG. 50 is a flowchart that shows a modification example of a control flow. In the example shown in FIG. 50, the control part 9 determines whether the liquid crystal display device is being driven (STEP 1). If the liquid crystal display device is being driven, the control part 9 determines whether or not a person is present in the vicinity of the display surface 6a based on output from a human presence sensor 11 (STEP 2).

The control part 9 starts antistatic driving if it is determined that a person is present in the vicinity of the display surface 6a (STEP 3). Specifically, the ion discharge module 10 is driven so as to blow ions towards the entire display surface 6a. At this time, the ion discharge module 10 starts driving with an increased "antistatic function". As a result, it is possible to eliminate static electricity from the display surface 6a, and it is possible to drive the liquid crystal display device 2, pressure sensors, and the like normally. In addition, it is possible mitigate the attraction of dust and the like kicked up by a person moving in the vicinity of the display surface 6a to the display surface 6a. The control part 9 then continues antistatic driving for a certain period of time (STEP 4).

If a person is not detected in the vicinity of the display surface 6a, the control part 9 calculates the partitioned area where the operating section is displayed, based on image data (STEP 5). The control part 9 conducts sterilization driving to sterilize the partitioned area 50 where the operating section is positioned (STEP 6). Specifically, as described in Embodiment 1, an ion-generating device 520 is driven so as to increase the "sterilization function". The control part 9 continues the increased "sterilization function" state for a prescribed period of time (STEP 7).

Figure 51:
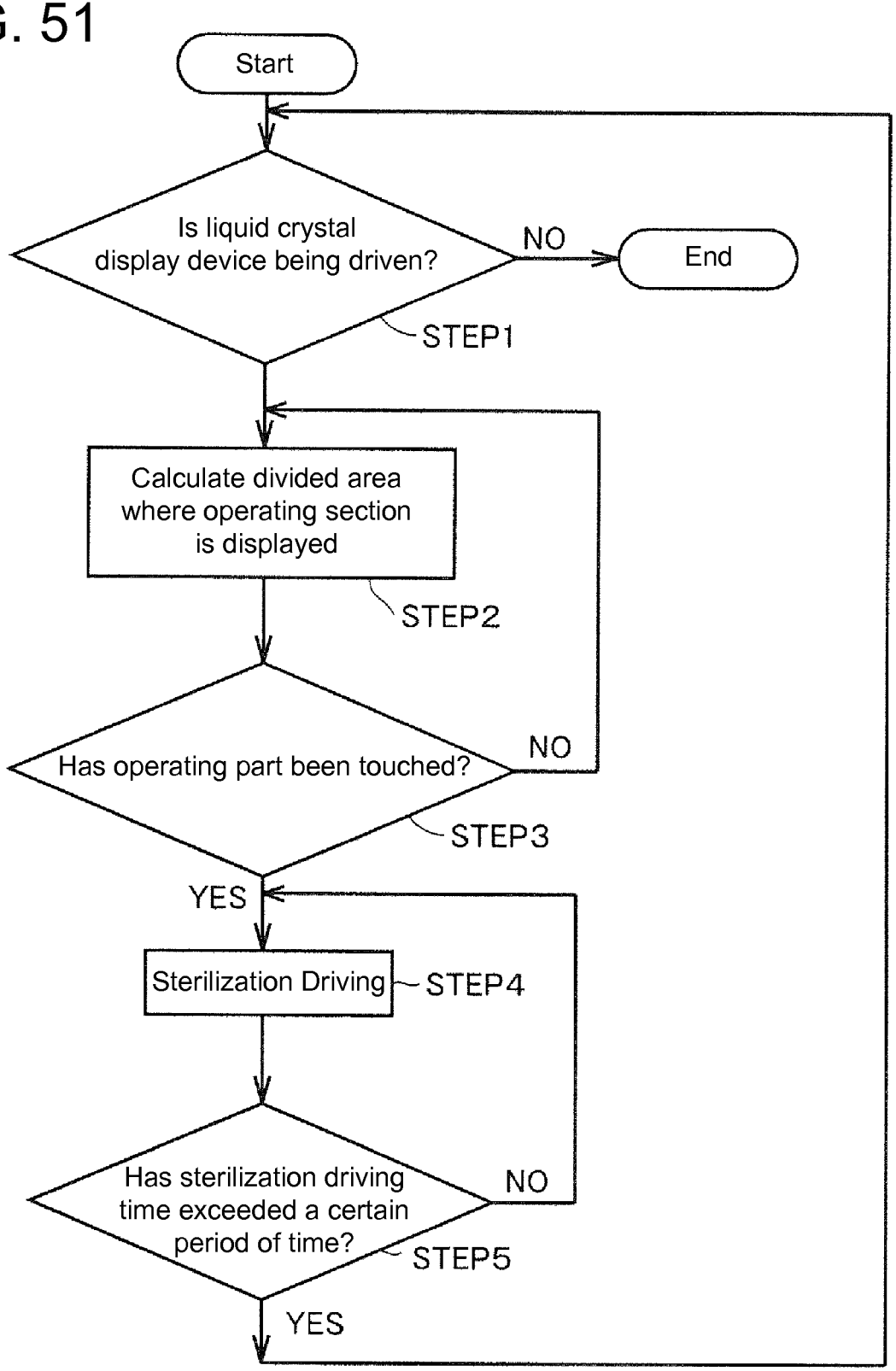
FIG. 51 is a flowchart that shows a control flow of a control part 9 according to a second modification example.

FIG. 51 is a flowchart that shows a control flow of a control part 9 according to a second modification example. The liquid crystal display device 2 of Embodiment 7 includes pressure sensors 118 as in Embodiment 1. The control part 9 can detect whether or not the displayed operating section has been touched by a user, for example, based on output from the pressure sensors 118. Pressure sensors 118 are used as an example of touch sensors, but any type of touch sensor may be used.

As shown in FIG. 51, the control part 9 determines whether or not the liquid crystal display device is being driven (STEP 1). If the liquid crystal display device is being driven, the control part 9 calculates a partitioned area where the operating section is displayed, based on image data (STEP 2). The control part 9 detects whether or not the operating section has been touched based on output from the pressure sensors 118 (STEP 3). If the operating section has been touched by a user, sterilization driving is started (STEP 4). The control part 9 then continues sterilization driving until a certain period of time has been exceeded (STEP 5).

According to this example, even if an operating section is displayed, the ion discharge module 10 is not driven if a user has not touched the operating section, thus minimizing running cost. An external processing device connected to the display device may be used to conduct controls instead of a control part of the liquid crystal display device. A personal computer that has a calculating device such as a CPU, for example, can be used as the external processing device. An example that uses such an external processing device can be suitably used in digital signage systems that display image advertisements or the like, for example.

Embodiments of the present invention have been described above, but these embodiments are examples in every respect, and not limiting. The scope of the present invention is defined by the claims, and all modifications with the same meaning as the claims and within the scope defined thereby are included. In addition, the numbers and the like mentioned above are examples, and the present invention is not limited to such numbers or ranges.

INDUSTRIAL APPLICABILITY

The present invention can be applied to a display device.

DESCRIPTION OF REFERENCE CHARACTERS 1 information display
2 liquid crystal display device
3 stand
4 front cover
4a window portion
5 rear cover
6 liquid crystal display module
6a display surface
7 display panel 8 backlight module
9 control part
10 ion discharge module
11 human presence sensor
20, 21 polarizing plate
424 absorbent barrier layer
30 front bezel
31 pressing member
31a, 256, 630, 631, 632, 633 opening
32 fixing member
50, 50A partitioned area
101 source driver
102 gate driver
103 sensor driver
110 pixel
111, 721 source wiring line
112, 708 gate wiring line
113 sensor gate wiring line
114, 412, 705 pixel electrode
115, 116 element
117 output element
118 pressure sensor
119 pressure detection element
120, 410, 731 active matrix substrate
121, 138, 183 source electrode
122, 134, 181 gate electrode
123, 132, 180 semiconductor layer
124 connecting wiring line
125, 137, 182 drain electrode
130, 430, 733 liquid crystal layer
131 base layer
133 gate insulating layer
135 interlayer insulating layer
136 upper layer insulating layer
140, 156, 421 glass substrate
150, 420, 732 opposite substrate
151 color filter substrate
152, 704 opposite electrode
153 colored layer
155, 422 black matrix
161 spacer
170 protrusion
171 upper electrode
172 lower electrode
184 contact
201 alumina dielectric body
202, 203, 252, 253 electrode
204 high voltage alternating current voltage pulse generator
205, 570 airflow direction
207, 208 air region
250 discharge unit
251 discharge cylinder
255 air compression device
260 dividing plate
261 coil
262 magnetic body
263 spring
265, 266 penetrating hole
270 ion-filling chamber
271 drive chamber
272 oscillating direction
275 air mass
280 spinning direction
300 rear bezel
302 group of layered sheets
303 diffusion sheet
304 prism sheet
310 module
311, 701, 702 substrate
312 temperature sensor
415, 425 vertical alignment film
332, 432, 712, 713 impurity ion
411 transparent substrate
413 common electrode
423 color filter
431 liquid crystal molecule
440 charge sensor
500 fan
501 intake opening
502 intake pipe
503 straightening vane
504 filter
505 input opening
510, 610 outtake pipe
511 outtake opening
512 divergent part
520, 671 ion-generating device
530 adjusting mechanism
540 first louver
541 fin
542 axle
550, 551, 552 partitioned louver
555 second louver
560 louver adjusting mechanism
561, 562, 563 slide bar
564 slide mechanism
566 rotating mechanism
620 switching device
621, 622 switching valve
640, 641, 642, 643, 670 opening/closing valve
645 exhaust hole
650 rear wall
651 side wall
652 dividing member
660, 660A divided section
680 gap
706, 711 alignment film
722 transistor

The invention claimed is:

1. A display device, comprising:
a display panel that has a display surface that displays an image;
a fan;
an ion-generating device that can generate ions; and
a guiding mechanism that can selectively guide air from the fan to the display surface and a rear side of the display surface,
wherein the air guided to the display surface is guided together with ions generated by the ion-generating device,
wherein a backlight module that has a plurality of light sources that radiate light to the display panel is disposed on the rear side of the display surface,
wherein the backlight module includes a dividing wall that divides a space inside the backlight module into a plurality of divided areas, and a detector that can detect a temperature inside each of the divided areas, and
wherein the guiding mechanism guides air from the fan to a divided area that has an internal temperature at or higher than a prescribed temperature.

2. The display device according to claim 1,
wherein the display surface has a plurality of partitioned areas that face the divided areas, and wherein the guiding mechanism sends air towards one of the plurality of partitioned areas facing one of the divided areas that has a temperature at or higher than a prescribed temperature.

3. The display device according to claim 1,
wherein a gap is formed between the display panel and the backlight module, and
wherein the guiding mechanism can guide air from the fan to the gap.

4. The display device according to claim 1, further comprising a human presence sensor that can detect a person in a vicinity of the display surface,
wherein, when the human presence sensor detects a person in the vicinity of the display surface, the guiding mechanism guides air from the fan to the display surface.

5. The display device according to claim 1, further comprising a touch sensor that can detect that the display surface has been touched,
wherein, when the touch sensor detects that the display surface has been touched, the guiding mechanism guides air from the fan to the display surface.

6. The display device according to claim 1,
wherein the ion-generating device generates ions having a sterilization effect, said ions including positive ions and negative ions,
wherein the positive ions include $H^+(H_2O)_m$, m being any natural number, and the negative ions include $O_2^-(H_2O)_n$, n being any natural number, and
wherein the positive ions and the negative ions react with each other forming $H_2O_2$ or an OH radical.

\* \* \* \* \*